United States Patent
Mitchell et al.

(10) Patent No.: US 7,147,773 B2
(45) Date of Patent: Dec. 12, 2006

(54) REFRIGERATOR WITH TREATED WATER

(75) Inventors: Alan Joseph Mitchell, Evansville, IN (US); Todd Lawrence Rose, Evansville, IN (US); Judd Dylan Olson, Minnetonka, MN (US); David James Emmons, Plymouth, MN (US); John Paul Boros, Maple Lake, MN (US); Donald Stephen Bretl, West Chester, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 81 days.

(21) Appl. No.: 10/423,157

(22) Filed: Apr. 25, 2003

(65) Prior Publication Data

US 2004/0211717 A1 Oct. 28, 2004

(51) Int. Cl.
*B01D 27/08* (2006.01)
*B01D 35/153* (2006.01)
*B01D 35/147* (2006.01)
*F25D 23/12* (2006.01)

(52) U.S. Cl. .................. 210/234; 210/235; 210/136; 210/175; 210/186; 210/249; 210/238; 210/91; 210/85; 62/332; 62/389; 62/390

(58) Field of Classification Search ............. 210/235, 210/136, 175, 249, 238, 91, 85, 234, 186; 62/332, 389, 390
See application file for complete search history.

(56) References Cited

U.S. PATENT DOCUMENTS

| | | | |
|---|---|---|---|
| 2,167,225 A | 7/1939 | Van Eweyk | 210/103 |
| 2,335,458 A | 11/1943 | Senyal | 210/122 |
| 2,932,400 A * | 4/1960 | Scavuzzo | 210/235 |
| 2,991,885 A * | 7/1961 | Gutkowski | 210/133 |
| 3,224,585 A * | 12/1965 | Scavuzzo et al. | 210/232 |
| 3,339,776 A | 9/1967 | Young | 217/12 |
| 3,399,776 A * | 9/1968 | Knuth | 210/234 |
| 3,852,196 A | 12/1974 | Szpur | 210/133 |
| 4,025,438 A | 5/1977 | Gelman et al. | 210/484 |
| 4,094,779 A | 6/1978 | Behrman | 210/40 |
| 4,172,796 A | 10/1979 | Corder | 210/238 |
| 4,493,772 A | 1/1985 | Tanaka | 210/799 |
| 4,559,136 A * | 12/1985 | Dockery | 210/169 |
| 4,764,274 A | 8/1988 | Miller | 210/232 |
| 4,915,831 A * | 4/1990 | Taylor | 210/232 |
| 5,256,285 A | 10/1993 | Tomita et al. | 210/234 |
| 5,309,797 A * | 5/1994 | Nguyen | 81/64 |
| 5,460,719 A * | 10/1995 | Clack et al. | 210/233 |
| 5,499,561 A * | 3/1996 | Quinn | 81/124.6 |
| 5,560,824 A * | 10/1996 | Sann et al. | 210/234 |
| 5,601,710 A * | 2/1997 | Yoon et al. | 210/232 |
| 5,607,582 A | 3/1997 | Yamazaki | |
| 5,753,111 A | 5/1998 | Patton | 210/167 |

(Continued)

FOREIGN PATENT DOCUMENTS

GB    2208068 A  *  2/1989

*Primary Examiner*—Thomas M. Lithgow
(74) *Attorney, Agent, or Firm*—Robert O. Rice; John F. Colligan; Stephen Krefman

(57) ABSTRACT

A refrigerator with a water treatment system including a head connecting a water supply to a water-using accessory. An end piece is provided for connecting a treatment cartridge to the head. The end piece comprises an inlet fitting having a cam that contacts a follower of a valve located in the head to open the valve when the end piece is mounted to the head and connects the treatment cartridge to the water treatment system.

87 Claims, 32 Drawing Sheets

U.S. PATENT DOCUMENTS

| | | | |
|---|---|---|---|
| 5,762,787 A * | 6/1998 | Park et al. ................. 210/232 |
| 5,813,245 A | 9/1998 | Coates et al. |
| 5,826,854 A | 10/1998 | Janvrin et al. ........... 251/149.9 |
| 6,120,685 A | 9/2000 | Carlson et al. ............. 210/232 |
| 6,337,015 B1 | 1/2002 | Poirier ....................... 210/232 |

\* cited by examiner

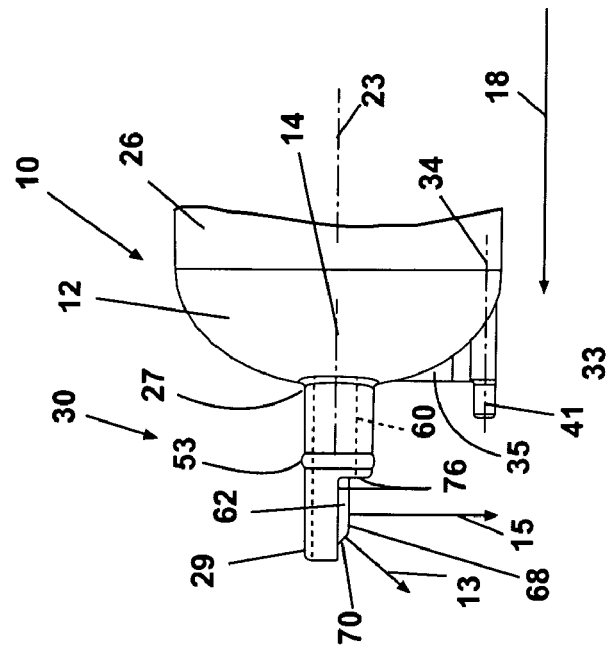
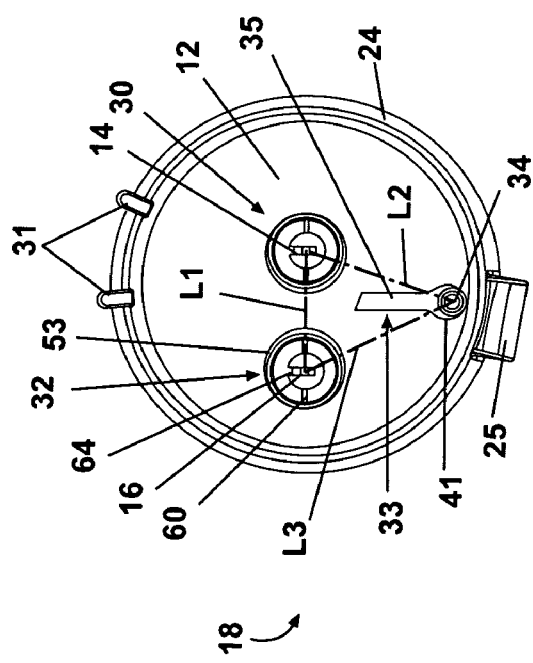
Fig. 2A
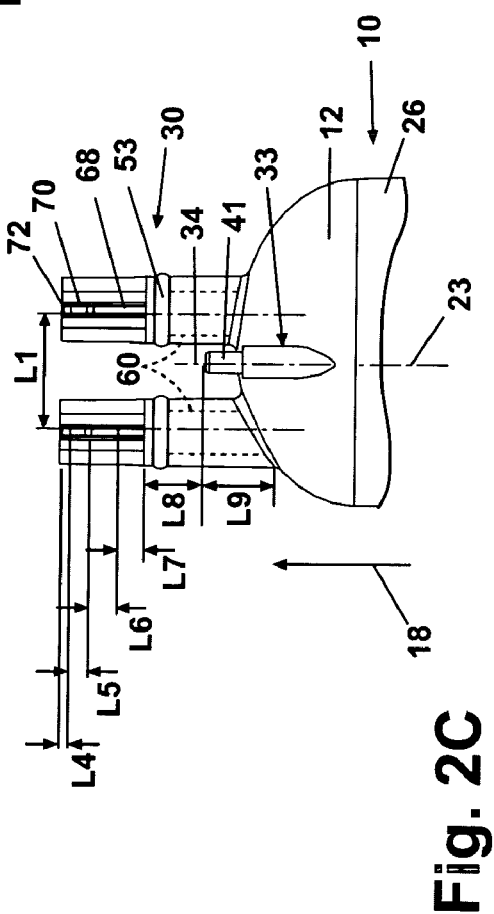
Fig. 2B
Fig. 2C

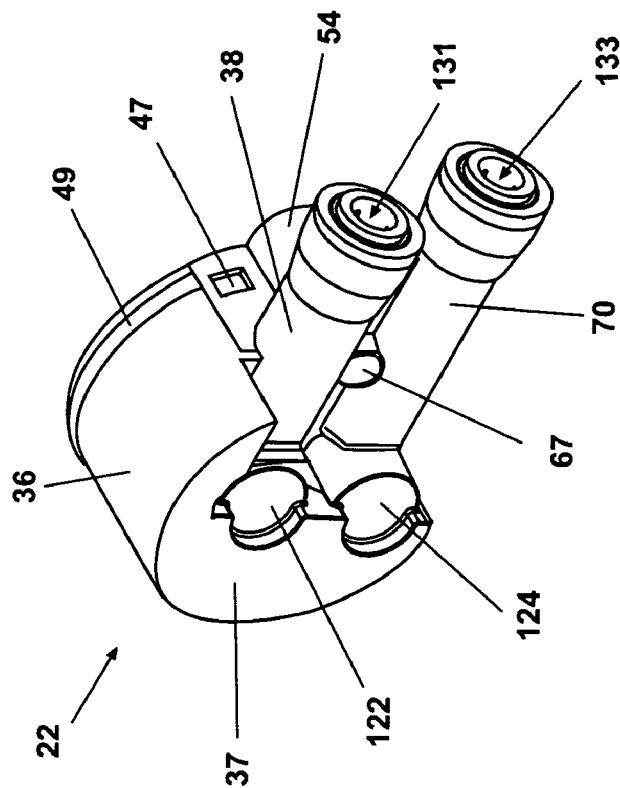
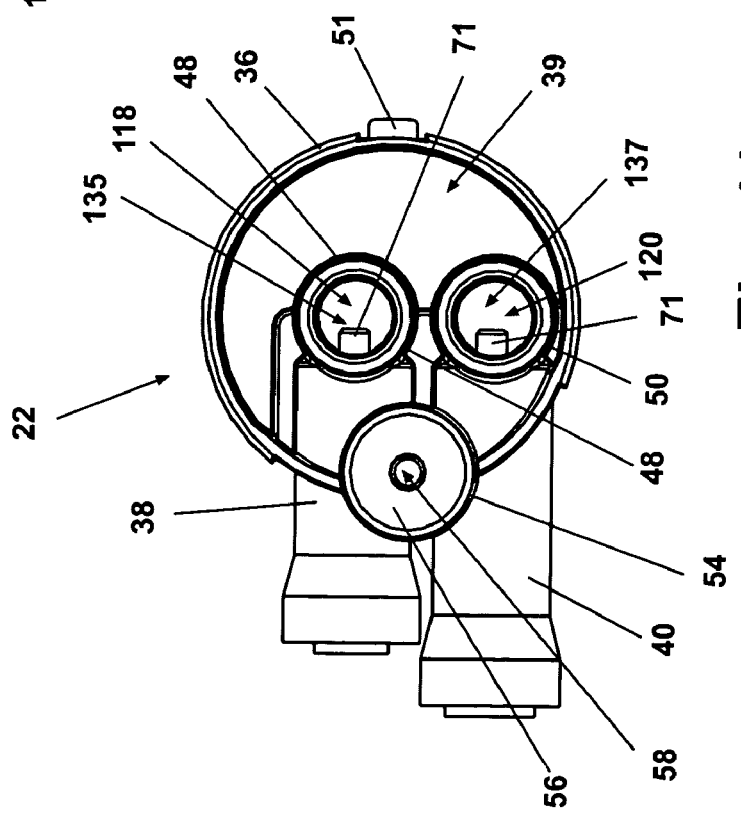

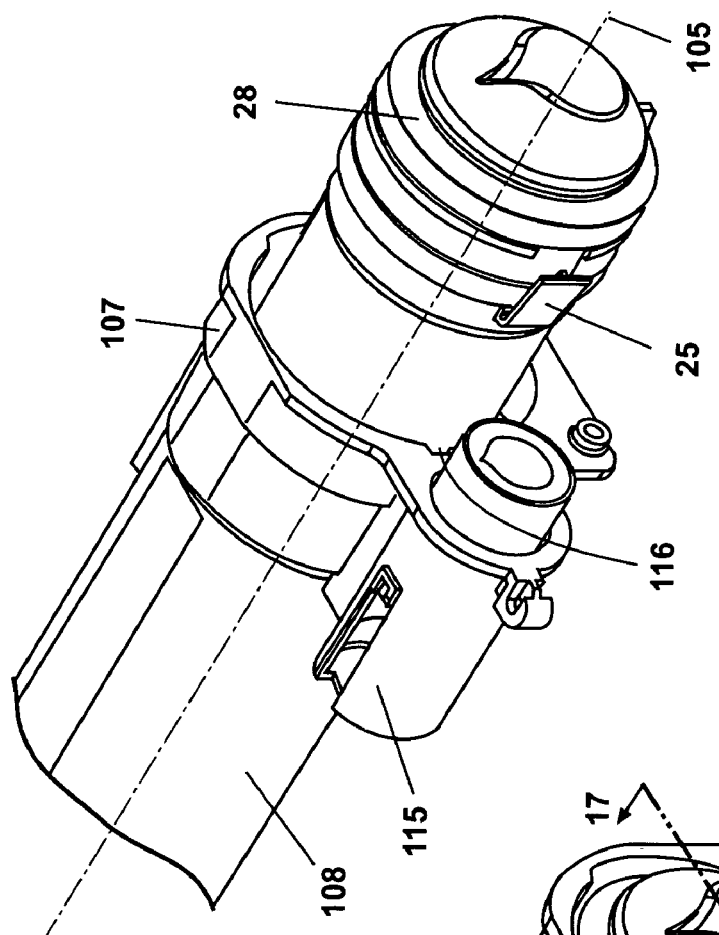
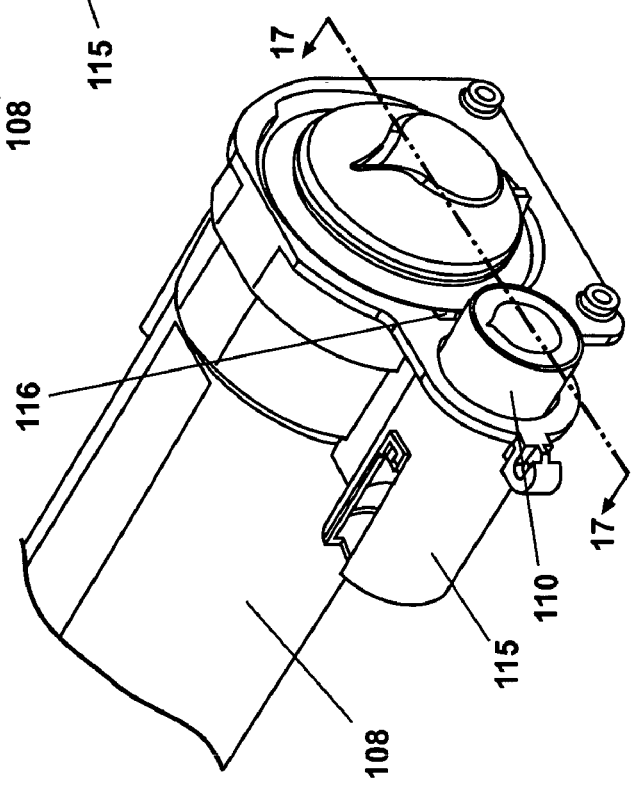
Fig. 15B
Fig. 15A

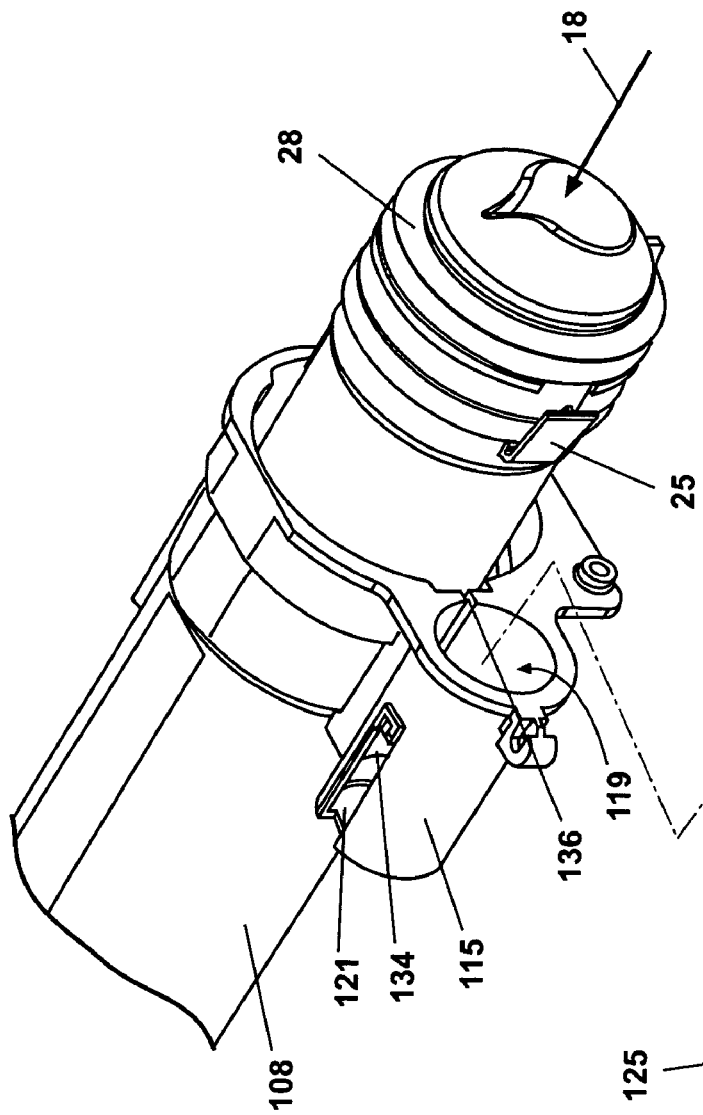
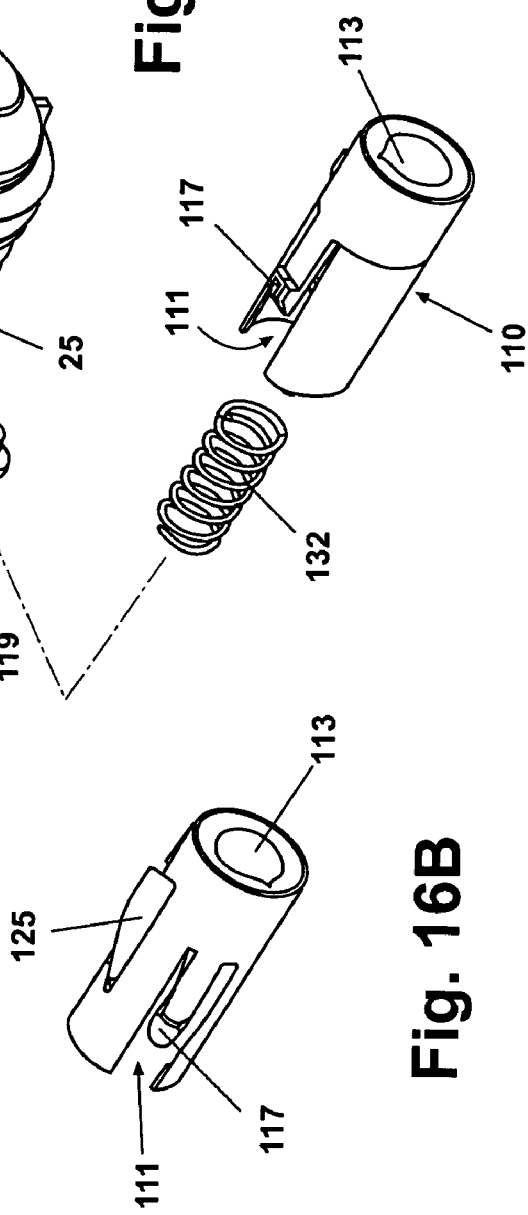
Fig. 16A
Fig. 16B

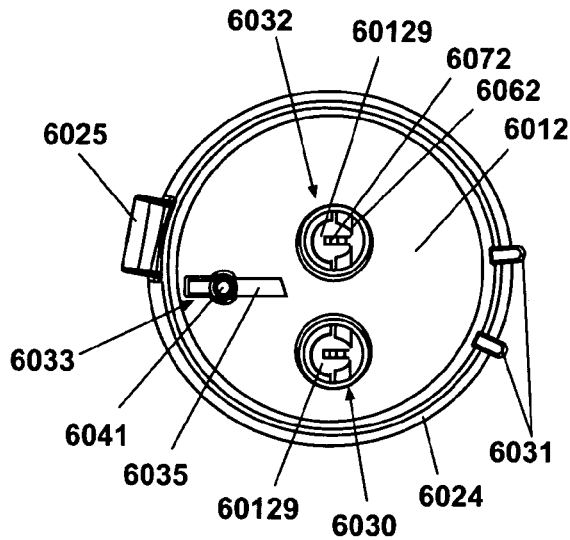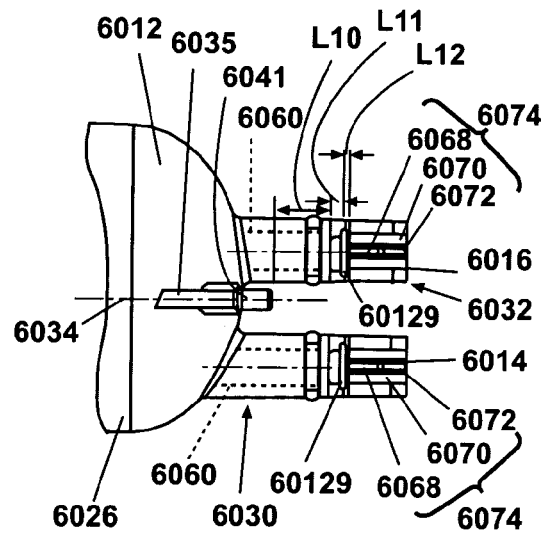
Fig. 18A  Fig. 18B
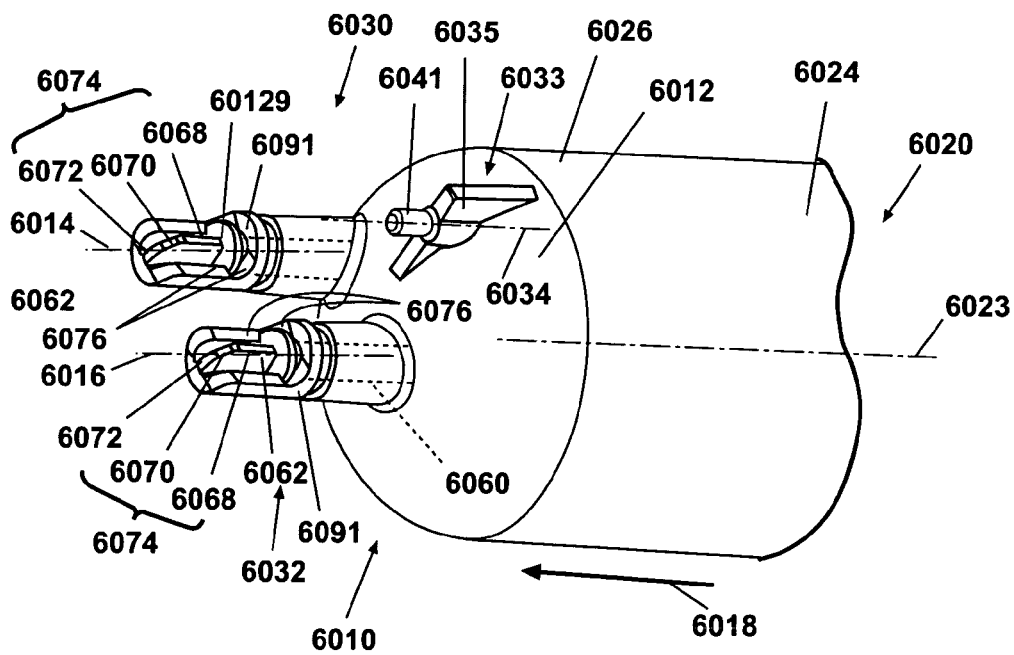
Fig. 18C

REFRIGERATOR WITH TREATED WATER

BACKGROUND OF INVENTION

1. Field of the Invention

The present invention relates to the field of fluid treatment. In one aspect, the invention relates to the field of fluidic cartridges and the end pieces thereof that are capable of actuating one or more valves of an appliance. In another aspect, the invention relates to a refrigerator using treated water that is treated using a fluidic cartridge.

2. Description of the Related Art

Water treatment cartridges are known in the art. One use of such cartridges is to treat water for use in a refrigerator. The treated water is often used to supply an ice maker or a drinking water supply. Examples of refrigerators using cartridges or cartridges suitable for use in a refrigerator are disclosed in U.S. Pat. Nos. 5,826,854, 6,120,685, and 6,337,015. These cartridges have an inlet, an outlet, and a filter material in fluid communication with the inlet and the outlet.

Some of these cartridges open a valve in the inlet and/or the outlet of a head assembly fitting to which the cartridge attaches. Examples of such arrangements are disclosed in U.S. Pat. Nos. 5,256,285, 5,607,582, and 5,753,111. These valves are typically actuated in a direction linear with the engagement of the filter cartridge, requiring the casing receiving the cartridge to be at least as long as the valve.

Some known cartridges can be used to actuate valves other than an inlet and/or an outlet valve. For example, U.S. Pat. Nos. 3,339,776 and 3,852,196 disclose a filter and valve arrangement whereby connecting or disconnecting the filter cartridge from the inlet/outlet valves of the system's body also automatically opens or closes a bypass valve.

While these cartridges may have been useful for their intended purpose, within the refrigerator environment there is a desire to provide a more compact water treatment cartridge arrangement that can actuate inlet and outlet valves when inserted into a confined space. The desire for a more compact cartridge relates to conflicting requirements of the refrigerator environment where, on one hand, for aesthetic purposes it is preferred to locate the cartridge within the refrigerator cabinet, and, on another hand, it is preferred to locate the cartridge externally of the refrigerator cabinet to prevent the cartridge from taking up valuable storage space that could otherwise be used to store food. It is also preferred that the cartridge be located for easy access by the user to increase the likelihood that the user will replace the cartridge.

The refrigeration environment preferences are balanced with the performance requirements for the cartridge. For example, there is a desire to maximize the length of treatment cartridges, thus increasing treatment material, thus increasing cartridge performance in confined spaces. Further, there is a desire to provide a treatment cartridge that utilizes a mechanical advantage in actuating an inlet and/or an outlet valve. Still further, there is a desire to provide a treatment cartridge that can accomplish any of the foregoing and is also capable of actuating a bypass valve (or other feature) located on the head assembly into which the cartridge is inserted.

SUMMARY OF THE INVENTION

In one aspect the invention relates to a refrigerator comprising a water-using accessory provided on one of the cabinet and door, with a head fluidly coupling the water-using appliance to a water supply, and a water-treatment cartridge removably coupled to the head such that when the cartridge is coupled to the head, the cartridge treats the water from the supply for use by the water-using accessory. A cartridge mounting bracket is provided for removably mounting the cartridge to the cabinet and is located on the cabinet relative to head such that the mounting of the cartridge to the cartridge mounting bracket effects the coupling of the cartridge to the head and the cartridge can be mounted to the cartridge mounting bracket from the exterior of the cabinet.

In another aspect the invention relates to a refrigerator comprising a water-using accessory and a water-treatment system fluidly coupling a water supply to the water-using appliance for supplying treated water to the water-using accessory. The water-treatment system comprising a head assembly controlling the flow of water from the water supply through the head assembly and an end piece for fluidly connecting a treatment cartridge to the head assembly. The end piece comprises an end piece wall, an inlet fitting, and an outlet fitting, with at least one of the inlet fitting and outlet fitting having a cam surface and a longitudinal axis. The inlet fitting and the outlet fitting extend from said end piece wall, and a portion of said cam surface is vectored from said longitudinal axis.

The end piece can be mounted to a cartridge housing, with the cartridge housing being filled with a treatment material for treating the water from the supply. The cam surface can be used for actuating a valve located in the head. Both the inlet and outlet fittings can have a cam surface for actuating a corresponding valve located in the head. The head can include inlet and outlet passageways in which the valves are located, such that a follower on each of the valves at least extends into the corresponding inlet and outlet fittings such that the corresponding cam surface will contact the follower and open the valve. The passageways are preferably oriented at an angle relative to the fittings to minimize the overall length of the head.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

FIG. 2-A is a front elevational view of the cartridge of FIG. 1.

FIG. 2-B is a top plan view of the end piece of the cartridge of FIG. 1.

FIG. 2-C is a side elevational view of the end piece of the cartridge of FIG. 1.

FIG. 9-B is a cross sectional top plan view of the head assembly and partially inserted end piece of the cartridge of FIG. 1 taken along line 9A/B—9A/B thereof, wherein the inlet valve is not actuated and shown in the closed position.

FIG. 10 is a perspective view of the head assembly of FIG. 1 showing the closed end.

FIG. 11 is a front view of the head assembly of FIG. 1 showing the follower of the inlet and outlet valves in a closed position extending into the inlet and outlet receiving ports.

FIG. 12-B is a cross sectional view of the bypass valve of the head assembly of FIG. 1 taken along line 12A/B—12A/B thereof, wherein the bypass valve is shown in the open position.

FIG. 14-B is a perspective view of the lower portion of the refrigerator of FIG. 14-A with the cartridge of FIG. 1 after the cartridge is mounted to the refrigerator by slidably insertion into the appliance casing.

FIG. 15-A is an enlarged perspective view of the lower portion of the refrigerator of FIG. 14-A with the grill removed and illustrating the cartridge of FIG. 1. fully inserted and latched in the appliance casing.

FIG. 15-B is a perspective view similar to FIG. 15-A with the cartridge of FIG. 1 partially inserted and unlatched from the appliance casing.

FIG. 16-A is an exploded perspective view of an appliance button for unlatching the cartridge.

FIG. 16-B is a perspective view of the appliance button of FIG. 16-A, showing the button wall.

FIG. 18-A is a front elevational view of an alternate embodiment of the cartridge of FIG. 1, wherein the position of the fittings and protrusion is altered, and the fittings further include a deflector wall.

FIG. 18-B is a side elevational view of an alternate embodiment of the end piece of the cartridge of FIG. 1, wherein the position of the fittings and protrusion is altered, and the fittings further include a deflector wall.

FIG. 18-C is a perspective view of an alternate embodiment of the end piece of the cartridge of FIG. 1, wherein the position of the fittings and protrusion is altered, and the fittings further include a deflector wall.

FIG. 20-B is an enlarged assembly perspective view of a portion of FIG. 20-A and illustrating the relationship between the appliance casing and the head and cartridge, along with showing the appliance button and an end cap for improving the ease of insertion and removal of the cartridge from the appliance casing.

DESCRIPTION OF THE PREFERRED EMBODIMENTS

Figure 1:
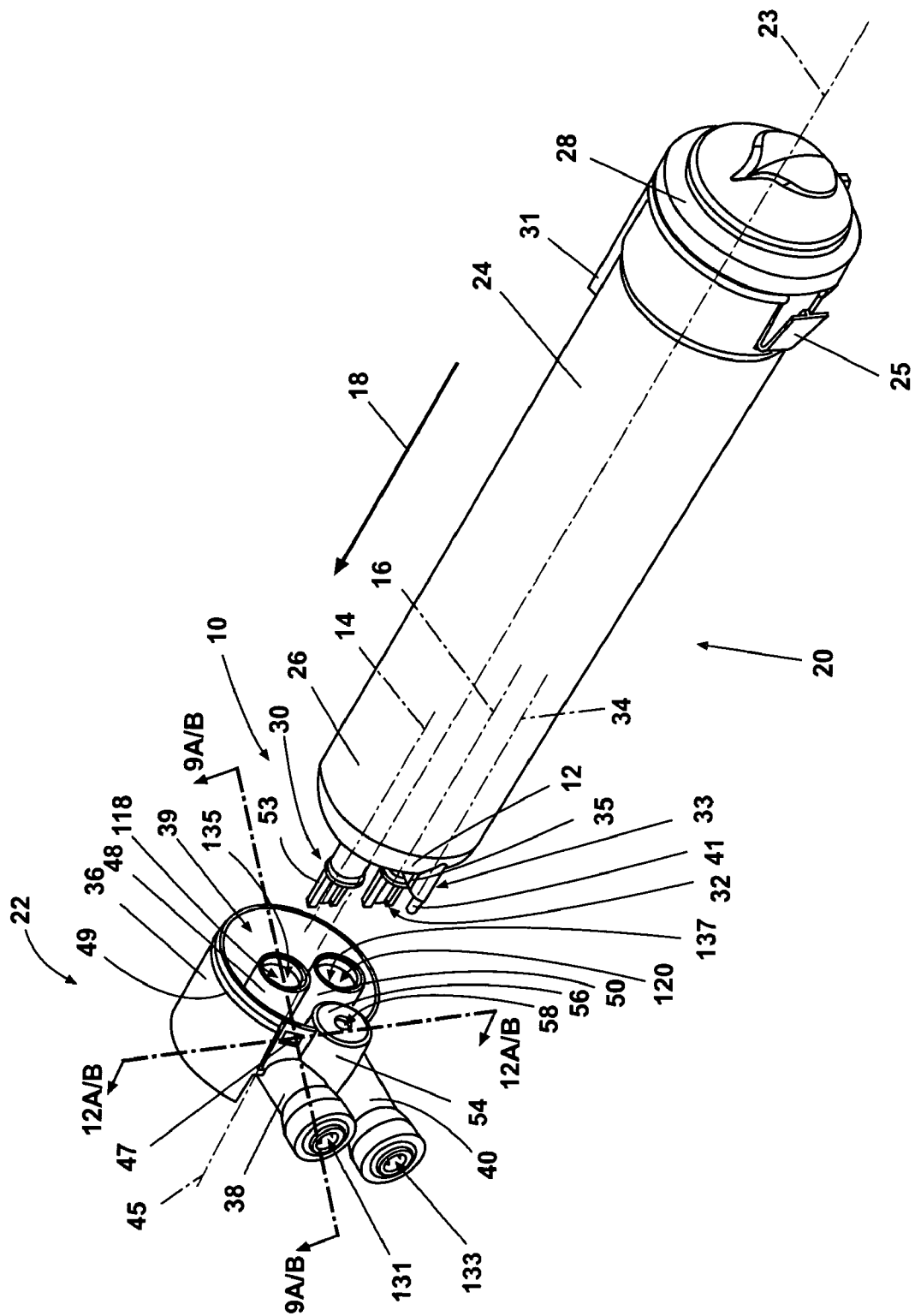
FIG. 1 is an exploded perspective view of a cartridge and a head assembly, the cartridge being aligned for insertion into the head assembly, according to the present invention.
Figure 3:
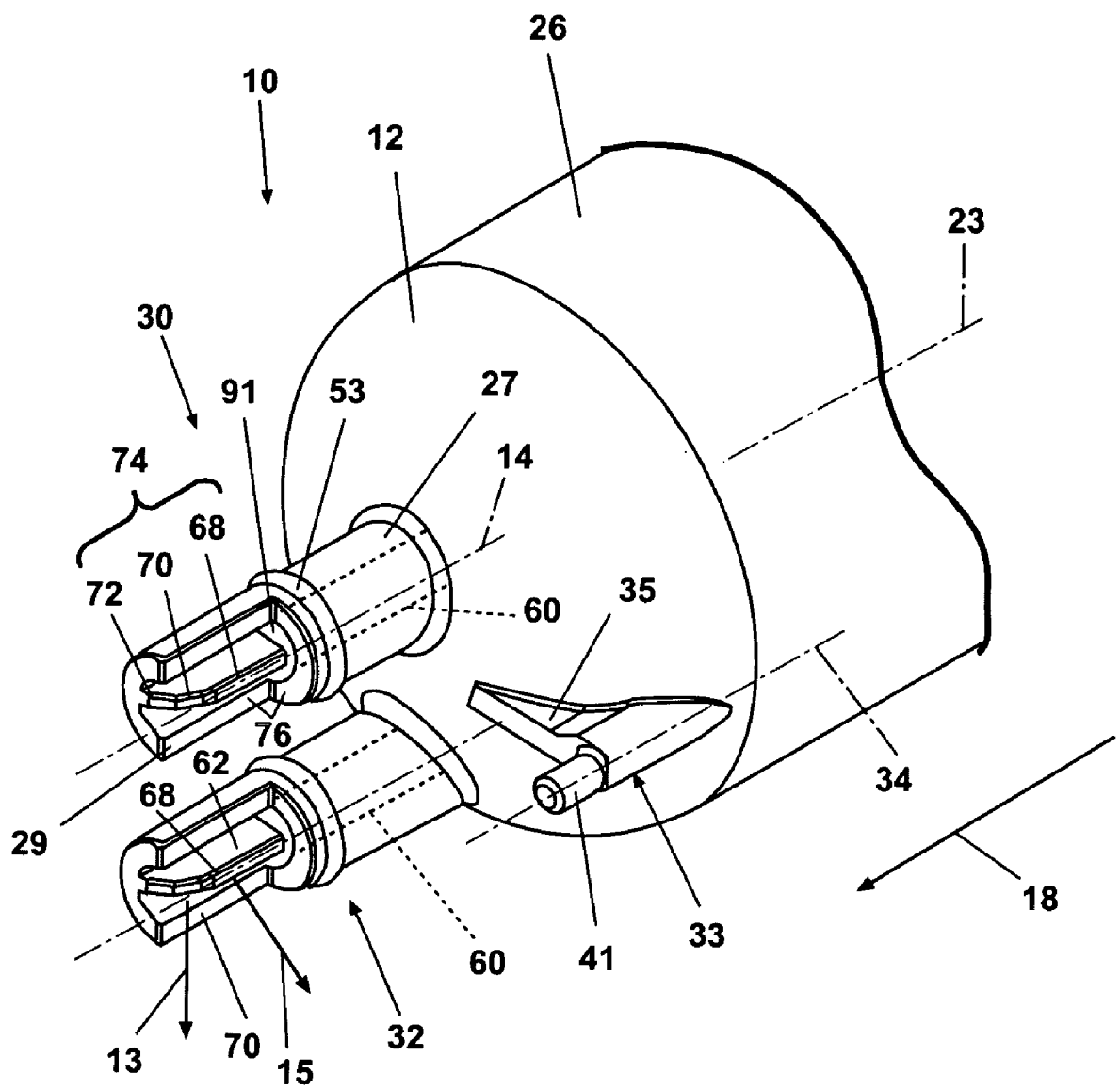
FIG. 3 is a perspective view of the end piece of the cartridge of FIG. 1.

As used herein, the term "longitudinal axis" refers to the axis running along the length and through the center of the referenced object.

As used herein, the term "fluid" refers to a gas or liquid.

As used herein, the term "sealing surface" refers to a surface capable of forming a barrier to the flow of a fluid.

As used herein, the term "distal" refers to the area situated in a direction away from the end piece wall.

As used herein, the term "proximal" refers to the area situated in a direction nearest to the end piece wall.

As used herein, the term "actuate" refers to mechanical action or motion and/or maintaining a position against a force (e.g., moving a follower or holding a follower in an open position).

As used herein, the term "cam surface" refers to the sum of all surfaces that physically touch a follower of a valve for the purpose of actuating the valve.

As used herein, the term "angled" is intended to mean that at least a portion of the cam surface is not parallel with a referenced line or axis. The cam surface or portion thereof might have a constant angle such as present in a straight surface, or a variable angle such as present in a curved surface, or a combination thereof.

As used herein, the term "vector" refers to an imaginary line that is perpendicular to a cam surface or portion thereof and represents the orientation in which the cam surface or portion thereof faces.

As used herein, the term "vectored" refers to a cam surface or a portion thereof having a vector with a radial component some degree from a referenced line or axis (i.e., a vector which at least partially diverges radially some degree from a referenced line or axis). A vectored cam surface radially faces away to some degree from a referenced line or axis (which is generally the longitudinal axis of a fitting). A vectored cam surface or portion thereof can have a vector which extends only in a radial or transverse direction, that is, 90 degrees in relation to the referenced line or axis (herein referred to as "fully vectored") or a vectored cam surface or portion thereof can have a radial or transverse component, that is, greater than about 1 degree and less than about 90 degrees in relation to the referenced line or axis (herein referred to as "partially vectored").

As used herein, the term "leading portion" refers to the first place of contact of a cam surface and a follower of a valve.

Reference will now be made in detail to the present preferred embodiments of the invention, examples of which are illustrated in the accompanying drawings. Numerals with the same last three digits represent the same or similar elements throughout the figures (e.g., 122, 1122, 2122, or 020, 1020, 2020). As will be appreciated, the present invention is directed to cartridges and end pieces thereof that actuate one or more valves and other features on a head assembly into which an end piece is received. A head assembly is typically located in an appliance which utilizes water, such as a refrigerator icemaker or water port, water stand or cooler, clothing washer, faucet, spigot, coffee maker, dishwasher, or any other appliance that might utilize a water treatment cartridge for delivering potable water. Cartridges and end pieces thereof of the present invention can be used with fluids, although liquids such as water are the preferred application. A specific example of the preferred embodiment includes inserting an end piece attached to a cartridge housing containing a water treatment material into a refrigerator having a head assembly so that fluid communication between refrigerator water and the treatment material results in potable (or more potable) water via the treatment of previously untreated water.

Referring to FIGS. 1 and 2-A, B, and C, a cartridge 20 (preferably having a length from about 20 cm, 25 cm, 30 cm to about 35 cm, 40 cm, 45 cm) comprising an end piece 10 connected to a cartridge housing 24 (preferably having a length from about 15 cm, 20 cm, 25 cm to about 30 cm, 35 cm, 40 cm, and preferably having a diameter from about 1 cm, 3 cm, 5 cm to about 10 cm, 13 cm, 15 cm) will now be generally described. The end piece 10 includes an end piece wall 12, an inlet fitting 30, an outlet fitting 32, and a protrusion 33. In the preferred embodiment, the end piece 10 is molded together with the cartridge housing 24 to form a cartridge 20. It should be understood that the end piece 10 may be permanently connected (e.g., molded, adhesively bonded, soldered, welded, hot plate welded, etc.) or releasably connected (e.g., friction fitted, threadably fitted, bolted, screwed, fastened, snap fitted, latched, etc.) to the cartridge housing 24. The end piece 10 may be made of various materials for overcoming pressures within the head assembly 22 including, but not limited to, plastic and polymers thereof, metal and alloys thereof, fiberglass, etc. The cartridge housing 24 may be cylindrical and hollow, having a first end 26 and a closed end 28 opposite the first end 26. The housing 24 may optionally be structurally reinforced by ribs or the like. While the end piece 10 of the preferred embodiment is situated at the first end 26 of the housing 24, it is anticipated that the end piece 10 is not limited to attachment to an end of a cartridge housing (e.g., 24), but may also be inserted, for example, to the end of a commercially available cartridge, discussed infra.

The inlet fitting 30 and the outlet fitting 32 extend from the end piece wall 12 such that the inlet fitting 30 is more in-line with the center axis of the cartridge 20, closer to the center of the end piece wall 12 while the outlet fitting 32 is further from the center axis of the cartridge 20, on the periphery of the end piece wall 12. It is anticipated that the inlet and outlet fittings 30 and 32 may be reversed, or otherwise arranged. That is, the particular configuration of treatment material (not shown) may dictate the placement of the fittings 30 and 32 in any of several configurations. Each fitting 30 and 32 has a longitudinal axis 14 and 16, respectively. The longitudinal axis 14 and 16 of the fittings 30 and 32 may lie together in only one plane. Also, the solid protrusion 33 may have a cylindrical end 41 (preferably having a length from about 0.1 cm, 0.3 cm, 0.5 cm to about 1 cm, 1.5 cm, 2 cm, and preferably having a diameter from about 0.1 cm, 0.2 cm, 0.3 cm to about 0.5 cm, 0.7 cm, 1 cm) extends from near the edge of the end piece wall 12, adjacent to the connection of the end piece 10 and cartridge 20. The protrusion 33 has a longitudinal axis 34. The longitudinal axis 14 of the inlet fitting 30, the longitudinal axis 16 of the outlet fitting 32, the longitudinal axis 34 of the protrusion 33, and the longitudinal axis 23 of the cartridge 20 may be parallel with a line of cartridge 20 insertion 18 into the head assembly 22, as in the preferred embodiment. Further, the protrusion 33 is positioned, relative to a side view along the line of insertion 18 of the end piece 10 (e.g., FIG. 2-C), between the inlet fitting 30 and the outlet fitting 32 (i.e., no part of the protrusion end 41, relative to the side view of FIG. 2-C, exceeds the outer most portion of the inlet or outlet fittings 30 or 32). As shown in FIG. 2-A, the distance L1 (preferably from about 0.2 cm, 0.5 cm, 0.8 cm to about 2 cm, 4 cm, 5 cm) from the longitudinal axis 14 of the inlet fitting 30 to the longitudinal axis 16 of the outlet fitting 32 is less than the distance L2 (preferably from about 0.5 cm, 0.7 cm, 1 cm to about 3 cm, 5 cm, 6 cm) from the longitudinal axis 14 of the inlet fitting 30 to the longitudinal axis 34 of the protrusion 33. Further, as shown in FIG. 2-A, the distance L2 from the longitudinal axis 14 of the inlet fitting 30 to the longitudinal axis 34 of the protrusion 33 is less than the distance L3 (preferably from about 0.7 cm, 1 cm, 1.5 cm to about 3 cm, 6 cm, 7 cm) from the longitudinal axis 16 of the outlet fitting 32 to the longitudinal axis 34 of the protrusion 33. The protrusion 33 extends approximately one half the distance of the fittings 30 and 32 from the end piece wall 12. It is the positioning of the protrusion 33 on the end piece 10 that allows for the protrusion 33 to be rigidly supported by a support bridge 35. While the protrusion 33 of the preferred embodiment is solid, it is anticipated that the protrusion 33 may also be entirely or partially hollow. As will be later discussed, the size and possibilities of different arrangements of the inlet and outlet fittings 30 and 32 and the protrusion 33 contribute to the compactability of the head assembly 22. An outwardly biased latch 25 is disposed on the outer surface of the hollow housing 24 just before the second end 28. The latch 25 is capable of being releasably engaged by an appliance, as described in more detail below. As shown in FIG. 2-A, opposite the latch 25, on the outer surface of the hollow housing 24 are two guide rails 31 which run along the longitudinal axis 23 of the cartridge 20 approximately one quarter the length of the cartridge 20. A treatment material (not shown) is disposed within the interior space of the housing 24 and is in fluid communication with the inlet fitting 30 and the outlet fitting 32.

The treatment material (not shown) can provide a variety of functions as known in the art, including, but not limited to, the removal or neutralization of contaminants such as by size exclusion, electrolysis, absorption, adsorption, oxidation, reduction, chemical disinfection, ion exchange, etc. Examples of contaminants include microorganisms, viruses, bacteria, pathogens, protozoa, organic matter, inorganic material, etc. Also, beneficial additives such as flavorants, vitamins, minerals, nutrients, etc. may also be added. Examples of suitable treatment materials known in the art are described in U.S. Pat. Nos. 2,167,225, 2,335,458, 4,172, 796, 4,493,772, 4,764,274, 4,025,438, 4,094,779, and 6,337, 015. For example, treatment materials may include, but are not limited to, one or a combination of carbon (e.g., activated carbon, such as a tube of porous carbon, or a block of porous carbon, or carbon powder sintered with a plastic binder or the like), ion exchange media (e.g., in the form of resin beads, flat filtration membranes, fibrous filtration structures, etc.), zeolite particles or coatings (e.g., silver loaded), polyethylene, or charge-modified melt-blown or micro-fiber glass webs, alumina, diatomaceous earth, etc. It should be understood that the treatment materials of this invention may comprise other conventional water treatment materials known in the art, including those described in EPO 0 402 661 published Dec. 19, 1990.

Referring to FIGS. 2-A, B, and C and 3, the inlet fitting 30 of the end piece 10 will now be described in greater detail. Since the inlet fitting 30 and the outlet fitting 32 can be similarly configured, as in the preferred embodiment, only the inlet fitting 30 will be described herein. However, it is understood that the same description may be equally applicable to the outlet fitting 32. The inlet fitting 30 (preferably having a length from about 1.5 cm, 2 cm, 2.5 cm to about 3 cm, 4 cm, 5 cm) extends outwardly away from the end piece wall 12 and is cylindrically shaped (preferably having an inside diameter from about 0.3 cm, 0.5 cm, 0.6 cm to about 1 cm, 1.2 cm, 1.5 cm, and preferably having an outside diameter from about 0.5 cm, 0.8 cm, 1.0 cm to about 1.5 cm, 1.8 cm, 2 cm) at its proximal end 27 adjacent the end piece wall 12. A channel 60 runs the length of the inlet fitting 30. The channel 60 meets the cartridge housing 24 such that the inlet fitting 30 is in fluid communication with the interior space of the hollow cartridge housing 24 and thus the treatment material (not shown). The channel 60 has an opening 91 (preferably having a diameter from about 0.3 cm, 0.5 cm, 0.6 cm to about 1 cm, 1.3 cm, 1.5 cm) and an open portion (as used herein, the term "open portion" refers to the portion of a fitting which remains after a portion of it has been cut away and such portion would have, if not cut away, continued to form and define the fitting) 76 (preferably having a length from about 0.5 cm, 0.8 cm, 1 cm to about 2 cm, 3 cm, 4 cm, and preferably having a height from about 0.1 cm, 0.3 cm, 0.5 cm to about 1 cm, 1.5 cm, 2 cm, and preferably having a width from about 0.4 cm, 0.7 cm, 1.0 cm to about 1.5 cm, 2.5 cm, 3 cm) at the distal end 29 of the fitting 30. The open portion 76 is adjacent the protrusion 33, and permits water to easily flow from and to the opening 91. The channel 60 is exposed at the open portion 76. An o-ring 53 (preferably having an outside diameter from about 0.5 cm, 0.8 cm, 1 cm to about 2 cm, 3 cm, 4 cm) encircles the inlet fitting 30 and is placed adjacent the open portion 76, between the open portion 76 and the proximal end 27 of the inlet fitting 30. An actuation wall 62 (preferably having a length from about 0.4 cm, 0.7 cm, 1.0 cm to about 2 cm, 2.5 cm, 3 cm) extends away from the base 64 of the channel 60 of the inlet fitting 30, running along the direction of the longitudinal axis 14 of the inlet fitting 30. The actuation wall 62 has a flat portion 68 (preferably having a length from about 0.1 cm, 0.4 cm, 0.6 cm to about 1.5 cm, 2 cm, 3 cm, and preferably having a height from about 0.1 cm, 0.2 cm, 0.4 cm to about 1 cm, 2 cm, 3 cm, and preferably having a width from about 0.05 cm, 0.1 cm, 0.15 cm to about 0.3 cm, 0.5 cm, 1 cm) and an angled portion 70 (preferably having a length from about 0.1 cm, 0.2 cm, 0.4 cm to about 1 cm, 2 cm, 3 cm, and preferably having a height, at its highest point, from about 0.1 cm, 0.2 cm, 0.4 cm to about 1 cm, 1.5 cm, 2 cm, and preferably having a height, at its lowest point, from about 0 cm, 0.1 cm, 0.2 cm to about 0.5 cm, 1 cm, 1.5 cm, and preferably having a width from about 0.05 cm, 0.08 cm, 0.15 cm to about 0.25 cm, 0.5 cm, 1 cm) between the flat portion 68 and a leading portion 72 (preferably having a height from about 0 cm, 0.1 cm, 0.2 cm to about 0.5 cm, 1 cm, 1.5 cm, and preferably having a width from about 0.05 cm, 0.1 cm, 0.15 cm to about 0.5 cm, 0.8 cm, 1 cm) of the actuation wall 62.

The sum of the leading portion 72, the angled portion 70, and the flat portion 68 together, in this embodiment, form a cam surface 74 which engages a follower (e.g., 71), as described hereafter. The cam surface 74 may include more or less surfaces which physically touch a follower (e.g., 71) for the purpose of actuation. These surfaces may or may not be continuous. In the preferred embodiment, each of the three surfaces (leading portion 72, angled portion 70, and the flat portion 68) have different functions, as discussed more fully hereafter. However, a cam surface (e.g., 74), as defined by this invention, may optionally include a surface having multiple functions to actuate a valve (e.g. 42). For instance, the same surface may move a follower (e.g., 71), opening a valve (e.g., 42), and also hold the follower in place, so that the valve stays open. Also, it should be pointed out that the cam surface 74 of the actuation wall 62 may be angled and/or vectored in relation to the longitudinal axis 14 of the inlet fitting 30, the longitudinal axis 16 of the outlet fitting 32, the longitudinal axis 34 of the protrusion 33, the longitudinal axis 23 of the cartridge 20, and/or the line of insertion 18 of the cartridge 20, as discussed more fully hereafter. As shown in FIGS. 2-B and 3, the angled portion 70 of the cam surface 74 is illustrated with an essentially straight surface which is constantly angled approximately 45 degrees relative to the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20. As is apparent from FIGS. 2-B and 3, angled portion 70 has a vector 13 which has a radial component which extends approximately 45 degrees from the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20. Since the vector 13 of the angled portion 70 has a radial component in relation to the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20, the angled portion 70 of the cam surface 74 is vectored. That is, the angled portion 70 radially faces away from the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20 approximately 45 degrees. Further, as shown in FIGS. 2-B and 3, the flat portion 68 of the cam surface 74 is illustrated with an essentially straight surface which is essentially not angled (that is, essentially parallel) relative to the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20. As is apparent from FIGS. 2-B and 3, flat portion 68 has a vector 15 having a radial component which extends approximately 90 degrees from the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20. Since the vector 15 of the flat portion 68 has a radial component in relation to the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20, the flat portion 68 of the cam surface 74 is vectored. That is, the flat portion 68 radially faces away from the longitudinal axis 14 of the inlet fitting 30, the longitudinal axis 16 of the outlet fitting 32, the longitudinal axis 34 of the protrusion 33, the longitudinal axis 23 of the cartridge 20, and the line of insertion 18 of the cartridge 20 approximately 90 degrees. Further, since the vector 15 of the flat portion 68 is essentially radial only, the flat portion 68 is fully vectored.

The cam surface 74 of the actuation wall 62 contributes to the compactability and mechanical advantage of the invention, each of which is discussed more fully hereafter. The height of the actuation wall 62 is less than the inside diameter of the channel 60 of the inlet fitting 30 in order to provide a less obstructed channel 60 for the fluid to enter. The opening 91 permits a fluid to pass through the channel 60 of the inlet fitting 30 and enter the interior space of the cartridge housing 24. The channel 60 is aligned with the longitudinal axis 23 of the cartridge 20 so that the fluid entering the opening 91 of the inlet fitting 30 flows in a direction of the longitudinal axis 23 of the cartridge housing 24 through the channel 60.

For the purpose of further describing the preferred embodiment, but not for the purpose of limitation, and as shown in FIG. 2-C, the most distal portion of the protrusion end 41 to the most proximal portion of the inlet fitting 30 is preferably a distance (L9) from about 0.5 cm, 0.7 cm, 1.0 cm to about 1.5 cm, 2 cm, 2.5 cm, and the most distal portion of the protrusion end 41 to the most distal portion of the inlet fitting 30 is preferably a distance (L4 through L8) from about 1 cm, 2.0 cm, 2.5 cm to about 4.0 cm, 4.5 cm, 5.0 cm. The most distal portion of the protrusion end 41 to the most proximal portion of the open portion 76 is preferably a distance (L8) from about 0.5 cm, 1.0 cm, 1.5 cm to about 3 cm, 4 cm, 5 cm, and the most distal portion of the protrusion end 41 to the most distal portion of the open portion 76 is preferably a distance (L4 through L8) from about 1 cm, 2 cm, 2.5 cm to about 4 cm, 4.5 cm, 5 cm. The most distal portion of the protrusion end 41 to the most proximal portion of the actuation wall 62 is preferably a distance (L8) from about 0.5 cm 1.0 cm, 1.5 cm to about 3 cm, 4 cm, 5 cm, and the most distal portion of the protrusion end 41 to the most distal portion of the actuating wall 62 is preferably a distance (L4 through L8) from about 1 cm, 2 cm, 2.5 cm to about 4 cm, 4.5 cm, 5 cm. The most distal portion of the protrusion end 41 to the most proximal portion of the flat portion 68 is preferably a distance (L7 through L8) from about 1 cm, 1.5 cm, 2 cm to about 3 cm, 4 cm, 5 cm, and the most distal portion of the protrusion end 41 to the most distal portion of the flat portion 68 is preferably a distance (L6 through L8) from about 1.0 cm, 1.5 cm, 2.0 cm to about 3 cm, 4 cm, 5 cm. The most distal portion of the protrusion end 41 to the most proximal portion of the angled portion 70 is preferably a distance (L6 through L8) from about 1 cm, 1.5 cm, 2 cm to about 3 cm, 4 cm, 5 cm, and the most distal portion of the protrusion end 41 to the most distal portion of the angled portion 70 is preferably a distance (L5 through L8) from about 1.5 cm, 2 cm, 2.5 cm to about 4 cm, 4.5 cm, 5 cm. The most distal portion of the protrusion end 41 to the leading portion 72 is preferably a distance (L5 through L8) from about 1.5 cm, 2.0 cm, 2.5 cm to about 4 cm, 4.5 cm, 5 cm.

While the length of the inlet fitting 30 preferably has a length from about 0.5 cm, 0.8 cm, 1 cm to about 4 cm, 6 cm, 7 cm, it may be at least about 0.5 cm and greater, without limitation, because it is application of this invention which dictates size, and such application may be residential or industrial. The same is true for any physical feature of this invention, including, but not limited to, the channel 60 of the inlet fitting 30, outlet fitting 32, protrusion 33, the opening 91, the open portion 76, the o-ring 53, the actuating wall 62, the cam surface 74, etc.

Figure 4:
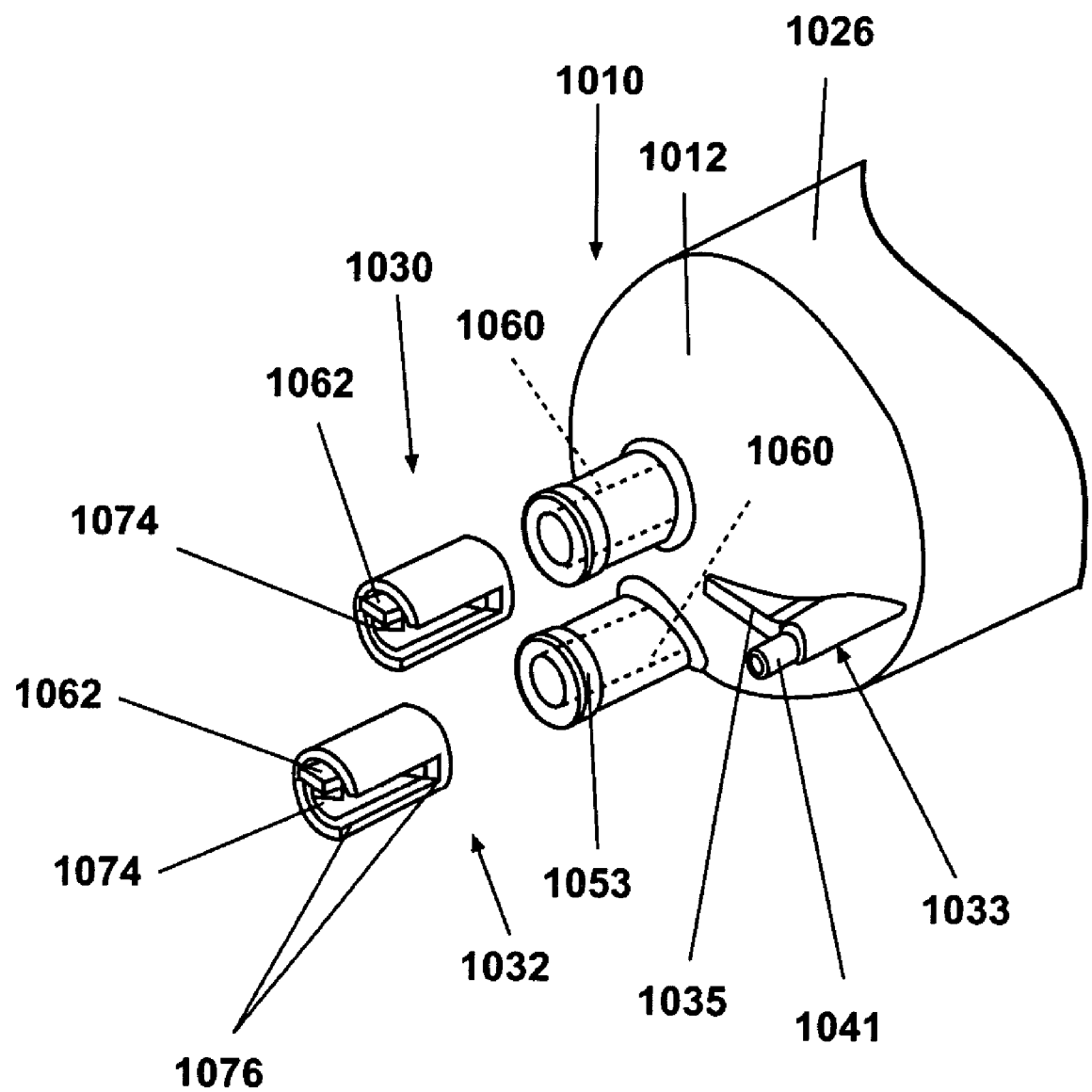
FIG. 4 is a perspective view of an alternative embodiment of the inlet and outlet fittings of the end piece of FIG. 3 showing attachable fittings having a cam surface.
Figure 5:
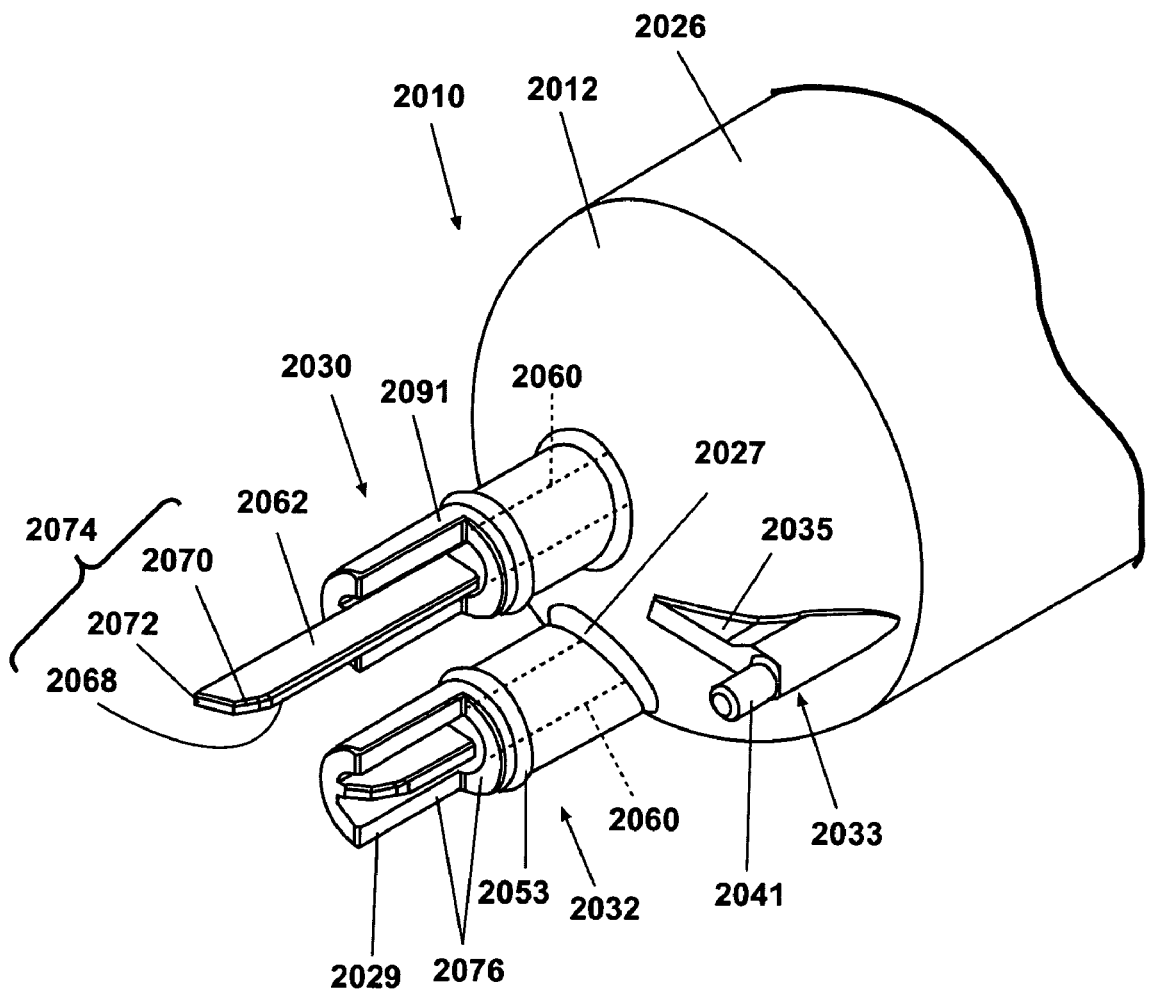
FIG. 5 is a perspective view of an alternative embodiment of the inlet fitting of the end piece of FIG. 3 showing an extended actuation wall having a cam surface.

Further regarding the inlet fitting 30, it should be understood that the inlet fitting 30 may be various lengths for purposes which include controlling the timing of valve (e.g., 42) actuation. Also, the inlet fitting 30 may be various diameters for reasons which include ensuring that the inlet fitting 30 is placed into the correct receiving port housing (e.g., 48 and 50). The inlet fitting 30 need not be circular as the inlet fitting 30 may be any number of various dimensions. Regarding the actuation wall 62 of the inlet fitting 30, the actuation wall 62 height may exceed the inside diameter of the channel 60 of the inlet fitting 30 or, as previously described, the height may be less than the inside diameter channel 60 of the fitting 30. Additionally, the actuation wall 62 may exceed the length of the channel 60 or may occupy only the distal end 29 of the inlet fitting 30. However, it should be understood that there should be enough actuation wall 62, and more particularly, cam surface 74, both in height, length, and width, to actuate a valve (e.g., 42). Additionally, regarding the open portion 76 in relation to the actuation wall 62, the open portion 76 may be more open than closed, or may be more closed than open (see also FIG. 4, page 15). However, it should be understood that enough of the actuation wall 62 should be exposed by the open portion 76 so that physical contact between the follower (e.g., 71) and the cam surface 74 of the actuation wall 62 can occur to facilitate actuation of the valve (e.g., 42). Alternatively, the actuation wall 62 may extend from the outside of the inlet fitting 30 instead of from the base 64 the channel 60 of the inlet fitting 30, eliminating a need for an open portion 76. Additionally, as shown in FIG. 5, the actuation wall 2062 may extend beyond the inlet fitting 2030. The cam surface 74 of the actuation wall 62 may be angled in relation to the longitudinal axis 14 of the inlet fitting 30, the longitudinal axis 16 of the outlet fitting 32, the longitudinal axis 34 of the protrusion 33, and/or the longitudinal axis 23 of the cartridge 20 (preferably having an angle from about degree, 10 degrees, 15 degrees, to about 40 degrees, 60 degrees, 90 degrees). Also, the cam surface 74 of the actuation wall 62 may be vectored in relation to one or more of the longitudinal axis 14 of the inlet fitting 30, the longitudinal axis 16 of the outlet fitting 32, the longitudinal axis 34 of the protrusion 33, and/or the longitudinal axis 23 of the cartridge 20 (preferably vectored from about 1 degree, 10 degrees, 15 degrees, to about 40 degrees, 60 degrees, 90 degrees) such that cam surface 74, or portion thereof, may be partially or fully vectored. In the preferred embodiment, width and length of the angled portion 70 of the actuation wall 62, between the leading portion 72 and the flat portion 68, may vary, as well as the degree which the angled portion 70 is angled and/or vectored from the longitudinal axis 14 of the inlet fitting 30, the longitudinal axis 16 of the outlet fitting 32, the longitudinal axis 34 of the protrusion 33, the longitudinal axis 23 of the cartridge 20, and/or the line of insertion 18, as long as the cam surface 74 of the actuation wall 62 adequately contacts a follower (e.g., 71) to facilitate actuation of a valve (e.g., 42) in an essentially orthogonal actuation motion 19 relative to the longitudinal axis 14 of the inlet fitting 30, the longitudinal axis 16 of the outlet fitting 32, the longitudinal axis 34 of the protrusion 33, the longitudinal axis 23 of the cartridge 20, and/or the line of insertion 18.

As mentioned earlier, the cam surface 74 of the actuation wall 62 contributes to the compactability of the head assembly 22. That is, the essentially orthogonal actuation motion 19 caused by the cam surface 74 of the actuation wall 62 allows for inlet and outlet passageway housings (e.g., 38 and 40) and inlet and outlet valves (e.g., 42 and 44) to be positioned essentially perpendicular to the line of insertion 18 of the cartridge 20. Such positioning allows for a head assembly (e.g., 22) to be shorter in length (the distance in-line with the line of insertion 18 of the cartridge 20) because a head assembly (e.g., 22) needs only to be a length sufficient to accommodate receiving port housings (e.g., outlet fitting and inlet fitting receiving port housings 48 and 50) which contain only a portion of a follower (e.g., 71). Receiving port housings (e.g., outlet fitting and inlet fitting receiving port housings 48 and 50) can be much shorter in length than a valve (e.g., inlet and outlet valves 42 and 44). Thus, the result of positioning of valves (e.g., 42 and 44), passageway housings (e.g., 38 and 40), and the port housings (e.g., 48 and 50) allows for a longer cartridge per fixed distance. Thus, when the compact orientation of a head assembly (e.g., 22) is discussed, it should be kept in mind that the cam surface 74 of the actuation wall 62 is responsible, in part, for allowing the particular orientation of a head assembly (e.g., 22).

Figure 9B:
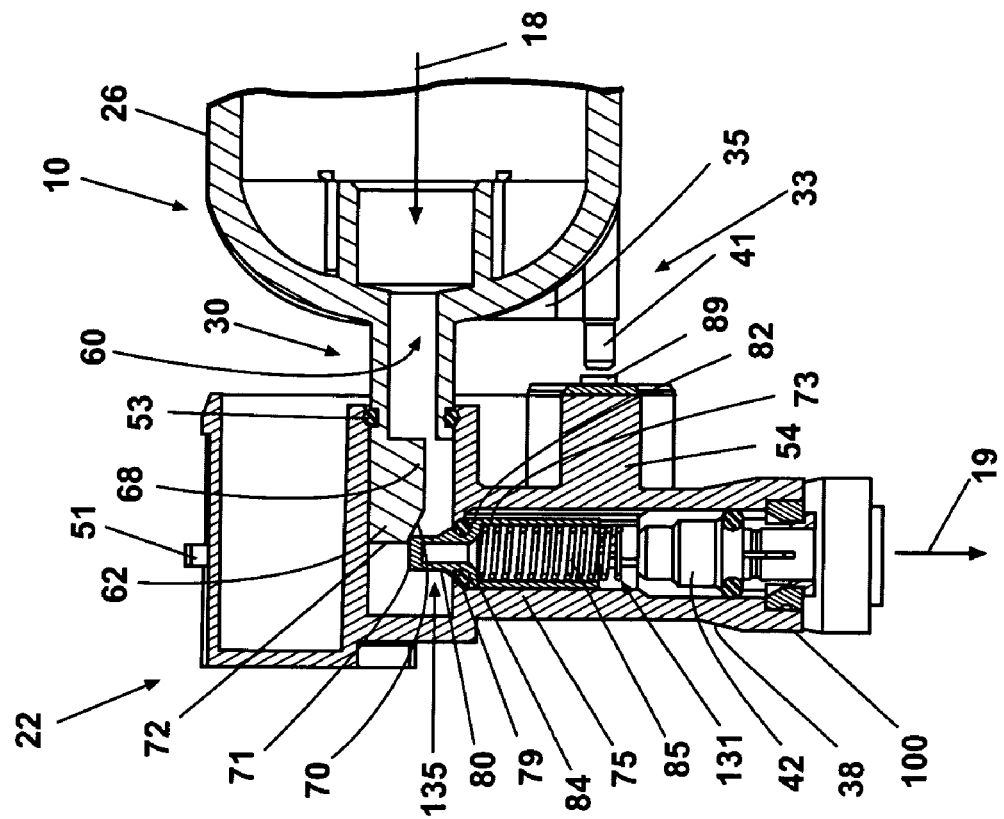
FIG. 9-A is a cross sectional top view of the head assembly and fully inserted end piece of the cartridge of FIG. 1 taken along line 9A/B—9A/B thereof, wherein the inlet valve is actuated and shown in the open position.
Figure 9A:
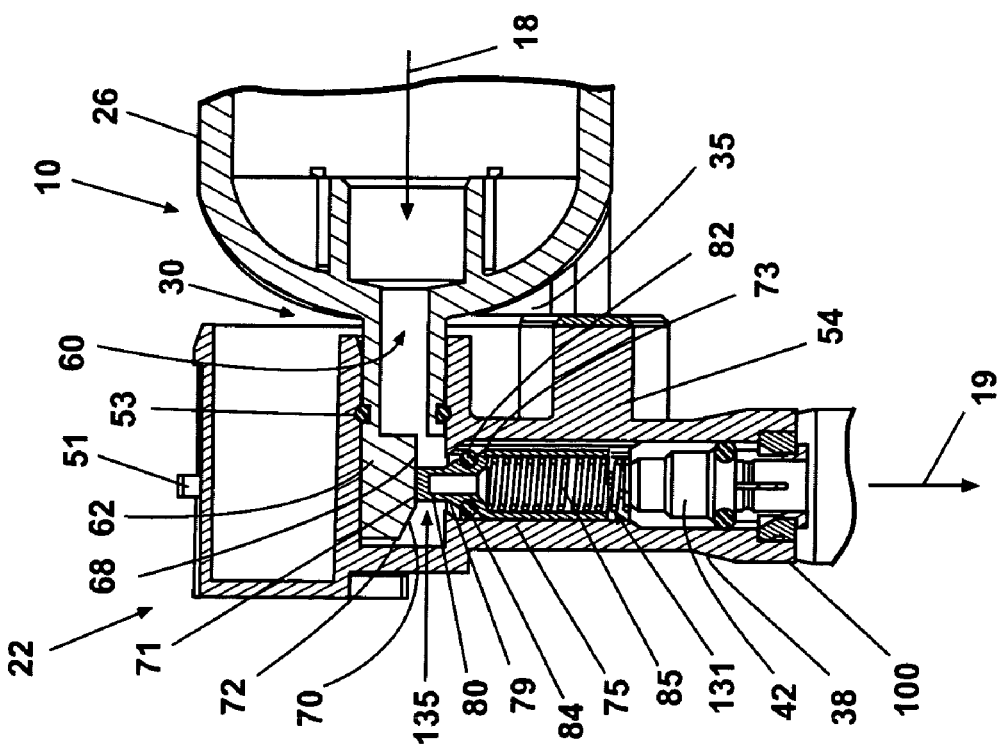

While the preferred embodiment discloses a cam surface (e.g., 74) on a wall (e.g., 62) that begins contact with a follower (e.g., 71) via a leading (e.g., portion 72) and maintains contact with a fully inserted end piece (e.g., 10) via a flat portion (e.g., 68) as shown in FIG. 9-A, it should be understood that an actuation wall (e.g., 62) need not include a flat portion (e.g., 68), and may maintain actuating contact with a follower (e.g., 71) via, for instance, an angled portion (e.g., 70).

Figure 6:
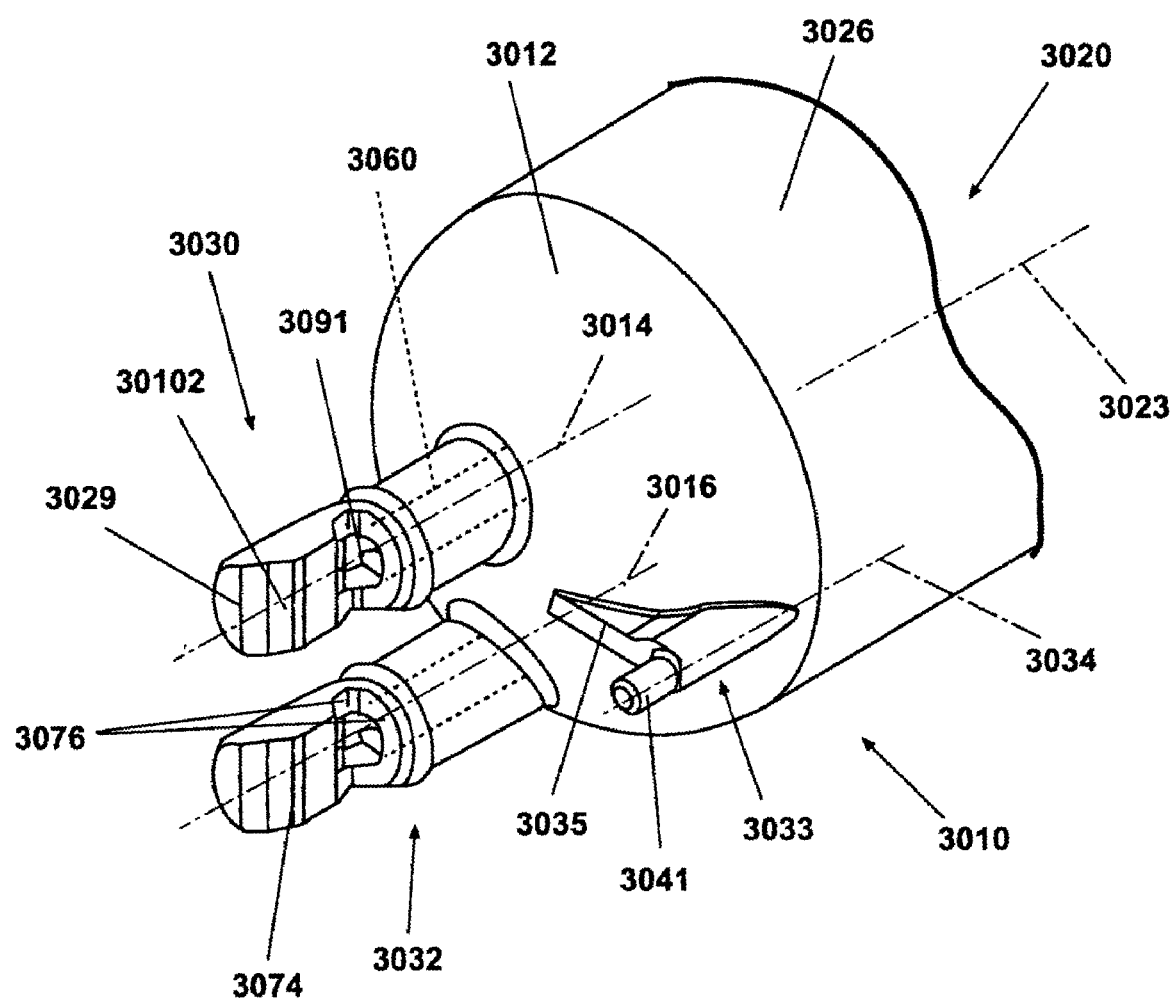
FIG. 6 is a perspective view of an alternative embodiment of the inlet and outlet fittings of the end piece of FIG. 3 showing the cam surface as a curved face.
Figure 7:
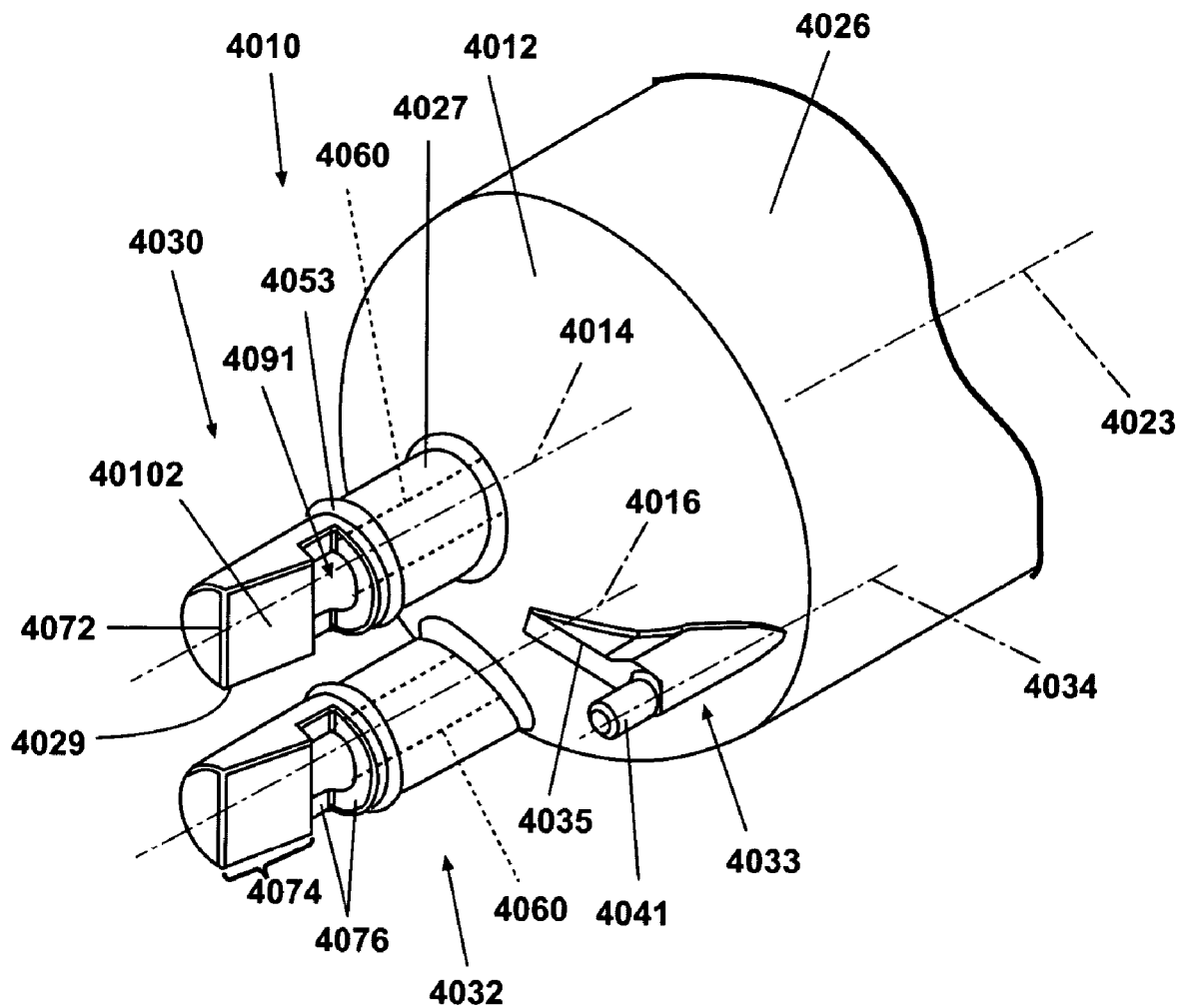
FIG. 7 is a perspective view of an alternative embodiment of the inlet and outlet fittings of the end piece of FIG. 3 showing the cam surface as a planar face.
Figure 8:
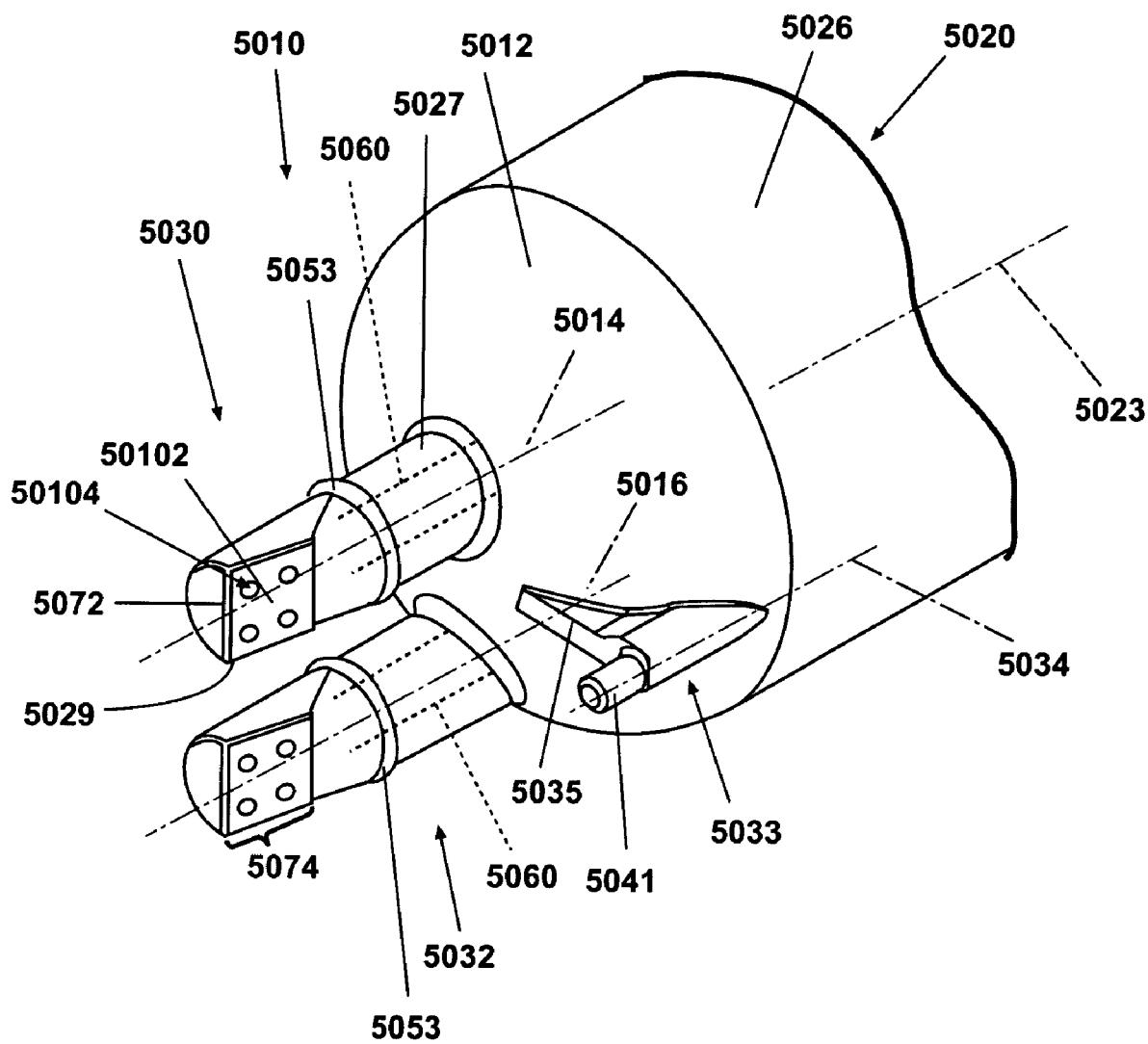
FIG. 8 is a perspective view of an alternative embodiment of the inlet fitting of the end piece of FIG. 3 showing openings on a planar face of a cam surface.

Alternatively, as shown in FIG. 6, in place of using an upstanding actuation wall (e.g., 62), the distal end 3029 of the inlet fitting 3030 may be angled and/or vectored (in relation to the longitudinal axis 3014 of the inlet fitting 3030, the longitudinal axis 3016 of the outlet fitting 3032, the longitudinal axis 3034 of the protrusion 3033, and the longitudinal axis 3023 of the cartridge 3020 (partially shown)) from the leading portion 3072 toward the proximal end to a height and length appropriate for contacting a follower (e.g., 71) such that a face 30102 having a cam surface 3074 is formed (also illustrated in FIGS. 7 and 8). Like the actuation wall 62 described above, it is understood that the cam surface 3074 of the face 30102 may consist of surfaces that are at variable angles (even to the point of forming a curve or circle). In such an alternate embodiment, it is understood that the cam surface 3074 would include the sum of the portions of the face 30102 which contact a follower (e.g., 71) for the purpose of actuation. Also, in such an embodiment, the open portion 3076 may encompass a determined space between the distal end 3029 of the inlet fitting 3030 and the o-ring 3053 of the inlet fitting 3030. It is evident that the open portion 3076 may be various sizes, opening in any direction, as long as fluid communication is achieved between the channel 3060 and a port (e.g., 135).

As shown in FIG. 8, it is further anticipated that, in the event that the inlet fitting 5030 has a face (e.g., 50102) without an open portion (e.g., 76), there may be one or more openings 50104 through the face 50102 of the inlet fitting 5030. The openings 50104 would pass through the inlet fitting 5030 such that fluid communication with the channel 5060 of the inlet fitting 5030 would be achieved. Also, as shown in FIG. 4, it is anticipated that the fittings 1030 and 1032 which have a cam surface (e.g., 1074) may be separately attachable, in a retrofit manner, to a portion of the end piece 1010 not capable of actuating valves (e.g., 42 and 44) of a particular head assembly (e.g., 22). FIG. 4 also illustrates that when the cam surface 1074 is on a wall 1062, only a narrow open portion 1076 is required to allow for contact between a follower (e.g. 71) of valves (e.g., 42 and 44) and the cam surface 1074 of the fittings 1030 and 1032. Further, it is anticipated that an end piece (e.g., 10) may be made up of any combination or number of inlet or outlet fittings or protrusions (e.g., 30, 32, and 33) which may be extending in the same direction.

Figure 19:
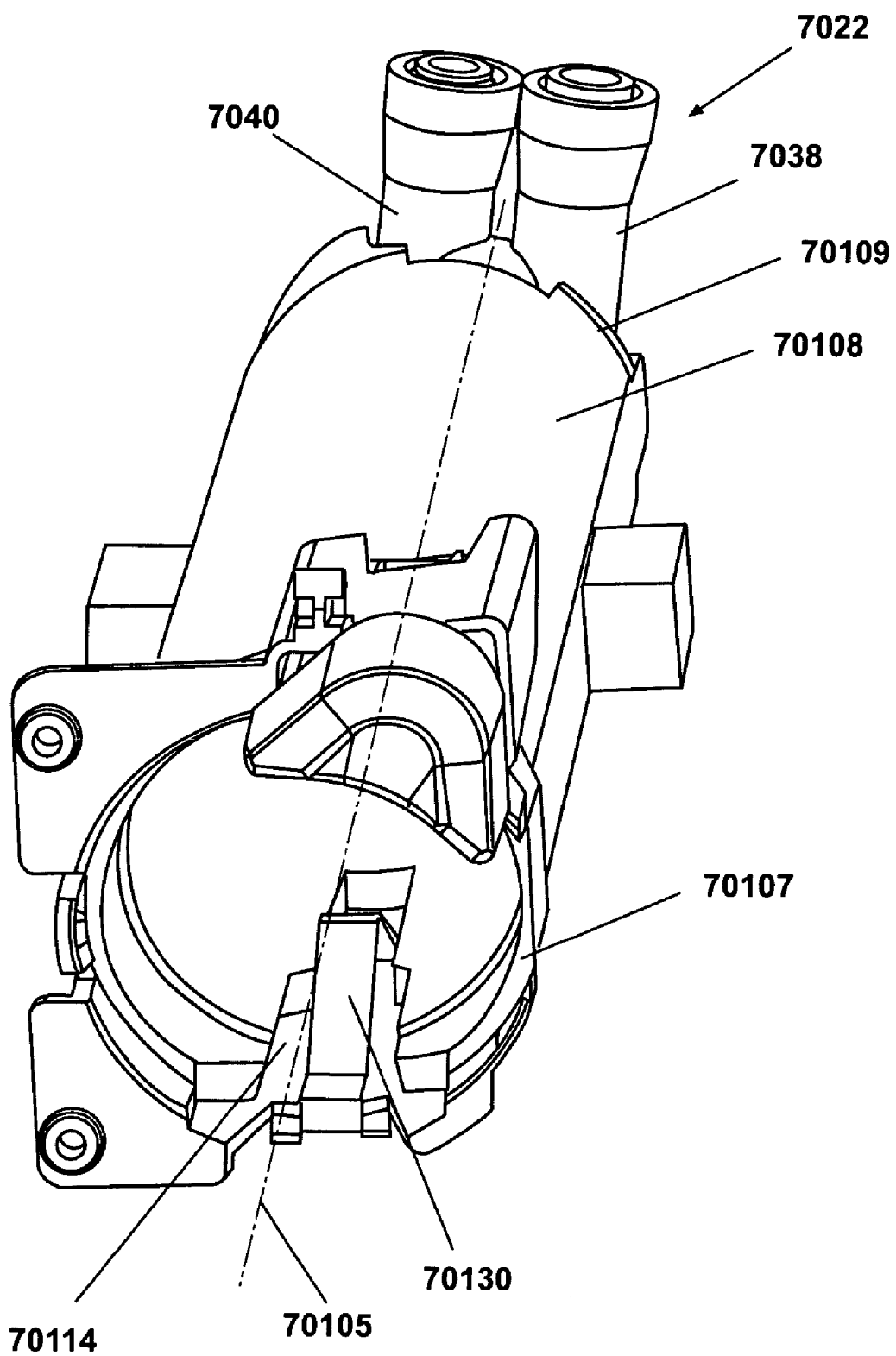
FIG. 19 is a perspective view of and alternate embodiment of the appliance casing of FIGS. 14-A and 14-B without the cartridge, wherein the appliance casing further includes a friction spring.

Referring to FIGS. 1 and 10, the head assembly 22, into which the end piece 10 of the cartridge 20 inserts, will now be generally described. The head assembly 22 includes a cylindrical head assembly housing 36 having a closed end 37 and an open end 39. Referring to FIG. 10, a cylindrical inlet passageway housing 38 and a cylindrical outlet passageway housing 40 join the outer surface of the head assembly housing 36 at the closed end 37, penetrating to the inner surface of the head assembly housing 36. Thus, the passageway housings 38 and 40 are partially inside and partially outside the head assembly housing 36. The passageway housings 38 and 40 form inlet and outlet passageways 131 and 133, respectively. While in the preferred embodiment the outlet passageway housing 40 extends from head assembly 22 a greater distance than the inlet passageway housing 38, it should be understood that the inlet passageway housing 38 may extend further than the outlet passageway housing 40, or the two may be the same length (as shown in FIG. 19). As shown in FIGS. 1 and 10, the head assembly 22 contains a cylindrical inlet fitting receiving port housing 48 (preferably having a length from about 1 cm, 1.5 cm, 2 cm, to about 4 cm, 4.5 cm, 5 cm, and preferably having an inner diameter from about 0.5 cm, 0.7 cm, 1 cm to about 2 cm, 2.5 cm, 3 cm, and preferably having an outer diameter from about 0.5 cm, 0.7 cm, 1 cm, to about 2.5 cm, 3 cm, 4 cm) and a cylindrical outlet fitting receiving port housing 50 (preferably having a length from about 1 cm, 1.5 cm, 2 cm to about 4.0 cm, 4.5 cm, 5 cm, and preferably having an inner diameter from about 0.5 cm, 0.7 cm, 1 cm to about 2 cm, 2.5 cm, 3 cm, and preferably having an outer diameter from about 0.5 cm, 1 cm, 1.5 cm to about 2.5 cm, 3 cm, 4 cm), each having an open end 118 and 120, respectively, and a closed end 122 and 124, respectively. The receiving port housings 48 and 50 form inlet and outlet receiving ports 135 and 137, respectively. Wholly within the head assembly housing 36, the inlet and outlet receiving port housings 48 and 50 and receiving ports 135 and 137 run along the longitudinal axis 45 of the cylindrical head assembly housing 36, meeting, but not penetrating the inner surface of the closed end 37 of the head assembly housing 36. Thus, the receiving port housings 48 and 50, and receiving ports 135 and 137 run perpendicular to the passageway housings 38 and 40, and passageways 131 and 133.

As shown in FIGS. 9-A and 9-B, the receiving port housing 48 and the passageway housing 38 meet, such that the inlet passageway 131 and the inlet receiving port 135 are in fluid communication via a receiving port/passageway opening 79. As shown in FIG. 10, the head assembly housing 36, between the passageway housings 38 and 40 and the open end 39, is slotted 47 through the outer and inner surfaces in two places to meet and surround appliance housing projections in a snap-fit manner (not shown). The outer surface of the head assembly housing 36 also has an encircling raised rim 49 adjacent the open end 39 for friction-fit attachment to an appliance. Further, as shown in FIG. 11, the outer surface of the housing 36 has a rectangular projection 51 opposite the passageway housings 38 and 40, between the closed and open ends 37 and 39 of the assembly housing 36, for attachment to an appliance. The portion of cylindrical assembly housing 36 defined by the space from the point of joining of the passageway housings 38 and 40 to the housing 36 and the point of joining of the receiving port housings 48 and 50 to the housing 36, to the closed end 37 may be cut away as shown in FIG. 10.

As shown in FIGS. 9-A and 9-B, the inlet passageway housing 38 has an inlet valve 42 slidably disposed therein. Also, the outlet passageway housing 40 has an outlet valve 44 slidably disposed therein (not shown). The valve 42 is biased to a closed position when an end piece 10 is not fully inserted into the head assembly 22. As shown in FIG. 1, the receiving port housings 48 and 50, and receiving ports 135 and 137 are sized and arranged to receive the cartridge inlet and outlet fittings 30 and 32, respectively, so that the fittings 30 and 32 can open the inlet and outlet valves 42 and 44, as discussed more fully hereafter. Because the receiving ports 135 and 137 are arranged approximately 90 degrees to their respective inlet and outlet passageways 131 and 133, insertion of the inlet and outlet fittings 30 and 32 into the receiving ports 135 and 137, respectively, actuates the inlet and outlet valves 42 and 44, respectively, in a direction approximately 90 degrees to the direction or line of insertion 18 of the fittings 30 and 32.

Regarding the orientation of the inlet and outlet valves 42 and 44 and as discussed earlier, the positioning of the inlet and outlet fittings 30 and 32 allows for the head assembly 22 to be compactly designed. That is, relative to the line of insertion 18 of the cartridge 20, the length (distance in-line with the line of insertion 18 of the cartridge 20) of the head assembly 22 needs only to be adjusted for a portion of a follower (e.g., 71) of one valve (e.g., 42), not two valves, because one valve may be positioned directly above or below another, in a stacked orientation. In the preferred embodiment, relative to the line of cartridge 20 insertion 18, the inlet valve 42 housed within the inlet passageway housing 38 is directly above the outlet valve 44 housed within the outlet passageway housing 40. Thus, relative to the line of cartridge 20 insertion 18, the head assembly 22 can be shorter in length, allowing the cartridge 20 to be longer, further allowing more treatment material (not shown) to be in the cartridge 20, ultimately providing for better treatment of water.

Referring to FIGS. 9-A, 9-B, and 13, the inlet and outlet valves 42 and 44 will now be described in greater detail. Since the inlet valve 42 and the outlet valve 44 are similarly configured, only the inlet valve 42 will be described herein although it is understood that the same description may be equally applicable to the outlet valve 44. The inlet valve 42 includes an o-ring 84, a cylindrical check valve 80, a spring 85, a cylindrical tube stop 86, and a fitting 88. The fitting 88 includes a coupler 94, a stationary ring 92 and an o-ring 90. The o-ring 84 encircles a cylindrical follower 71 (preferably having a length from about 0.1 cm, 0.2 cm, 0.3 cm to about 1 cm, 2 cm, 3 cm, and preferably having a diameter from about 0.1 cm, 0.2 cm, 0.3 cm to about 1 cm, 2 cm, 3 cm) of the check valve 80 at a shoulder 82 of the check valve 80. When in a closed position, preferably from about 0.1 cm, 0.2 cm, 0.3 cm to about 1.0 cm, 2 cm, 3 cm of the follower 71 of the check valve 80 is biased into the inlet receiving port 135 through the port/passageway opening 79 by a first end 75 of the spring 85 which is in contact with a second end 73 of the check valve 80 (such that the most distal portion of the follower 71 is preferably from about 0.1 cm, 0.2 cm, 0.3 cm, to about 1 cm, 2 cm, 3 cm from the most proximal portion of the inlet receiving port housing 48), leaving the o-ring 84 to be biased against the inlet passageway housing 38 by the shoulder 82 of the check valve 80 as the port/passageway opening 79 is of a diameter to allow the passage of the follower 71 of the check valve 80, but not of a diameter to allow the passage of the o-ring 84. The follower 71 may occupy the inlet receiving port 135 to varying degrees, as long as the follower 71 is able to be actuated by the cam surface 74 of the actuation wall 62 of the inlet fitting 30, discussed more fully below.

A second end 77 of the spring 85 is in contact with a first end 81 of the tube stop 86. A second end 83 of the tube stop 86 is in contact with the o-ring 90 of the fitting 88. The o-ring 90 is in contact with a first end 96 of the coupler 94 and the coupler 94 is in contact with the stationary ring 92 such that the stationary ring 92 is fixed to the inside of an appliance connecting end 100 of the inlet passageway housing 38 and neither the first end 96 of the coupler 94 can fit through the stationary ring 92, nor can a second end 98 of the coupler 94. However, a body 95 of the coupler 94 can slide between the first and second ends 96 and 98 when encircled by the stationary ring 92. Thus, the stationary ring 92 securely and operably contains the other parts of the inlet valve 42 in the inlet passageway housing 38. More specifically, the spring 85 biases both the follower 71 into the inlet receiving port 135 and biases the first end 96 of the coupler 94 against the stationary ring 92. Because the spring 85 acts to bias both the first end 96 of the coupler 94 and the follower 71 of the check valve 80, when either the second end 98 of the coupler 94 or the follower 71 of the check valve 80 is forced toward the other, the bias increases.

As previously mentioned, the inlet receiving port housing 48 and inlet receiving port 135 are sized to receive the inlet fitting 30 when the end piece 10 is inserted into the head assembly 22. As shown in FIG. 9-B, the inlet valve 42 remains in a closed position, such that the follower 71 of the check valve 80 is biased into the inlet passageway 131 by the first end 75 of the spring 85 which is in contact with the second end 73 of check valve 80 such that the follower 71 of the check valve 80 is biased through the port/passageway opening 79 to the inlet receiving port 135, leaving the o-ring 84 to be biased against the inlet passageway housing 38. When in the closed position, the check valve shoulder 82 and o-ring 84 blocks the port/passageway opening 79 so that the inlet receiving port 135 and the inlet passageway 131 are not in fluid communication with each other. In other words, when the appliance does not have the end piece 10 inserted, the inlet valve 42 is in a closed position such that fluid cannot circulate from the inlet passageway 131 to the inlet receiving port 135 through the port/passageway opening 79.

As shown in FIG. 9-A, when the end piece 10 is fully inserted into the head assembly 22, the inlet fitting 30 is directed into the inlet receiving port housing 48 such that the leading portion 72 of the actuation wall 62 first touches the follower 71 of the check valve 80, then, as cartridge 20 insertion continues, the angled portion 70 of the actuation wall 62 forces the follower 71 toward the appliance connecting end 100 of the inlet passageway housing 38 such that the check valve 80 moves perpendicular to the line of insertion 18 of the end piece 10. The cartridge 20 continues to be inserted such that the follower 71 moves along angled portion 70 to the flat portion 68 of the actuation wall 62 of the inlet fitting 30. Forcing the follower 71 of the check valve 80 toward the appliance connecting end 100 of the inlet passageway housing 38 relieves the bias upon the o-ring 84 such that the port/passageway opening 79 is opened. It is apparent that the leading portion 72, the angled portion 70, and the flat portion 68 each have different functions. That is, the leading portion 72 is the first surface to physically contact the follower 71, beginning the process of actuation of the valve 42, the angled portion 70 is responsible for moving the follower 71, forcing the valve 42 to an open position, and the flat portion is responsible for holding the follower 71 so that the valve 42 remains in an open position. As mentioned earlier, it is within the scope of this invention that a cam surface (e.g., 74) may comprise only a single surface that first contacts, moves, and holds open a follower (e.g., 71). When in the open position, the port/passageway opening 79 is open such that fluid communication between the inlet receiving port 135 and the inlet passageway 131 is allowed. In other words, when the appliance does have the end piece 10 fully inserted, the inlet valve 42 is in an open position such that fluid is free to circulate from the inlet passageway 131 to the inlet receiving port 135.

As mentioned earlier, the cam surface 74 of the actuation wall 62 contributes to the mechanical advantage of this invention. As mentioned, the spring 85 exerts a force to bias follower 71 into the receiving port 135 at a vector perpendicular to the line of cartridge 20 insertion 18. In order to overcome the force of the spring 85 with an object having an opposite vector, it would take slightly greater force than the force exerted by the spring 85. Thus, in order to move the follower 71 (so that the valve 42 is in an open position) with an object having an opposite vector to the spring 85, such would require a force slightly greater than that which is exerted by the spring 85. However, it is possible, according to this Invention, to overcome the force exerted by the spring 85 with less force than that exerted by the spring 85 by applying a force which has a perpendicular vector to that of the spring 85. Thus, because the cam surface 74 enables one to actuate the valve 42 by inserting the cartridge 20 at a vector perpendicular to the vector of the spring 85, a mechanical advantage is gained.

Though the inlet and outlet fittings 30 and 32 are similarly configured in the preferred embodiment, it is understood that the outlet fitting 32 need not have a cam surface (e.g., 74). Likewise, though the inlet and outlet valves 42 and 44 are similarly configured in the preferred embodiment, the outlet valve 44 need not be actuated via a fitting (e.g., 30) having a cam surface (e.g., 74). Thus, it is anticipated that the outlet valve 44 may be, for example, actuated by pressure from fluid emitted from an outlet fitting (e.g., 32) which does not have a cam surface (e.g., 74). Additionally, the end piece 10 may include one or more inlet fittings (e.g., 30) in combination with or without one or more outlet fittings (e.g., 32) or protrusions (e.g., 33).

Optionally, as shown in FIG. 1, a cylindrical bypass passageway housing 54 may join the outer surface of the head assembly housing 36 of the head assembly 22, running along the longitudinal axis 45 of the housing 36, penetrating to the inner surface of the housing 36. The bypass passageway housing 54 forms a bypass passageway 139. Thus, the bypass passageway housing 54 and passageway 139 is partially inside and partially outside the head assembly housing 36. Further, the bypass passageway housing 54 and passageway 139 are positioned to perpendicularly meet the inlet and outlet passageway housings 38 and 40, and passageways 131 and 133, cylindrically tapering between the passageway housings 38 and 40.

Figure 12A:
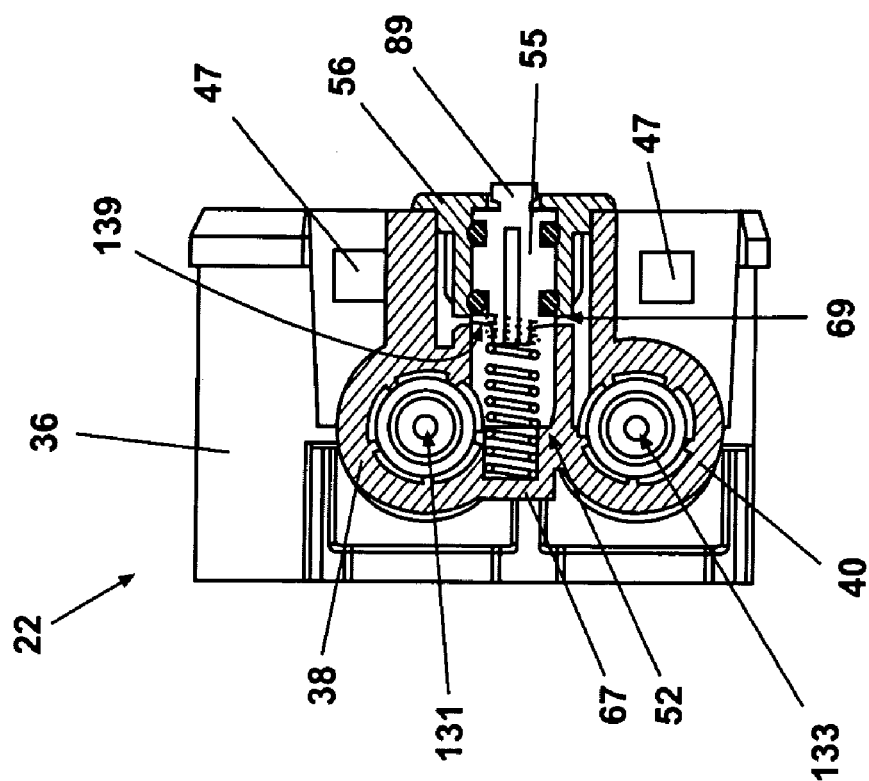
FIG. 12-A is a cross sectional view of the bypass valve of the head assembly of FIG. 1 taken along line 12A/B—12A/B thereof, wherein the bypass valve is shown in the closed position.
Figure 12B:
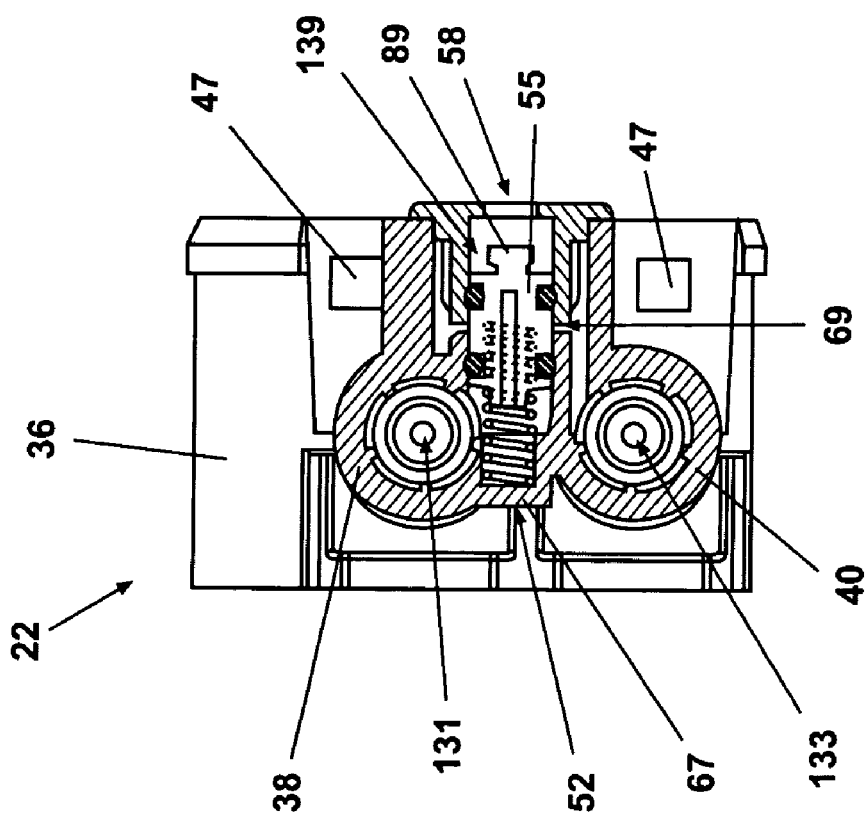
Figure 13:
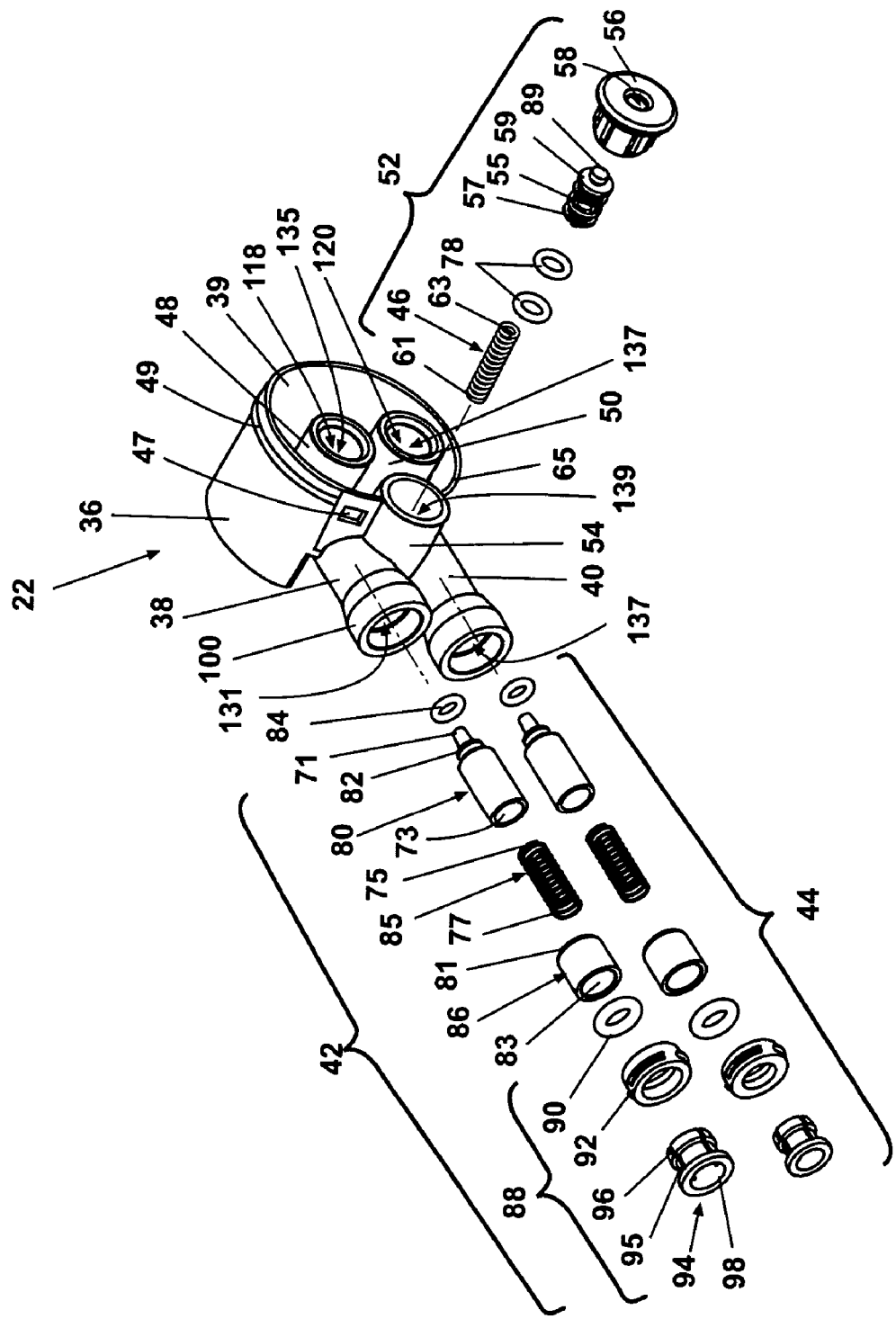
FIG. 13 is an exploded perspective view of the head assembly of FIG. 1.

As shown in FIGS. 12A and B, the bypass passageway 139 and the inlet and outlet passageways 131 and 133 are in fluid communication via a bypass channel 69. Thus, the bypass channel 69 places the bypass passageway 139 in fluid communication with both the inlet and outlet passageways 131 and 133, as well as placing the inlet passageway 131 and the outlet passageway 133 in untreated fluid communication with each other, which will be discussed more fully hereafter. Further regarding the positioning of the bypass passageway housing 54 and passageway 139, the bypass passageway housing 54 and passageway 139 are parallel to the receiving port housings 48 and 50, and receiving ports 135 and 137. However, the bypass passageway 139 and the receiving ports 135 and 137 do not meet. Further, the positioning of the bypass passageway housing 54 and passageway 139 is such that the passageway housing 54 and passageway 139 slightly extends beyond the open end 39 of the housing 36 of the head assembly 22 and are between the slots 47, as shown in FIGS. 12A and B. A bypass valve 52 can be slidably provided within bypass passageway housing 54. As shown in FIG. 13, a retainer 56 retains the bypass valve 52 within the bypass passageway housing 54. A spring 46 biases the bypass valve 52 to an open position (FIG. 12-B) when the end piece 10 is not mated with the head assembly 22. An opening 58 within the retainer 56 is sized to receive the protrusion end 41 in order to close the bypass valve 52 when the end piece 10 is mated with the head assembly 22, as discussed more fully hereafter. Thus, the bypass passageway 139, the inlet receiving port 135, and the outlet receiving port 137 are aligned parallel to each other and are also aligned with the direction in which the end piece 10 is inserted into the head assembly 22.

Regarding the orientation of the bypass valve 52 and as discussed earlier, the positioning of the bypass valve 52 (being between the inlet and outlet fittings 30 and 32, and the most distal portion of the protrusion 33 being proximal to the most distal portion of the fittings 30 and 32) allows for the head assembly 22 to be compactly designed. That is, relative to the line of insertion 18 of the cartridge 20, the height (vertical distance perpendicular to the line of insertion 18) of the head assembly 22 needs only to be adjusted for two valves, not three valves. That is, when a bypass valve (e.g., 52) is used, as in the preferred embodiment, the placement of the bypass valve 52 adjacent to and between the inlet and outlet valves 42 and 44 contributes to compactability. That is, relative to the line of insertion 18 of the cartridge 20, the height of the head assembly 22 needs only to accommodate the inlet valve 42 housed within the inlet passageway housing 38 and the outlet valve 44 housed within the outlet passageway housing 40, in a stacked orientation. Thus, relative to the line of cartridge 20 insertion 18, the head assembly 22 can be adjusted to the height of two valves instead of three, allowing the head assembly 22 to be more compact, because the inlet and outlet fittings 30 and 32 and the protrusion 33 are so sized and arranged.

Referring to FIG. 13, the bypass valve 52 will now be described in greater detail. The bypass valve 52 includes the spring 46, two o-rings 78, a bypass shuttle 55, and the retainer 56. Each o-ring 78 encircles a first end 57 and a second end 59 of the bypass shuttle 55. The second end 59 of the shuttle 55 is biased against the retainer 56 by a second end 63 of the spring 46 which is in contact with the first end 57 of the shuttle 55 such that a shuttle nipple 89 occupies the retainer opening 58. A first end 61 of the spring 46 is in contact with the cylindrically tapered second end 67 (illustrated in FIG. 10) of the bypass passageway housing 54 which is positioned between the inlet and outlet passageway housings 38 and 40, as shown in FIG. 10. The retainer 56 fits sealingly into the first end 65 of the bypass passageway housing 54 such that the bypass shuttle 55 and the spring 46 are operably contained within the bypass passageway housing 54.

As previously mentioned, the retainer opening 58 is sized to receive the protrusion end 41 when the end piece 10 is inserted into the head assembly 22. As shown in FIG. 12-B, the bypass valve 52 remains in an open position when the end piece 10 is not inserted, such that the shuttle nipple 89 occupies the retainer opening 58. When in the open position, the bypass shuttle 55 does not block the bypass channel 69 so that the inlet and outlet passageways 131 and 133 are in untreated fluid communication with each other. In other words, when the appliance does not have the end piece 10 inserted, the shuttle 55 is in an open position such that untreated fluid will circulate from the inlet passageway 131 through the bypass channel 69 to the outlet passageway 133. When the end piece 10 is fully inserted, the protrusion 33 of the end piece 10 is directed into the retainer opening 58 such that the protrusion end 41 meets the shuttle nipple 89, pushing the nipple 89, and thus the shuttle 55, toward the second end 67 of the bypass passageway 139 to a closed position, as shown in FIG. 12-A. When in the closed position, the bypass shuttle 55 blocks the bypass channel 69 so that the inlet and outlet passageways 131 and 133 are in treated fluid communication with each other through the cartridge 20. In other words, when the appliance does have the end piece 10 fully inserted, the shuttle 55 is in a closed position such that fluid is forced to circulate from the inlet passageway 131 through the cartridge 20, then to the outlet passageway 133.

The actuation of the inlet, outlet, and bypass valves 42, 44, and 52 of the preferred embodiment, as a system, will now be summarily described. Prior to insertion of the end piece 10 into the head assembly 22, fluid coming from the appliance will meet the inlet valve 42 in a closed position, blocking the port/passageway opening 79 so that the inlet passageway 131 and the inlet receiving port 135 are not in fluid communication with each other. Thus, fluid cannot circulate from the inlet passageway 131 to the inlet receiving port 135 through the port/passageway opening 79. However, prior to end piece 10 insertion, the bypass valve 52 is in an open position such that untreated fluid will circulate from the inlet passageway 131 through the bypass channel 69 to the outlet passageway 133 and back through the appliance.

Once the cartridge 20 has been fully inserted into the appliance casing 108, and more specifically, the end piece 10 is fully inserted into the head assembly 22, fluid coming from the appliance will meet the inlet valve 42 in an open position in that the port/passageway opening 79 is open, allowing for fluid communication between the inlet receiving port 135 and the inlet passageway 131. Thus, fluid is free to circulate from the inlet passageway 131 to the inlet receiving port 135. Also, the cartridge protrusion end 41 meets the shuttle nipple 89, pushing the nipple 89, and thus the shuttle 55 toward the second end 67 of the bypass passageway housing 54 to a closed position. Thus, the only pathway for the fluid to circulate is from the inlet passageway 131 to the inlet receiving port 135 through the inlet fitting 30 into the cartridge 20. The now treated fluid will then pass through the outlet fitting 32 to the outlet receiving port 137 into the outlet passageway 133 and finally back through the appliance.

In the preferred embodiment, actuation of the inlet, outlet, and bypass valves 42, 44, and 52 are actuated essentially simultaneously by insertion of the end piece 10. It should be understood that it is anticipated that the present invention may be modified to allow for any combination of actuation of the valves 42, 44, and 52.

Figure 14A:
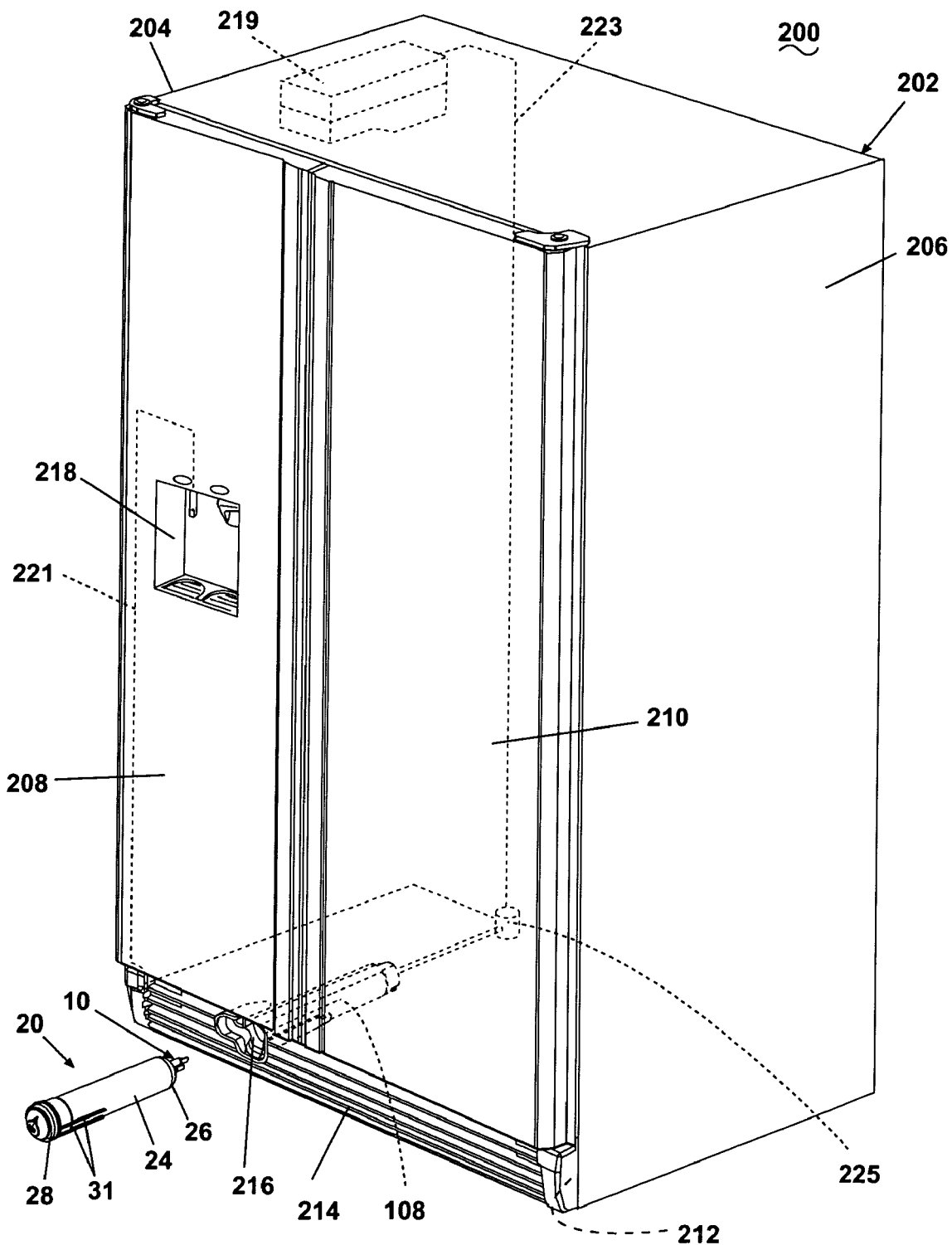
FIG. 14-A is a perspective view of the cartridge of FIG. 1 positioned for mounting in a refrigerator by insertion into an appliance casing mounting the head and located behind the front grill of a refrigerator.
Figure 14B:
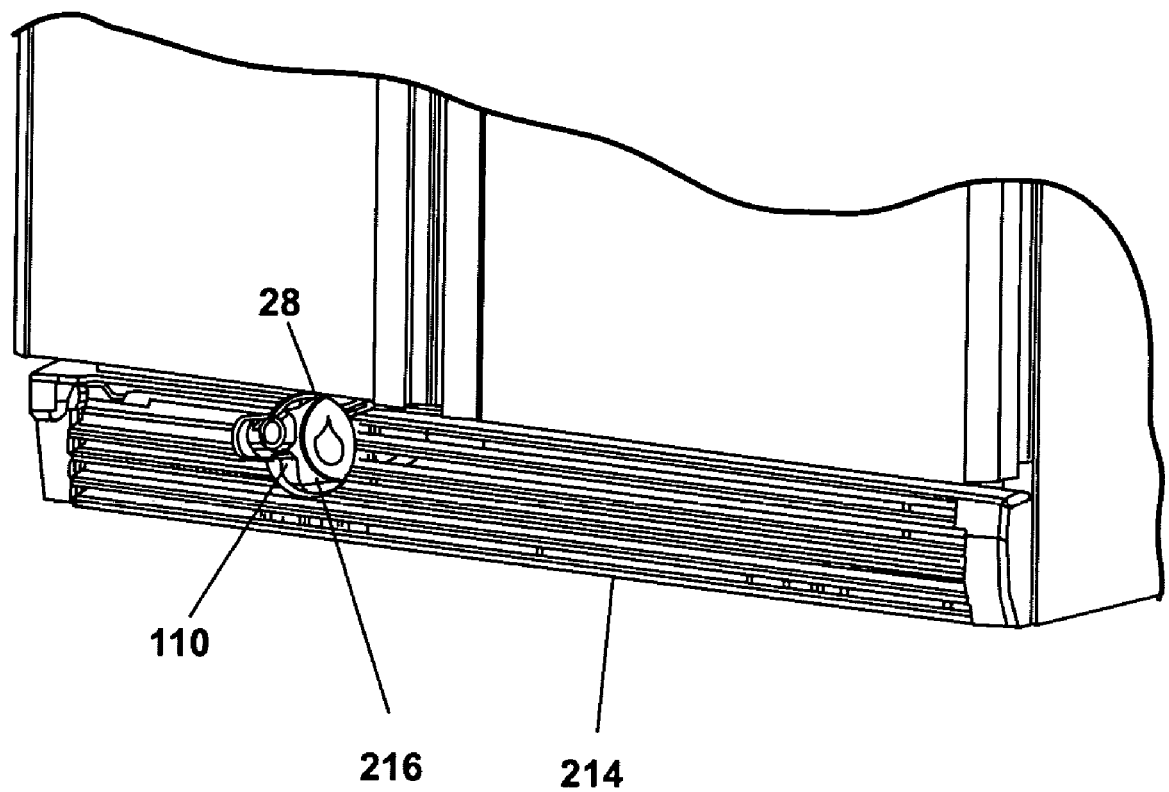

Referring to FIGS. 14-A, 14-B, 15-A, 15-B, 16-A, 16-B, and 17, the preferred appliance environment of a refrigerator 200 incorporating the cartridge 20 and head 22 will be described in greater detail. The refrigerator 200 comprises a cabinet 202 that is divided into a freezer compartment 204 and a refrigerated compartment 206, and which includes hingedly mounted doors 208 and 210, respectively, which close the compartments 204, 206. The cabinet comprises a grill 214 that covers an access area 212 formed in the cabinet. Preferably, the grill 214 is removably to permit access to the access area 212. Preferably, but not necessarily, the access area 212 houses various components of the refrigeration system. The cartridge 20 is mounted within the access area 212 to minimize any reduction of volume either the freezer or refrigerated compartments 204, 206.

The grill 214 has a through opening 216 sized to slidably receive the cartridge 20. The through opening 216 simplifies the mounting and replacement of the cartridge since the user can gain access to the cartridge 20 through the through opening 216, negating the need to move or disassemble any portion of the refrigerator 200.

The cartridge 20 supplies treated water from a source (not shown) to water-using accessories of the refrigerator 200, such as chilled water dispenser 218 and ice maker 219, through water lines 221 and 223, respectively. A switch valve 225, typically a solenoid actuated valve, selectively couples the output of the treated water supplied by the cartridge 20 to the accessories. The water dispenser 218, ice maker 219, water lines 221, 223, and switch valve 225 are all well known elements of a water supply and use system found in contemporary refrigerators and will not be described in further detail.

Referring to FIGS. 15-A and 15-B, the mounting of the cartridge to the refrigerator is described in further detail. A cylindrical casing 108 is mounted within the access area 212. FIG. 15-A shows the cartridge fully inserted within the casing 108 and FIG. 15-B shows the cartridge partially inserted within the casing 108.

Figure 17:
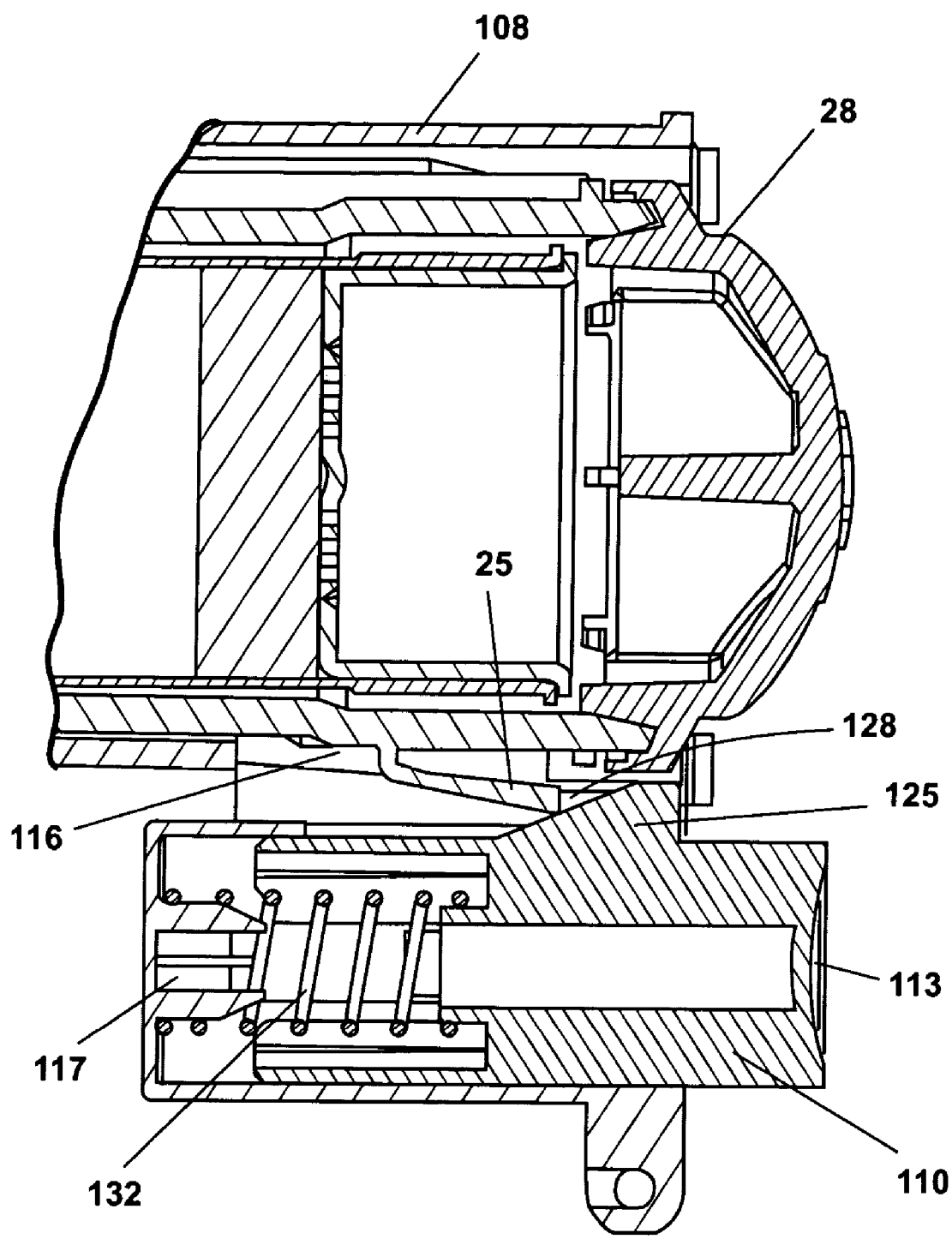
FIG. 17 is a cross sectional top view of the cartridge of FIG. 15-A taken along the line 17—17 thereof, wherein the cartridge is fully inserted into the appliance casing with the appliance button in a closed position.

The casing 108 has a first end 107 and a second end (70109, shown in FIG. 19). The casing 108 is approximately the length of the cartridge 20, and the inner diameter of the casing 108 is approximately the same as the outer diameter of the cartridge 20, not including the rails 31 or the latch 25. Both the latch 25 and the rails 31 extend beyond the outer diameter of the cartridge 20. The second end (70109, shown in FIG. 19) of the casing 108 mounts the head assembly 22 such that the head assembly 22 acts to close the second end (70109, shown in FIG. 19) of the casing 108 in such a way that the opening 58 of the retainer 56, as well as the open ends 118 and 120 of the inlet and outlet receiving port housings 48 and 50 are contained within the appliance casing 108. The open end 107 is of a diameter to receive the cartridge 20, when the cartridge guide rails 31 are aligned with a guide rail impression 114 at the first end 107 within the casing 108. The guide rail impression 114 is approximately the length, width, and depth of the two guide rails 31. Opposite the guide rail impression 114, the casing 108 has an open slot 116 capable of receiving the cartridge latch 25. The open slot 116 is located inside the open end 107 such that a lip 128 is formed, as shown in FIG. 17. The open slot 116 is approximately the length, width, and slightly less in depth than the biased latch 25.

Adjacent the open end 107, running parallel with a longitudinal axis 105 of the casing 108, a cylindrical button housing 115 is part of and in physical contact with the cylindrical casing 108 of the appliance. The button housing 115 functions to release the cartridge 20 from an inserted position as shown in FIG. 15-A.

As shown in FIGS. 16-A and 16-B, the button housing 115 has an open end 119 and a closed end 121. The housing 115 also has two wide guide slots 134 opposite each other, and a narrow guide slot 136. The narrow guide slot 136 is in communication with the open slot 116 of the casing 108, which receives the latch 25, making the latch 25 accessible through the open slot 116.

The button housing 115 is of a diameter to receive a cylindrical button 110 having an open end 111 and a closed end 113. The button 110 has two retaining latches 117 opposite each other and an angled wall 125 extending from its outer surface. The retaining latches 117 are received within the guide slots 134 when the button 110 is inserted in the button housing 115. In such a position, the angled wall 125 is received within the guide slot 136, where it can contact the latch 25 when the cartridge is inserted within the casing 108.

As best seen in FIG. 17, the button 110 is biased to a latching position by a coil spring 132, which is positioned between the closed end 121 of the button housing 115 and the closed end 113 of the button. The spring 132 biases the button 110 away from the closed end 121 of the button housing. The retaining latches 117 abut the forward ends of the guide slots 134 to limit the travel of the button 110 and keep the button 110 seated in the button housing 115. The button 110 can be moved to an unlatching position by pushing, preferably with one's fingers, the closed end 113 of the button 110 to move the open end 111 toward the closed end 121 of the button housing 115, which correspondingly moves the angled wall 125 along the narrow guide slot 136. When the first end 26 of the cartridge 20 is inserted into the first end 107 of the appliance casing 108, the guide rails 31 must be aligned for the cartridge 20 to fit into the casing 108 completely so as to allow the inlet and outlet fittings 30 and 32 and the protrusion 33 to actuate the inlet and outlet valves 42 and 44 and the bypass valve 52. In essence, the guide rails 31 and the guide rail impression 114 function as a key and keyway to ensure that the cartridge can only be inserted within the casing 108 when the cartridge is properly aligned. Similarly, the head 22 is mounted to the casing 108 such that the inlet and outlet receiving ports 135, 137 and While the cartridge 20 is being inserted, the outwardly biased latch 25 is biased away from the cartridge 20. However, at the point of insertion where the valves 42, 44, and 52 are being actuated, the cartridge latch 25 meets the casing slot 116 and resumes being sprung such that the lip 128 retains the cartridge 20 via the latch 25. Thus, the cartridge 20 cannot be removed without biasing the latch 25 toward the cartridge 20 such that the latch 25 clears the lip 128. This is accomplished by pushing the button 110 to the unlatching position which causes the angled wall 125 to contact the latch 25 such that the latch 25 is biased toward the cartridge 20 to a point of clearing the lip 128, thus allowing the cartridge 20 to be removed, causing the valves 42, 44, and 52 to be unactuated. Once the button 110 is pushed to an unlatched position, the cartridge 20 may be removed manually by a person. Alternatively, the cartridge 20 may be partially ejected by the pressure of the inlet and outlet valves 42 and 44, by pressurized fluid escaping from the inlet and outlet fittings 30 and 32, or by a spring(s) (not shown) seated in the head assembly 22.

Depending on the desired rate and degree of ejection, and other such factors including water pressure, trapped air within the cartridge 20, etc. it is anticipated that additional elements may be used in order to control ejection of the cartridge 20. For instance, as shown in FIGS. 18-A, 18-B, and 18-C, it is anticipated that the inlet fitting 6030 may include a deflector wall 60129 (preferably having a length from about 0.04 cm, 0.06 cm, 0.08 cm to about 0.2 cm, 0.5 cm, 1 cm, and preferably having a height from about 0.2 cm, 0.4 cm, 0.6 cm to about 1.5 cm, 2 cm, 3 cm, and preferably having a width from about 0.2 cm, 0.4 cm, 0.6 cm to about 1.5 cm, 2 cm, 3 cm) which functions to direct escaping fluid from the inlet and outlet fittings 6030 and 6032, and more particularly, from the opening 6091 of the channel 6060, in a direction perpendicular to the line of cartridge 6020 (partially shown) insertion 6018. Thus, upon cartridge 6020 (partially shown) ejection, most all of the emitted water from the opening 6091 will first hit the inside side portion of receiving port housings 6048 and 6050 instead of the inside back portion of port housings 6048 and 6050 (as it would in the above-described preferred embodiment), which will act to diminish the contribution of emitting water to ejection of the cartridge 6020 (partially shown). The deflector wall 60129 may extend away from the inside portion of fittings 6030 and 6032 in a direction perpendicular to the longitudinal axis 6014 of the inlet fitting 6030, and positioned perpendicular to and at the most proximal end of the actuation wall 6062. The most distal portion of the protrusion end 6041 to the most proximal portion of the deflector wall 60129 is preferably a distance (L10 through L11) from about 0.5 cm, 1 cm, 1.5 cm to about 3 cm, 3.5 cm, 4 cm, and the most distal portion of the protrusion end 6041 to the most distal portion of the deflector wall 60129 is preferably a distance (L10 through L12) from about 0.5 cm, 1 cm, 1.5 cm to about 3.5 cm, 4 cm, 4.5 cm. The most proximal portion of the open portion 6076 to the most proximal portion of the deflector wall 60129 is preferably a distance (L11) from about 0.05 cm, 0.1 cm, 0.15 cm to about 0.5 cm, 1 cm, 1.5 cm and the most proximal portion of the open portion 6076 to the most distal portion of the deflector wall 60129 is preferably a distance (L11 through L12) from about 0.05 cm, 0.1 cm, 0.15 cm to about 0.5 cm, 1 cm, 1.5 cm. FIGS. 18-A, 18-B, and 18-C also illustrate, as mentioned above, slightly modified positioning of the protrusion 6033, protrusion end 6041, and support bridge 6035, as well as the inlet 6030 and outlet 6032. The actuation wall 6062 has also been shortened in length to accommodate the deflector wall 60129. It should be noted that these modifications, consistent with the above description of the preferred embodiment, maintain positioning of the protrusion 6033 between the inlet fitting 6030 and the outlet fitting 6032.

As shown in FIG. 19, it is also anticipated that cartridge (e.g., 20) ejection may be controlled by a friction spring 70130 which acts to cause friction on the outside of a cartridge housing (e.g., 24) such that the ejection of a cartridge (e.g., 20) is slowed by such friction. The friction spring 70130 may be fixed to the inside of the appliance casing 70108 such that at least a portion of the friction spring 70130 is biased to contact a cartridge housing (e.g., 24) upon insertion of a cartridge (e.g., 20). It is apparent that the degree of bias, and thus the force to overcome the friction spring 70130, as well as the area of spring 70130 contact may be adjusted as desired. Upon insertion of a cartridge (e.g., 20), the friction spring 70130 is designed to give to the shape of a cartridge (e.g., 20) when the desired force of insertion is applied. When a cartridge (e.g., 20) is ejected, the friction caused by the portion of the biased spring 70130 contacting a cartridge housing (e.g., 24) will act to slow a cartridge (e.g., 20) as it is ejected. In FIG. 19, the friction spring 70130 is fixed between the guide rail impression 70114 at the first end 70107 within the casing 70108 such that spring 70130 friction will occur between guide rails (e.g., 31) of a cartridge housing (e.g., 24). Alternatively, a friction spring (e.g., 70130) may be made part of a cartridge housing (e.g., 24) such that fiction occurs between a friction spring (e.g., 70130) and the inside of an appliance casing (e.g., 70108) for the purpose of slowing cartridge (e.g., 20) ejection. Whether the friction spring 70130 is placed on a cartridge (e.g., 20) or in the appliance casing 70108, the spring's 70130 particular placement is dependent on the goals and desires of the designer. FIG. 19 also illustrates, as mentioned above, slightly modified positioning of the inlet and outlet passageway housings 7038 and 7040, such that the two passageway housings 7038 and 7040 are extend the same distance from the head assembly 7022.

Figure 20A:
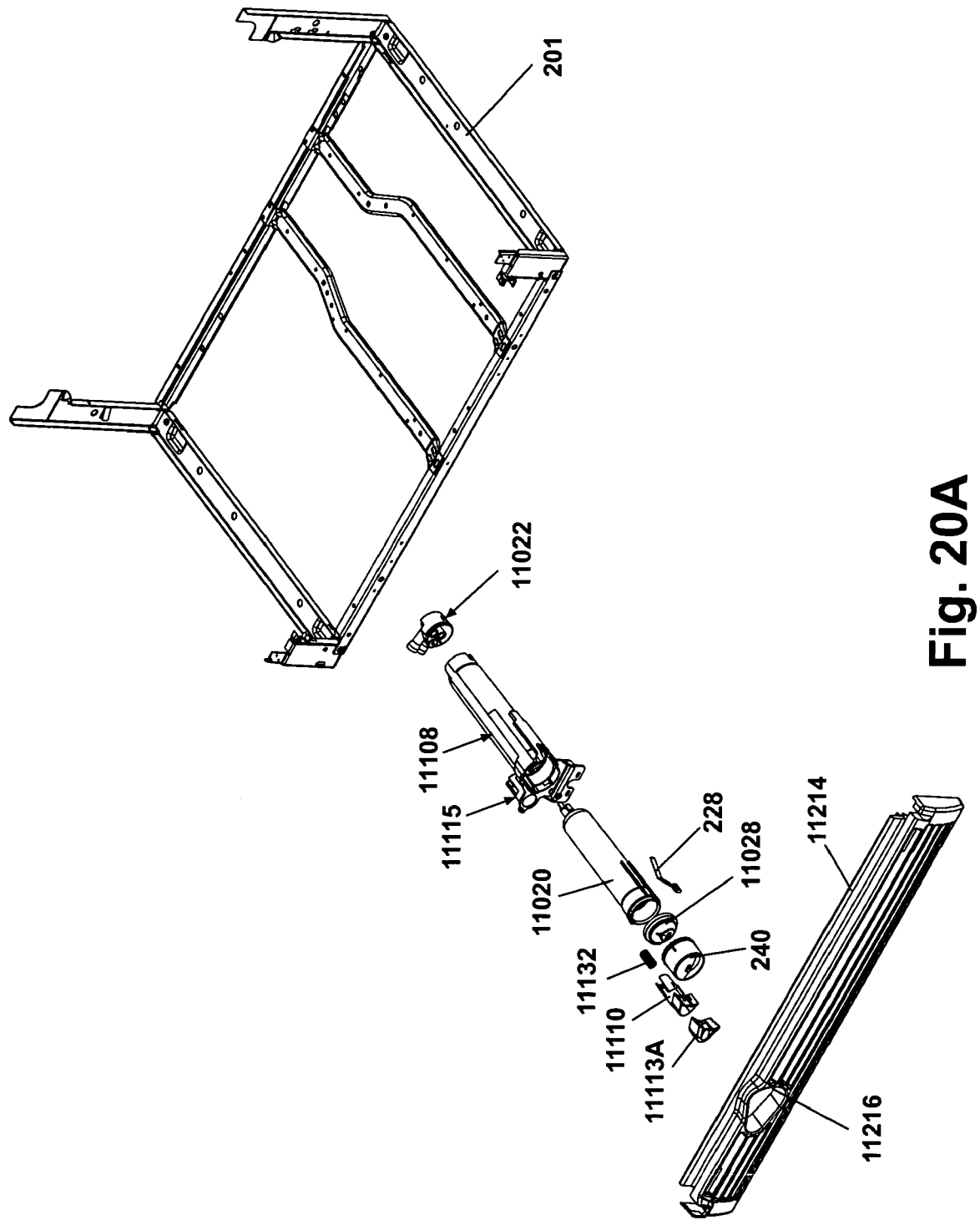
FIG. 20-A is an assembly perspective view of a second alternate embodiment of the appliance casing and illustrated with respect to the grill and refrigerator frame.
Figure 20B:
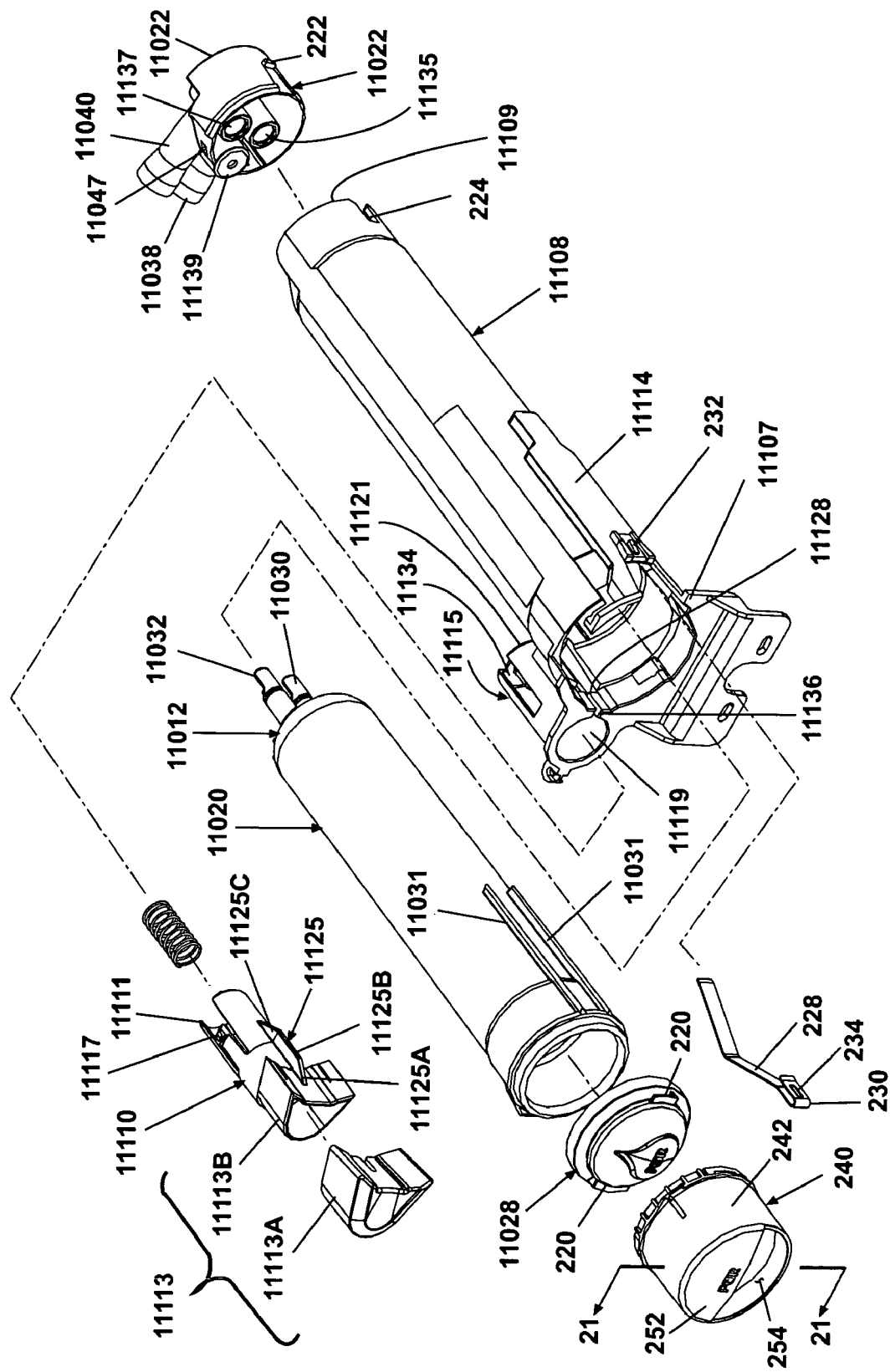

FIGS. 20-A and 20-B illustrate a second alternative design for the cartridge 11020 and head 11022, and the casing 11108 and button 11110 used to removably mount the cartridge 11020 and head 11022 to the refrigerator 200. FIG. 20-A shows a portion of a frame 201 for the refrigerator to which the casing 11108 and the grill 11214 are mounted. The grill 11214 has an opening 11216 shaped specifically for the cartridge 11020 and casing 11108.

FIG. 20-B illustrates the features and relationships of the cartridge 11020, head 11022, casing 11108 and button 11110 in greater detail. As can be seen, the cartridge 11020 is identical to the cartridge 20, except that the closed end 11028 is provided with lugs 220 that form half of a bayonet-type mount.

The head 11022 is identical to the head 22. It should be noted that both the head 11022 includes keys 222 that cooperate with slots 224 in the second end 11109 of the casing 11108 to aid is aligning the head 11022 with the casing 11109 such that the inlet and outlet receiving ports 135, 137 are positioned relative to the casing 11109 to automatically align with and receive the inlet and outlet fittings 11030, 11032 when the guide rails 11031 are aligned with the guide rail impression 11114 and the cartridge 11108 is inserted into the first end 11107 of the casing 11108. The head 11022 also includes slots 11047 that receive projections on the casing 11108 to snap-fit the head 11022 to the casing 11108.

A friction spring 228 having an integral end clip 230 is mounted to the casing 11108 by fixing the end clip 230 onto the edge of the first end 11107 of the casing 11108, such that a tab 232 extending from the casing 11108 is received within an opening 234 in the end clip. When mounted, the spring 228 extends into the interior of the casing 11108 and frictionally retains the cartridge 11020 within the casing 11108.

The button housing 11115 is identical to the button housing 115, except that the button 11110 closed end 11113 comprises a seat 11113B on which is slidably mounted a cap 1113A. A further difference between the button housing 11115 and 115 is that the angled wall 11125 comprises a tapered leading edge 11125A in addition to a central flat 11125B and a tapered trailing edge 11125C, whereas the wall 125 only had a flat followed by a tapered trailing edge. The structure for the angled wall 11125 and the cap 11113A slidably mounted to the seat 11113B permits.

Referring to FIGS. 20-B and 21, a handle 240 mounts to the end 11028 to ease the users insertion and removal of the cartridge 11020 from the casing 11108. The handle 240 comprises a cylindrical wall 242, which defines a hollow interior 244. Strengthening ribs 246 extend axially along the cylindrical wall 242. Lugs 248, complimentary to the lugs 220 on the end 11028, are provided on one end of the cylindrical wall 242 and form the other half of a bayonet-type mount. The lugs 248 and 220 cooperate to mount the handle 240 to the end 11028 of the cartridge 11020.

The handle further comprises a partial interior wall 250 and a partial exterior wall 252, which are axially spaced relative to each other. Each of the partial walls 250 and 252 extend approximately, but not quite, to the center of the hollow interior 244 of the handle 240. The spatial relationship between the partial walls 250, 252 form a finger opening 254 through which a user can insert his fingers and position them behind the exterior wall 252, permitting the user to grasp the exterior wall between his fingers to carry or push/pull the cartridge 11020, which aids the user in inserting and removing the cartridge 11020 from the cylinder 11108. The user can, if desired, also rest a portion of his fingers, say knuckles, on the interior wall 250 to further aid in handling the cartridge during carrying or insertion/removal.

The self-alignment features of the cartridge 11020, head 11020, and casing 11108 in combination with the ease of insertion/removal of the cartridge 11020 into the casing 11108 provide the user with an easy and intuitive structure for replacing the cartridge, unlike prior cartridges. The ease and intuitiveness is increased by the location of the casing 11108 on the front of the refrigerator, eliminating the need to move the refrigerator to gain access to the cartridge. The use of an access opening in the grill further simplifies the replacement process. The handle eases the handling of the cartridge and its insertion. Additionally, the keying of the cartridge relative to the casing and head ensures that the user cannot improperly insert the cartridge into the casing, thus ensuring the properly coupling of the cartridge with the head and the water supply. All of these features combine to provide a water treatment system having a replaceable cartridge that is much simpler and more intuitive to use than prior methods.

Figure 22:
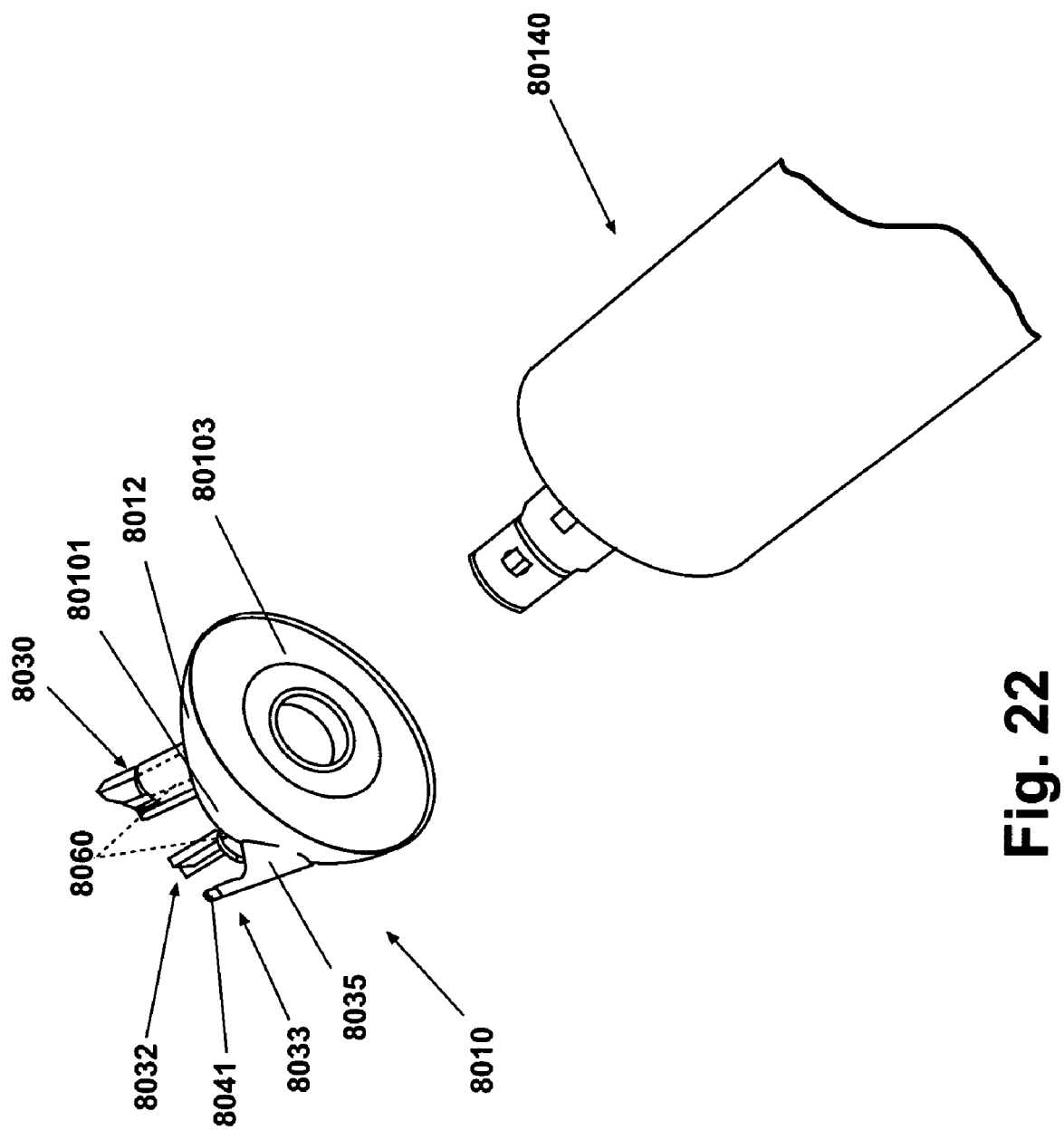
FIG. 22 is an exploded perspective view of an alternative embodiment of the end piece of the cartridge of FIG. 1 and a separate cartridge.

The cartridge structure can vary from what is shown in the preferred embodiment. For example, while the end piece 10 is connected to the cartridge 20 in the preferred embodiment, it is anticipated, as shown in FIG. 22, that the end piece 8010 may be without its own cartridge (e.g., 20). That is, the end piece 8010 may be connected to an already existing cartridge (e.g., 80140) so that the end piece 8010 functions as an adapter for the existing cartridge 80140. The connection may be a removable or permanent, including, but not limited to molding, soldering, latching, adhesively bonding, friction fitting, threading, screwing, welding, snap-fitting, etc. Further, connection includes situations where the end piece 8010 receives a cartridge, or is received by a cartridge, or a combination of both. Still further, the connection of the end piece 10 to a cartridge (e.g., 80140) may be interrupted by additional interfaces, and still be within the meaning of connected. That is, the fluid communication between the end piece 8010 and a cartridge (e.g., 80140) is within the meaning of connected as used herein. It is within the scope of this invention to connect and use any cartridge in combination with the end piece 8010. For instance, as one of many possible illustrations, the end piece 8010 may have an end piece wall 8012 having a top surface 80101 and a bottom surface 80103, where the top surface 80101 includes one or more fittings (e.g., 8030 and 8032) or protrusions (e.g., 8033) and the bottom surface 80103 is capable of receiving or being received by a retro-fit cartridge 80140 not capable of actuating valves (e.g., 42 and 44) so that fluid communication with a head assembly (e.g., 22) can be achieved in and of itself. Thus, the retrofit cartridge 80140 is only one example, and may vary greatly in shape, size, etc.

Figure 23:
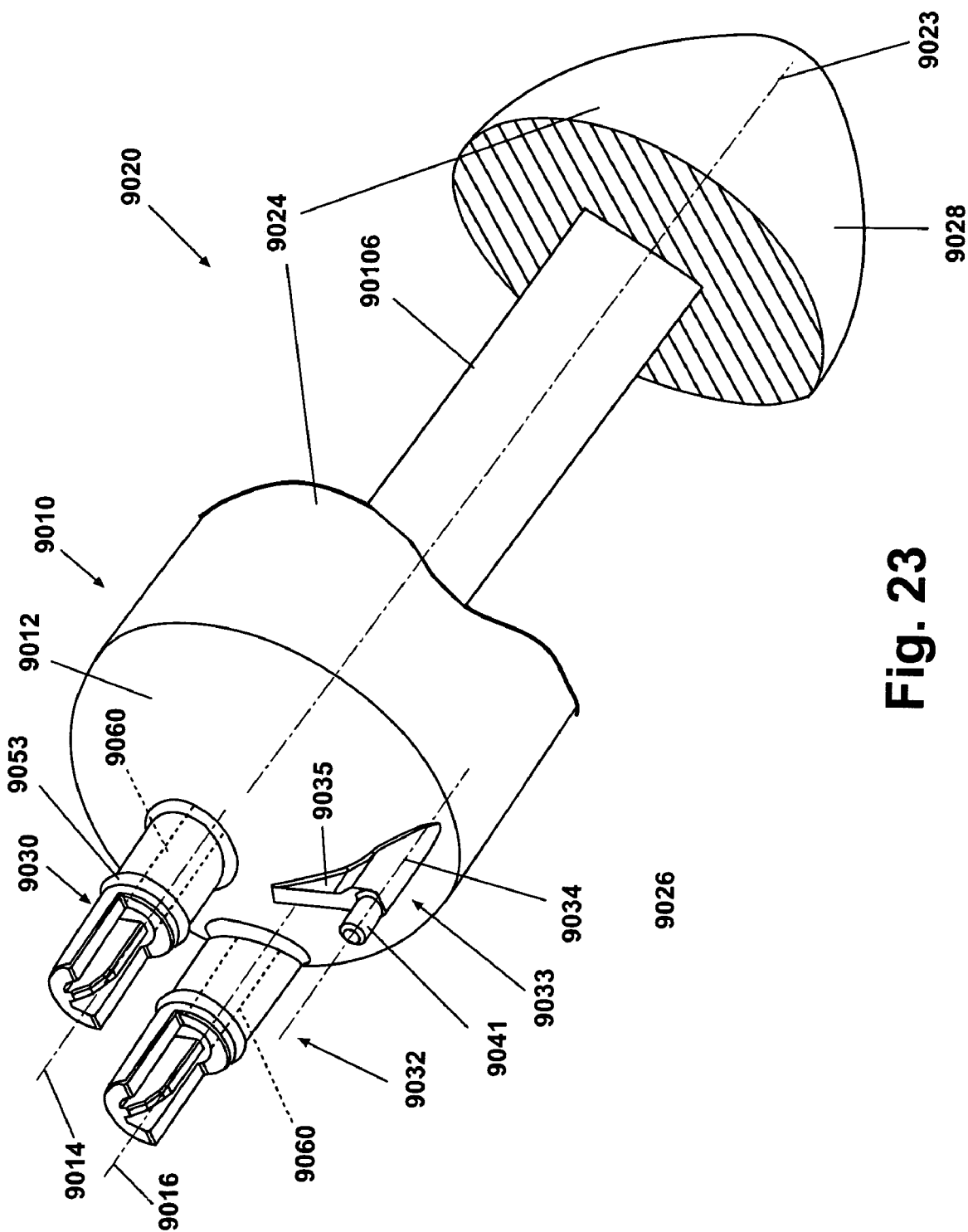
FIG. 23 is a perspective view of the end piece of the cartridge of FIG. 1 and of an alternative embodiment of the cartridge housing of the cartridge of FIG. 1 where the first and second ends of the cartridge housing are connected by a rod.

As shown in FIG. 23, it is anticipated that the cartridge housing 9024 may be other than cylindrical, while still having a longitudinal axis 9023. For instance, a hollow first end 9026 for containing treatment material (not shown) may be joined to a second end 9028 by a connecting rod 90106. The rod 90106 may or may not be in fluid communication with the first end 9026. The rod 90106 may or may not contain treatment material (not shown). Alternatively, the second end 9028 may be hollow for containing treatment material (not shown) and may be joined to the first end 9026 by a rod 90106 which is in fluid communication with the first end 9026. Thus, it is anticipated that any portion of the housing 9024 along the longitudinal axis 9023 of the cartridge 9020 may include a hollow portion for containing treatment material (not shown) in fluid communication with the end piece 9010.

Figure 24:
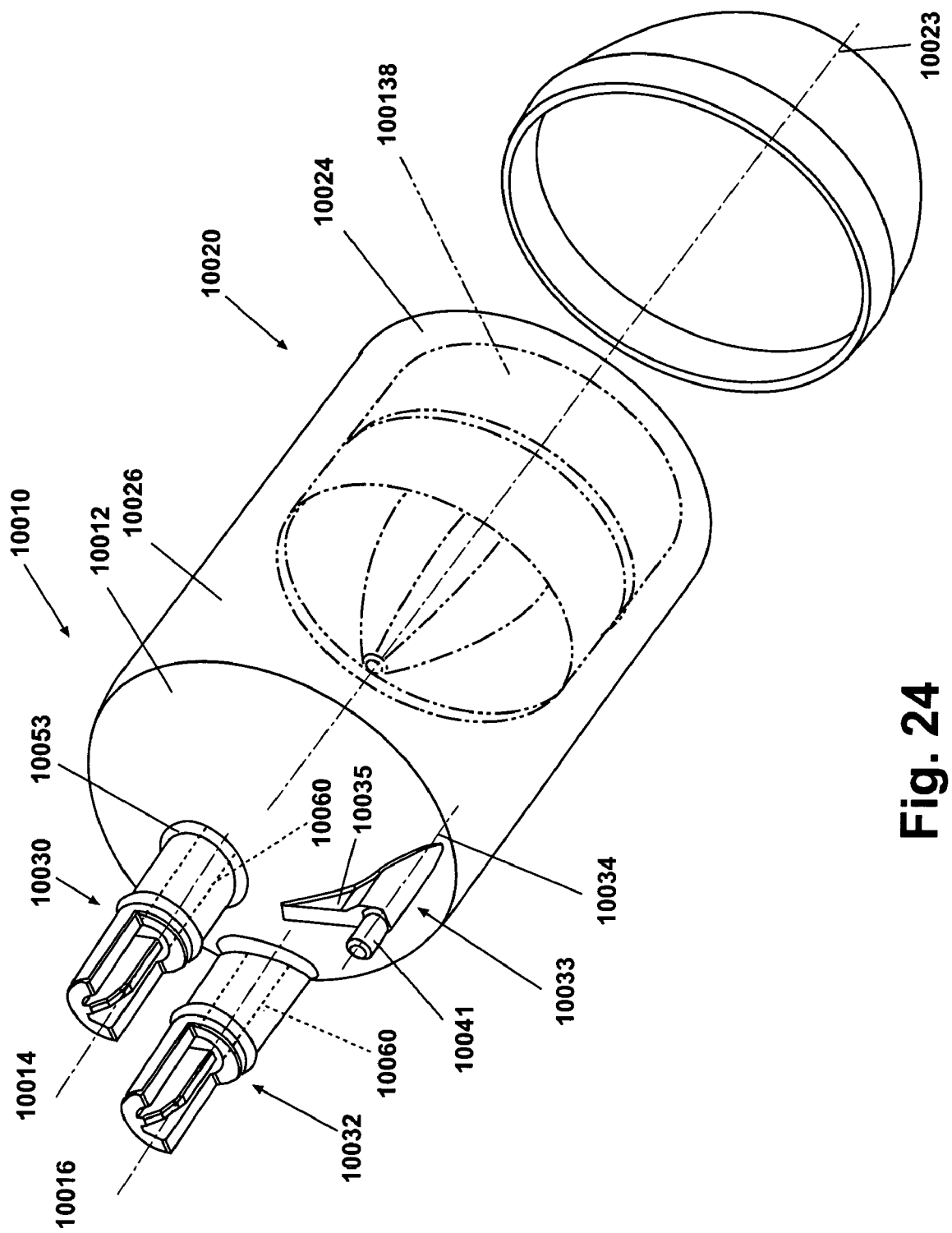
FIG. 24 is a perspective view of the end piece of the cartridge of FIG. 1 and an alternative embodiment of the cartridge housing of the cartridge of FIG. 1 containing an additional insertable cartridge.
Figure 25:
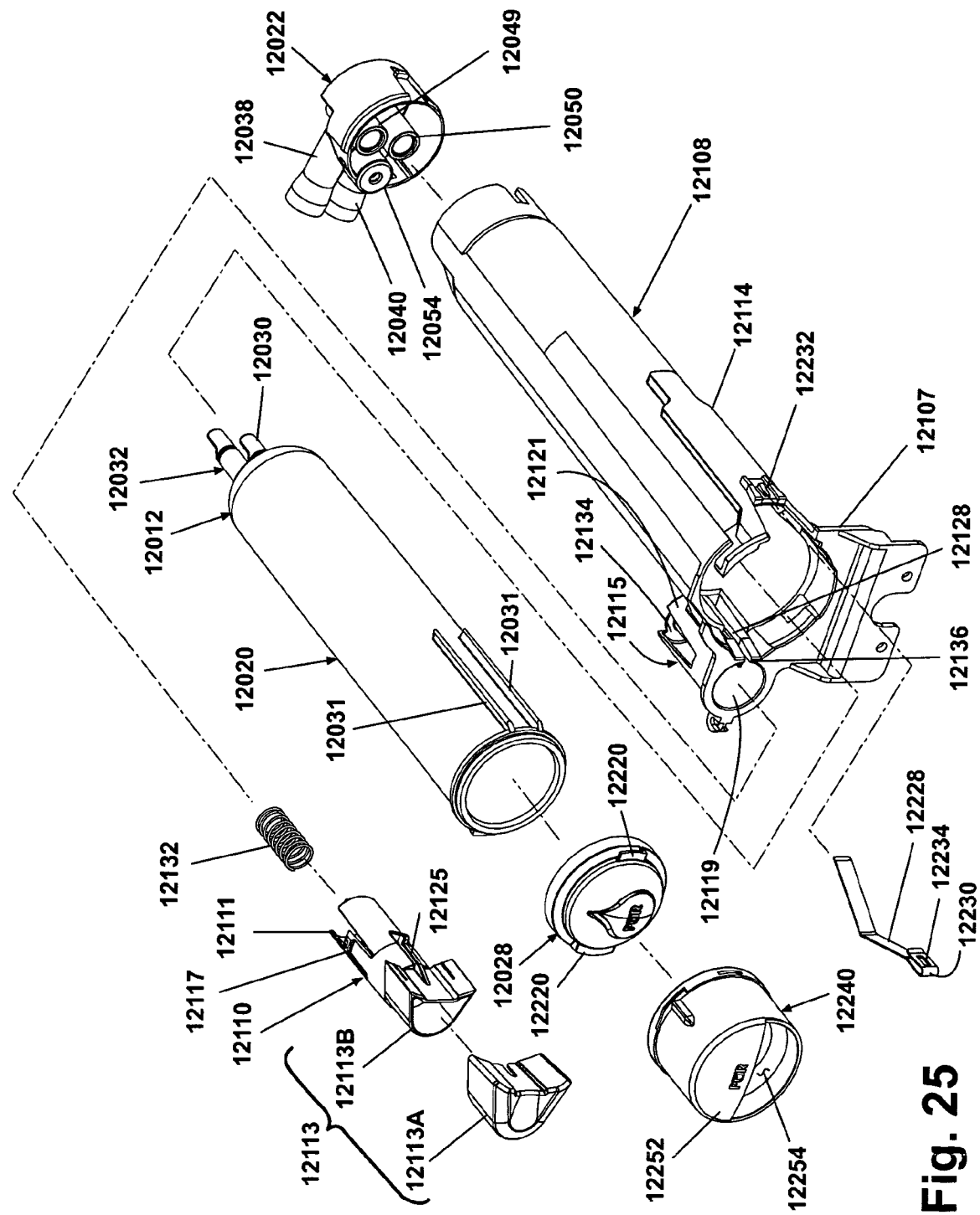
FIG. 25 is an assembly perspective view of a third alternate embodiment of the appliance casing, head, cartridge, and button, with the button providing visual indication that the cartridge is properly mounted to the head.

As shown in FIG. 24, it is further anticipated that the cartridge 10020 may contain within its housing 10024 a second housing 100138 which contains treatment material. That is, it is within the scope of this invention to have connected housing 10024 (into which an already housed treatment material may be inserted into) in such a manner that the end piece 10010 is in fluid communication with the treatment material housed in the second housing 100138. In such an embodiment, it is anticipated that cartridge 10020 may or may not have its own treatment material.

FIGS. 25–31 illustrate a third alternative embodiment of the casing 12108, button 12110 and cartridge 12110. The third embodiment is illustrated with the head 12022. However, any of the heads can be used with the third embodiment.

Figure 21:
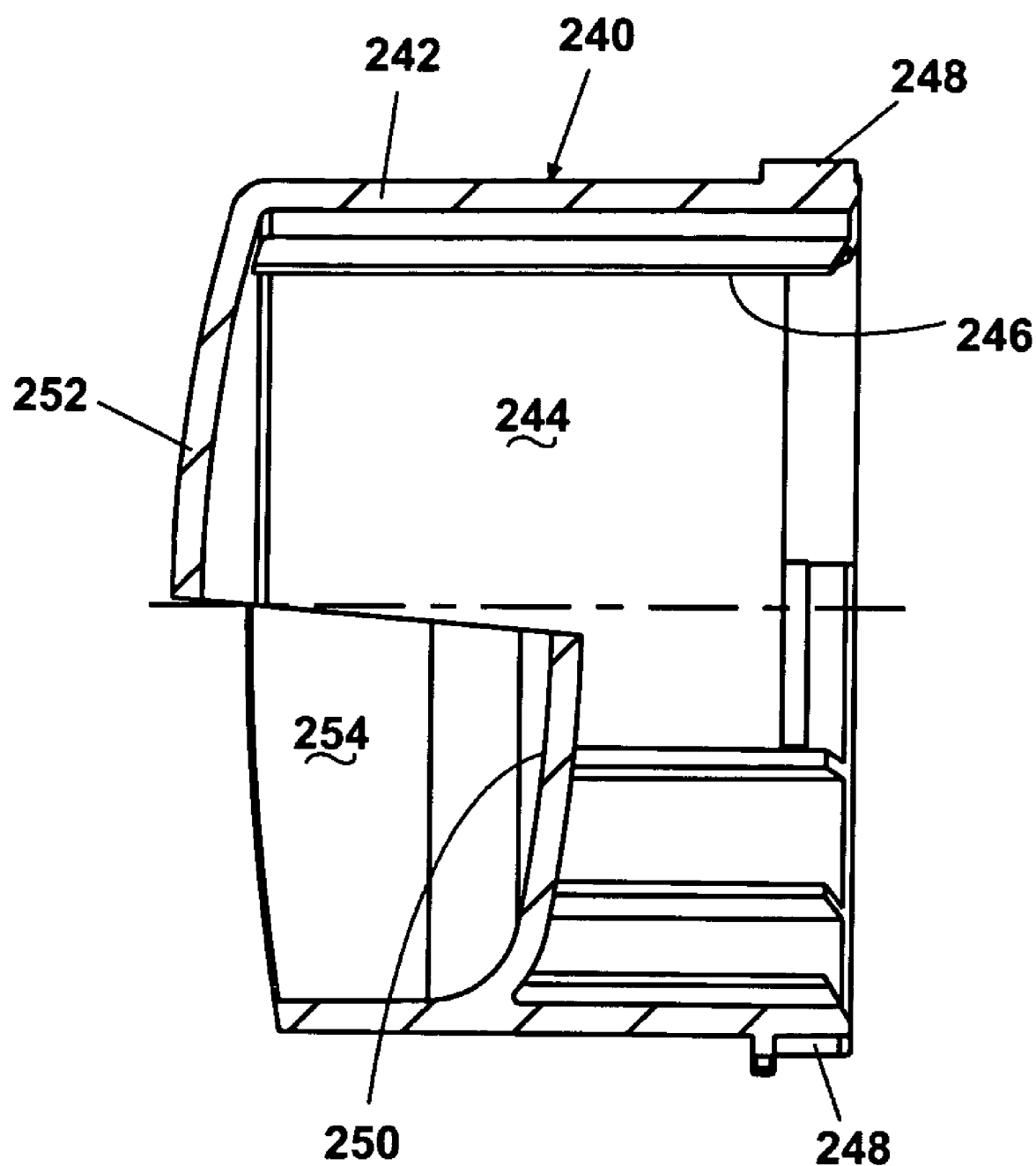
FIG. 21 is a side sectional view of the end cap of FIG. 20-B illustrating a finger recess formed in the end cap for improving the ease of insertion and removal of the cartridge from the appliance casing.

The third alternative embodiment is substantially identical to the casing, button and cartridge as illustrated in FIGS. 20–21, except that the casing 12108, button 12110, and cartridge 12110 are altered such that the insertion of the cartridge 12110 into the casing 12108 causes the button 12110 to be moved along with the cartridge 12110, and when the cartridge 12110 is fully inserted, the button 12110 returns to its normal position to provide the user with a visual indication that the cartridge 12110 is properly inserted within the casing.

The visual indicator is formed by a releasable latch comprising the latch 12025 of the cartridge, which functions as a catch, and the angled wall 12125 of the button 12110, which functions as a strike, in combination with a ramp 260 located on the casing 12108 on opposite sides of the guide slot 12128.

Figure 26:
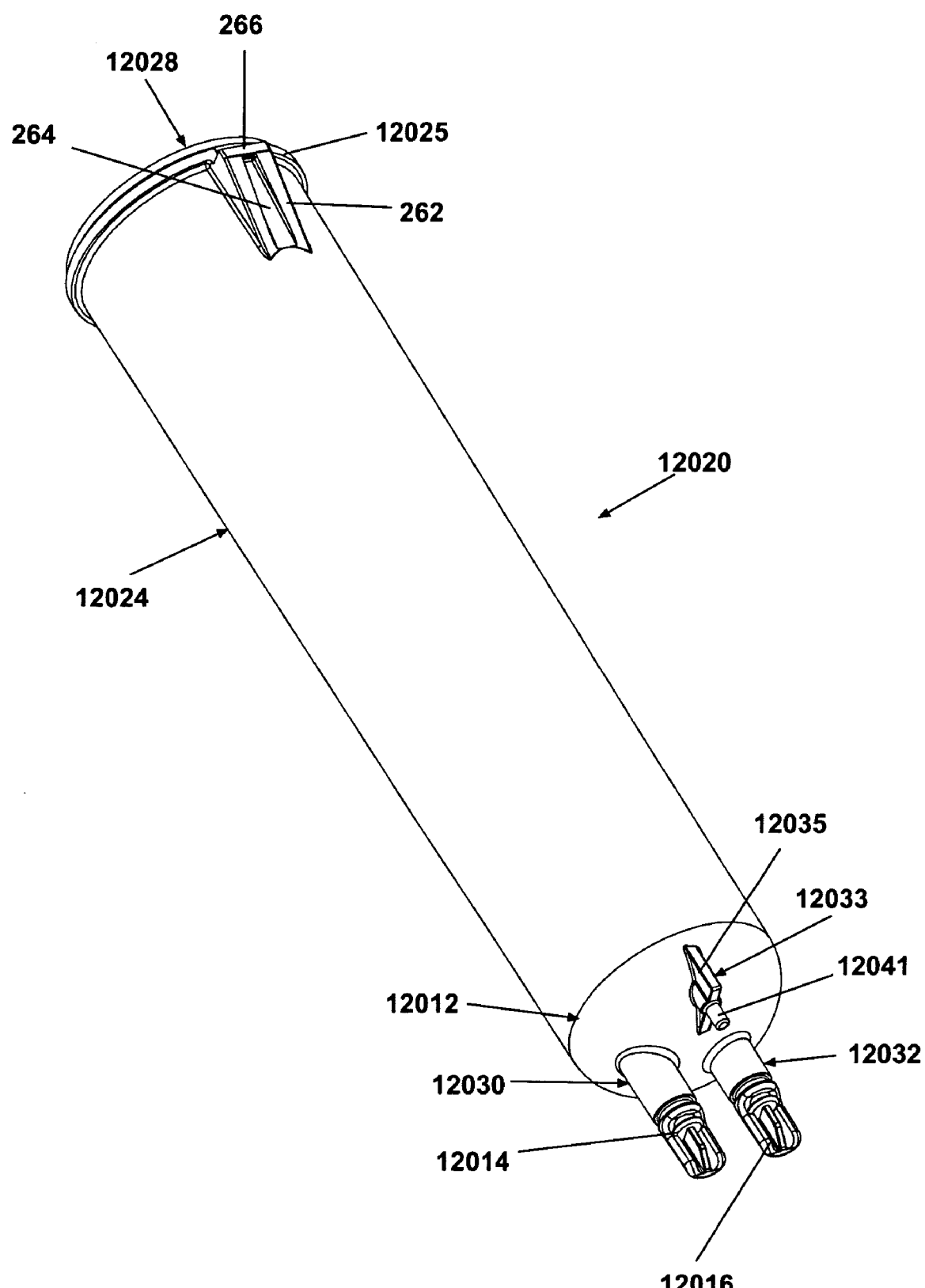
FIG. 26 is a perspective view of the cartridge of the FIG. 25 positioned to illustrate a catch for cooperating with the button to provide the visual indication.

Referring to FIG. 26, the latch 12025 forming the catch comprises an inclined surface 262 in which is formed a channel 264. The inclined surface 262 and ramp 264 both terminate at an end wall 266. The channel 264 is wide enough to receive the angled wall 12125.

Figure 27:
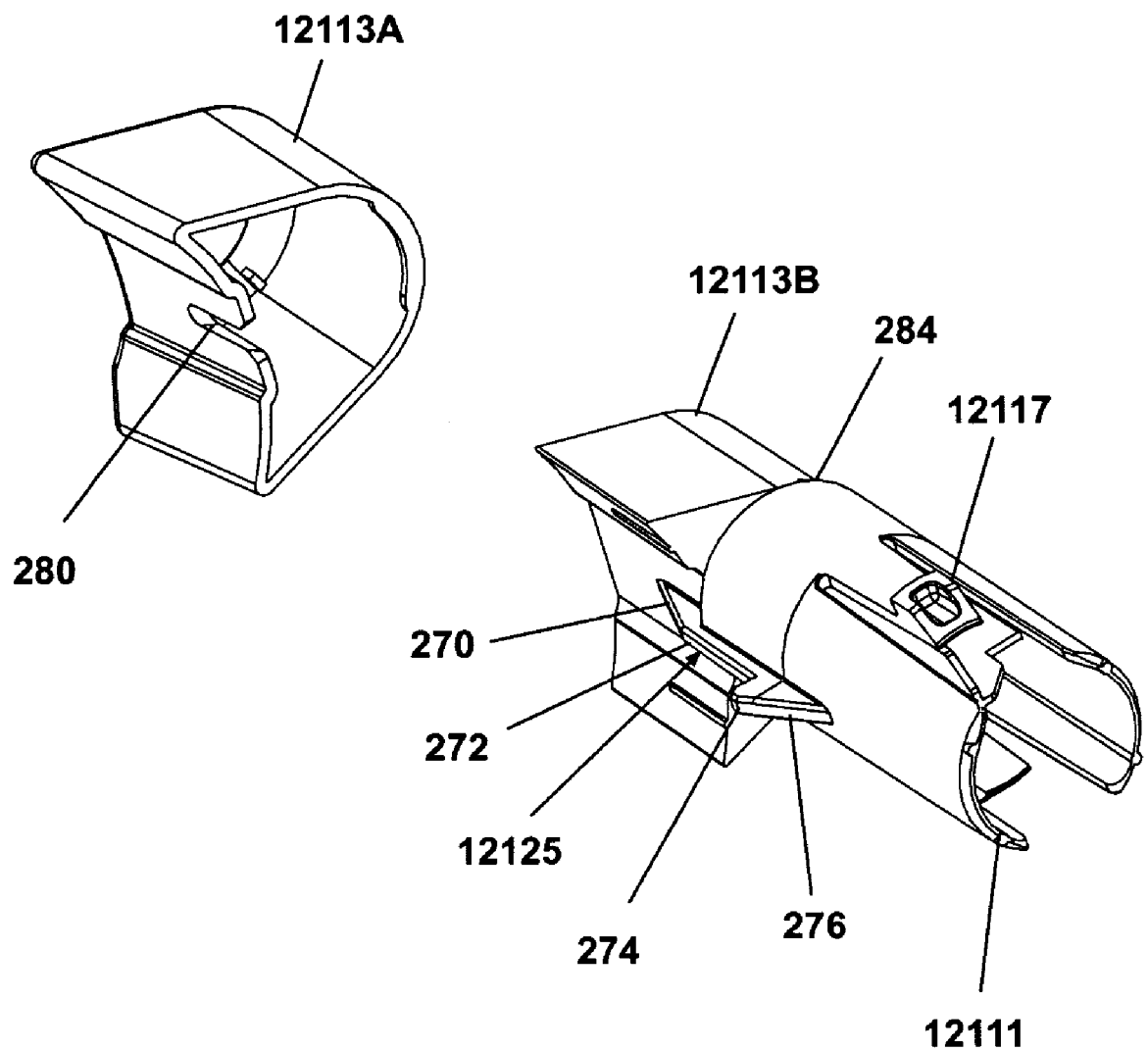
FIG. 27 is a perspective view of the button of FIG. 25 positioned to illustrate a strike for cooperating with the catch to move the button in response to the insertion of the cartridge in the casing to provide the visual indication.

Referring to FIG. 27, the angled wall 12125 forming the strike comprises an angled leading edge 270, which transitions into a planar portion 272. The planar portion 272 terminates into a vertical face forming a finger 274. The finger 274 has an angled trailing edge 276 that tapers to the button 12110. The button cap 12113A is slidably mounted onto the end of the button seat 12113B such that a slot 280 receives the leading edge 270 and a tab 282 snaps within a groove 284 to mount the cap 12113A to the seat 12113B.

Figure 28:
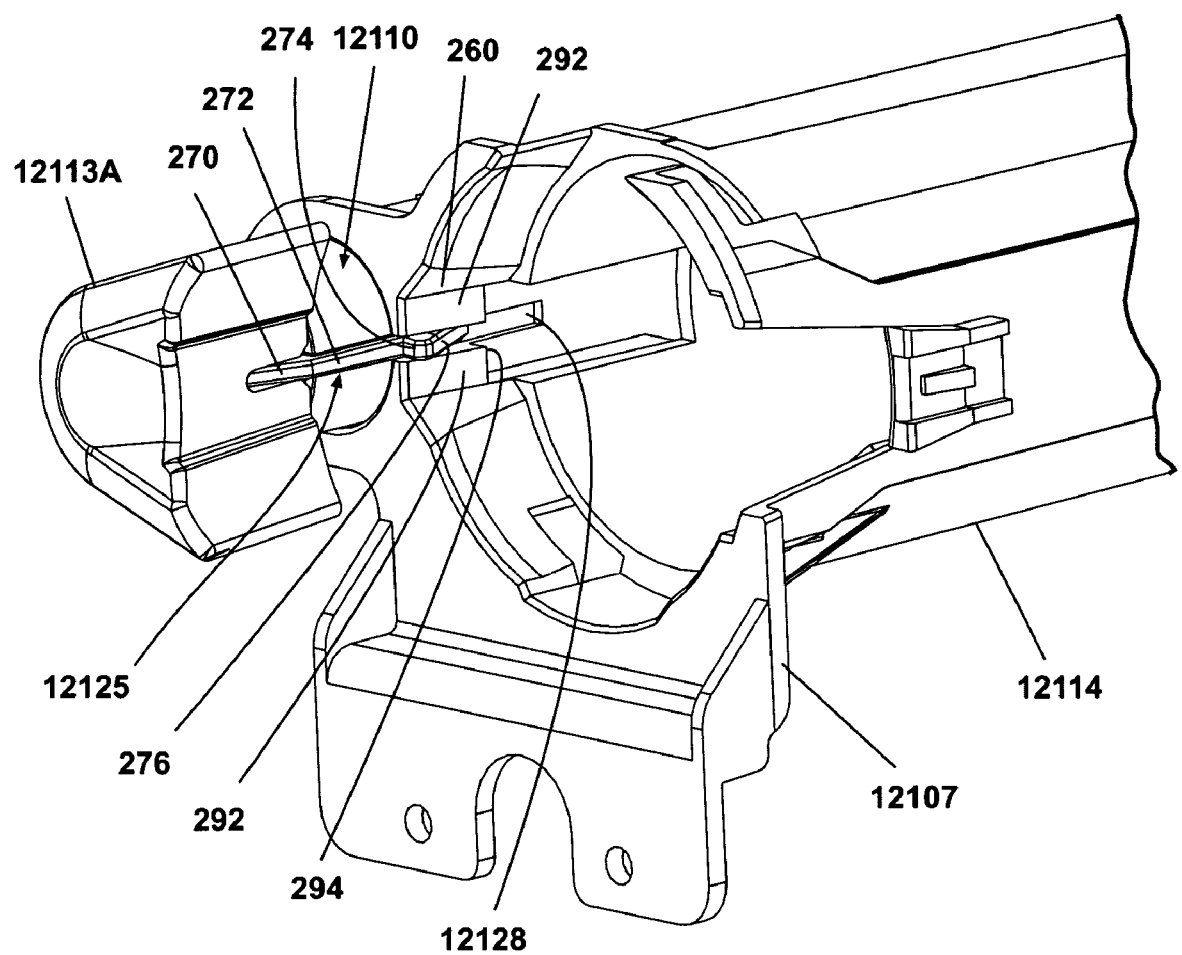
FIG. 28 is a perspective view of the casing of FIG. 25 positioned to illustrate a release in the form of a ramp to uncouple the catch from the strike upon the full insertion of the cartridge within the casing.

Referring to FIG. 28, the ramp 260 comprises spaced inclined surfaces 292, located on opposite sides of the guide slot. The inclined surfaces 292 begin at the opening of the casing 12108 and extend radially further into the casing as you move further axially within the casing and terminates in a vertical face 294.

Figure 29:
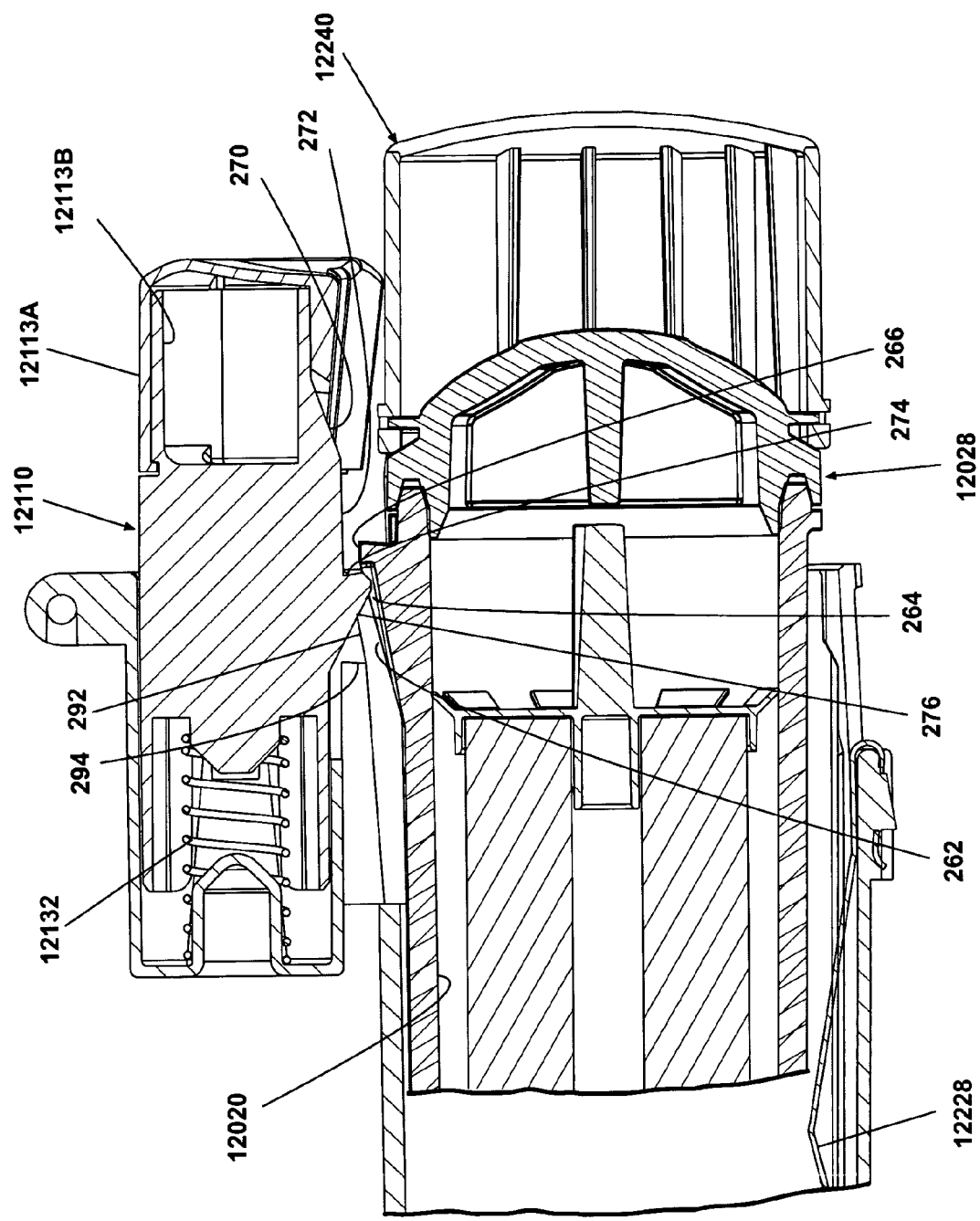
FIG. 29 is a sectional view of a portion of the assembled casing, button, and cartridge and illustrating the cartridge just as the catch begins to make contact with the strike and the button is in an extended position.

The visual indicating function of the third embodiment is best seen with reference to FIGS. 28–31. When the assembled button 12110 is slidably received within the open end 12119 of the button housing 12115, the finger 274 is received within the guide slot 12128. Referring to FIGS. 28 and 29, the button 12113 is biased into the extended position by the force of the spring 12132. As the cartridge 12020 is inserted into the casing 12108, the finger 274 is received within the channel 264 located within the inclined surface 262 forming the catch. The finger 274 remains in the extended position until the cartridge is inserted far enough such that the end wall 266 of the catch contacts and catches the finger 274. FIG. 29 illustrates the initial point of contact between the end wall 266 and the finger 274.

Figure 30:
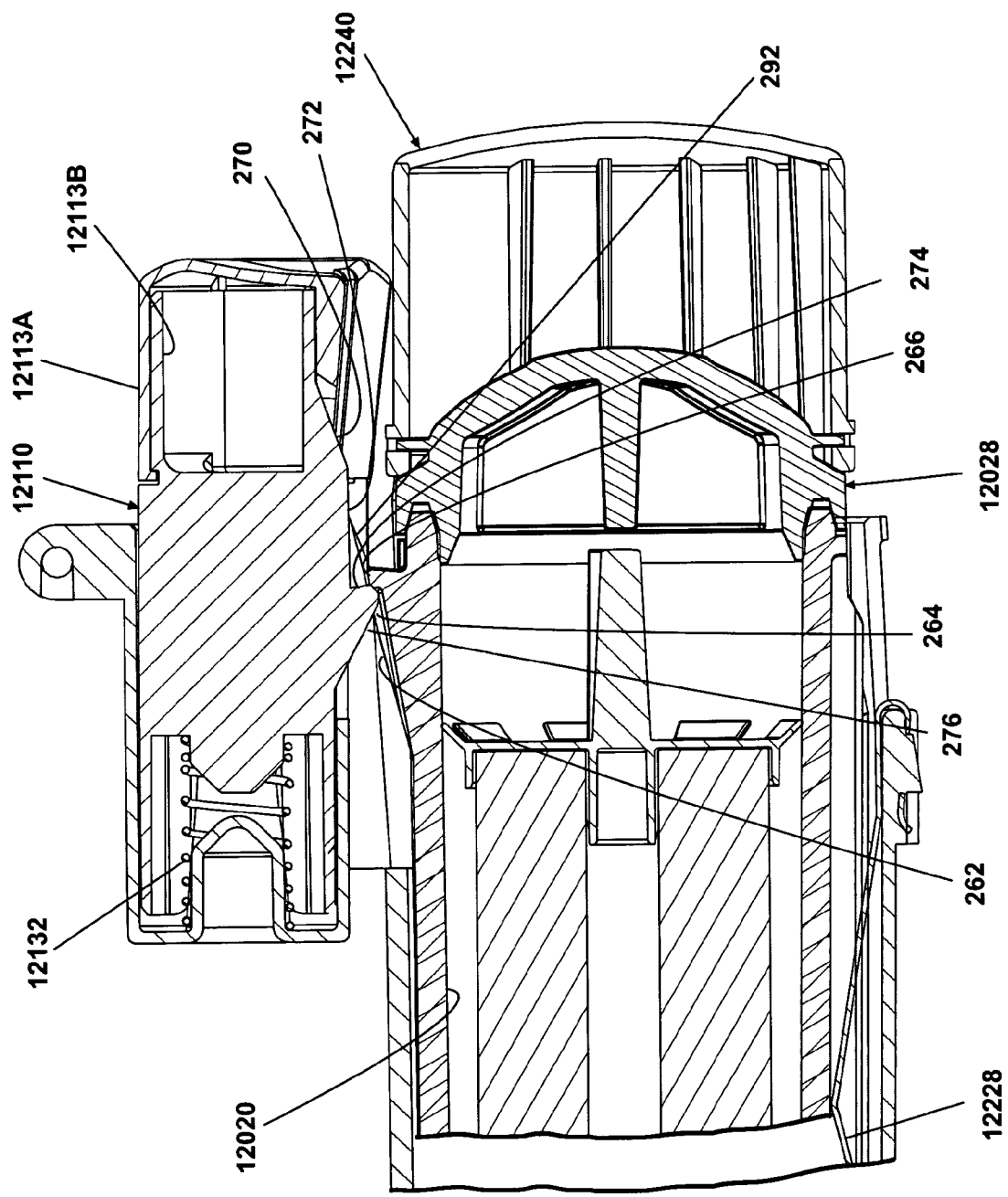
FIG. 30 is identical to FIG. 29 except that the cartridge is further inserted within the casing, resulting in the catch contacting the strike and carrying the button along with the cartridge to a withdrawn position.

Referring to FIG. 30, the contact between the finger 274 and the end wall 266 couples the movement of the button 12110 to the cartridge 12020. The continued insertion of the cartridge 12020 into the casing 12108 causes the button 12110 to be moved axially along with the cartridge to a withdrawn position until the button 12110 is released and permitted to return to the extend position.

Figure 31:
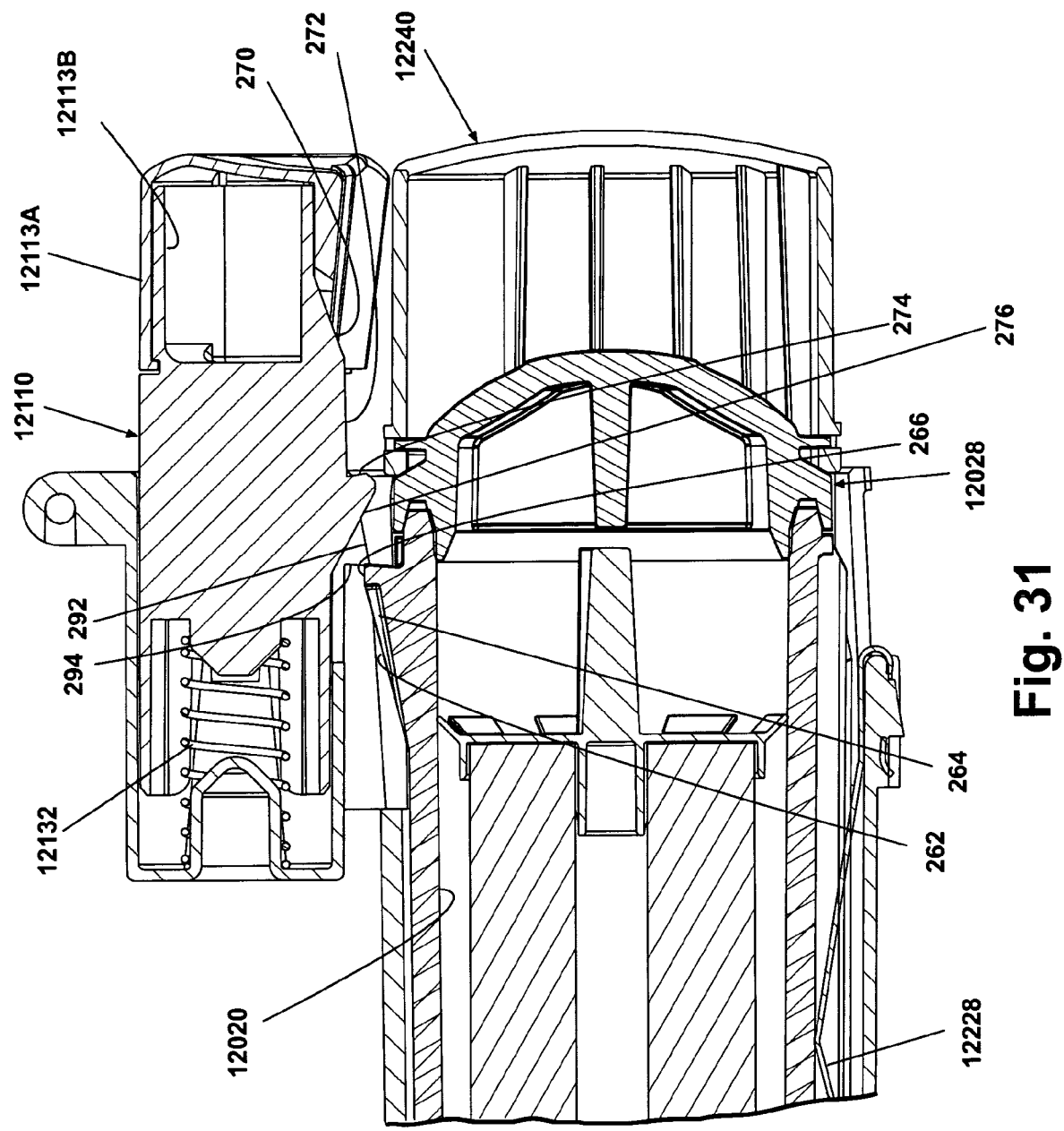
FIG. 31 is identical to FIGS. 29 and 30 except that the cartridge is fully inserted, resulting in the catch releasing the strike and the button is returned to the extend position.

Referring to FIGS. 30 and 31, the release of the button 12110 is also accomplished by the insertion of the cartridge 12110. The insertion of the cartridge 12020 brings the inclined surface 262 of the cartridge 12020 into contact with the inclined surfaces 292 of the casing 12108, which causes the cartridge to move laterally against the force of the spring 12228 mounted to the casing 12020. The radial extent of the inclined surfaces 292 into the interior of the casing 12108 is greater than the radial extent of the finger 274. Thus, as the cartridge 12108 is inserted, the finger 274 will begin to be removed from the channel 264 in response to the cartridge 12108 being laterally deflected by interaction between the inclined surfaces 262 and 292. There is a position where the finger 274 will become completely removed from the channel 264 of the catch thereby releasing or uncoupling the button 12110 from the cartridge 12020. The spring 12132 of the button will then return the button 12110 to the extended position.

Preferably, the inclined surfaces 292 are sized such that the finger 274 is released just as the end wall 266 is equal with or slightly beyond the rear face 294 of the inclined surfaces so that the spring 12228 will bias the cartridge 12020 such that the end wall 266 is moved behind the rear face 294 to function as a releasable lock. The user can remove the cartridge by pressing the button 12110, which once again brings the inclined surfaces 262 and 292 into contact and causing the cartridge to move laterally against the force of the casing spring 12228 to move the finger 272 from behind the rear face 294, thereby unlocking the cartridge and permitting its removal. The user completes the removal of the cartridge by grasping the handle 12240 and pulling the cartridge from the casing.

The movement of the button 12110 provides the visual indication that the cartridge 12020 is properly inserted. The user can see the button 12110 move along with the cartridge 12020 upon insertion and then move back to the extend position when the cartridge 12020 is properly inserted. Preferably, the spring 12132 of the button is of sufficient strength that it will snap the button 12110 back into position such that the movement is easily discernable by the user and it makes an audible noise as the retaining latches 12117 contact the button housing 12115.

The visual appearance of the moving button 12110 is further enhanced by located the button 12110 relative to the grill 214 of the refrigerator such that the button cap 12113A is moved behind the plane of the grill 214 in the withdrawn position. This will give the button the appearance of disappearing when moving to the withdrawn position.

All documents cited are, in relevant part, incorporated herein by reference. The citation of any document is not to be construed as an admission that it is prior art with respect to the present invention.

What is claimed is:

1. A refrigerator comprising:
  a cabinet comprising at least one compartment having an open face and a door for selectively closing the open face of the compartment;
  a water-using accessory provided on the cabinet;
  a head fixed relative to the cabinet and fluidly coupling the water-using accessory to a water supply;
  a water-treatment cartridge removably coupled to the head such that when the cartridge is coupled to the head, the cartridge treats the water from the supply for use by the water-using accessory; and
  a cartridge mounting bracket comprises a casing defining a hollow interior sized to receive the cartridge for removably mounting the cartridge to the casing within the cabinet, with an exterior opening accessible from the exterior of the cabinet and an interior end aligned with the head, the cartridge mounting bracket being located on the cabinet relative to the head such that the mounting of the cartridge to the cartridge mounting bracket by inserting the cartridge into the casing exterior opening effects the coupling of the cartridge to the head without opening the door.

2. A refrigerator comprising:
  a cabinet defining at least one compartment having an open face and having a door for selectively closing the open face of the compartment;
  a water-using accessory provided on one of the cabinet and door;
  a head fixed relative to the cabinet and fluidly coupling the water-using accessory to a water supply;
  a water-treatment cartridge removably coupled to the head such that when the cartridge is coupled to the head, the cartridge treats the water from the supply for use by the water-using accessory; and
  a cartridge mounting bracket removably mounting the cartridge within the cabinet and located on the cabinet relative to the head such that the mounting of the cartridge to the cartridge mounting bracket effects the coupling of the cartridge to the head and the cartridge can be mounted to the cartridge mounting bracket; and
  wherein the cartridge and head are keyed relative to the cartridge mounting bracket to ensure that the cartridge is properly oriented to the cartridge mounting bracket such that the cartridge will fluidly couple with the head when the cartridge is inserted into the cartridge mounting bracket.

3. The refrigerator according to claim 1, and further comprising a latch operable between a latch position, where the cartridge is held in the inserted position, and a release position, where the cartridge can be withdrawn from the casing.

4. The refrigerator according to claim 3, wherein the latch comprises a strike associated with the casing and a catch provided on the cartridge such that the strike holds the catch when the cartridge is in the inserted position to prevent the withdrawal of the cartridge.

5. The refrigerator according to claim 3, wherein the latch comprises a release operable between a locked position, where the latch is placed in the latch position, and an unlocked position, where the latch is placed in the release position.

6. The refrigerator according to claim 5, wherein the release is accessible from the exterior of the cabinet.

7. The refrigerator according to claim 6, wherein the cabinet further comprises a grill having a pass-through opening aligned with the exterior end of the casing to permit the insertion of the cartridge into the casing through the pass-through opening of the grill.

8. The refrigerator according to claim 7, wherein the release is accessible through the pass through opening of the grill.

9. The refrigerator according to claim 8, wherein grill is located at a lower front portion of the cabinet.

10. The refrigerator according to claim 9, and further comprising a handle mounted to the end of the cartridge to assist the user in inserting and withdrawing the cartridge from the casing.

11. The refrigerator according to claim 10, wherein the handle comprises a finger recess accessible from the exterior of the cabinet whereby the user can insert his fingers into the recess to aid in inserting and withdrawing the cartridge from the casing.

12. The refrigerator according to claim 10, and further comprises a removable mount for removably securing the handle to the cartridge.

13. The refrigerator according to claim 12, wherein the removable mount comprises cooperating lugs on the handle and the cartridge, and the lugs collectively forming a bayonet mount for removably securing the handle to the cartridge.

14. The refrigerator according to claim 5, wherein the release is a button moveably coupled to the cartridge such that as the cartridge is inserted into the casing, the button is moved from the locked to the release position to visually indicate that the cartridge is inserted.

15. The refrigerator according to claim 14, wherein the button is biased into the locked position.

16. The refrigerator according to claim 15, wherein the button is uncoupled from the cartridge when the cartridge is fully inserted into the casing resulting in the automatic return of the button to the locked position.

17. The refrigerator according to claim 1, wherein the cartridge and head are keyed relative to the casing to ensure that the cartridge is properly oriented to the casing such that the cartridge will fluidly couple with the head when the cartridge is inserted into the casing.

18. The refrigerator according to claim 17, wherein the head comprises an inlet port for coupling to the water supply and an outlet port coupled to the water-using accessory, and the cartridge comprises inlet and outlet fittings that couple with the inlet and outlet ports, respectively, when the cartridge is in the inserted position to establish water flow from the water supply, through the cartridge, and to the water-using accessory.

19. The refrigerator according to claim 18, wherein the head further comprises a valve for each of the inlet and outlet ports, with each valve having a follower, and each of the inlet and outlet fittings have a cam that contacts the followers to open the valves when the cartridge is in the inserted position.

20. The refrigerator according to claim 19, wherein the head further comprises inlet and outlet passageways fluidly connected to the inlet and outlet ports, with the valves being mounted in the passageways such that the followers extend into the ports.

21. The refrigerator according to claim 20, wherein the passageways are oriented at an angle relative to the ports to reduce the overall length of the head.

22. The refrigerator according to claim 21, wherein the angle is approximately 90 degrees.

23. The refrigerator according to claim 22, wherein the cartridge is elongated and defines a longitudinal axis, with the inlet and outlet fittings and the inlet and outlet ports being oriented generally parallel to the cartridge longitudinal axis.

24. The refrigerator according to claim 18, wherein the head further comprises a bypass valve that fluidly couples the inlet port to the outlet port when the cartridge is not in the inserted position to permit the flow of water from the water supply to the water-using accessory when no cartridge is present.

25. The refrigerator according to claim 1, and further comprising a handle mounted to the end of the cartridge to assist the user in inserting and withdrawing the cartridge from the casing.

26. The refrigerator according to claim 25, wherein the handle comprises a finger recess accessible from the exterior of the cabinet whereby the user can insert his fingers into the recess to aid in inserting and withdrawing the cartridge from the casing.

27. The refrigerator according to claim 26, and further comprises a removable mount for removably securing the handle to the cartridge.

28. The refrigerator according to claim 27, wherein the removable mount comprises cooperating lugs on the handle and the cartridge that form a bayonet mount for removably securing the handle to the cartridge.

29. The refrigerator according to claim 1, wherein the cartridge mounting bracket has an elongated recess in which the cartridge is axially inserted to mount the cartridge to the cartridge mounting bracket.

30. The refrigerator according to claim 29, wherein the head is located at one end of the elongated recess and an inlet opening is formed at an opposing end of the elongated recess, wherein the insertion of the cartridge into the inlet opening mounts the cartridge to the cartridge mounting bracket and fluidly couples the cartridge to the head.

31. The refrigerator according to claim 30, wherein the inlet opening is accessible from the exterior of the cabinet.

32. The refrigerator according to claim 31, wherein the inlet opening is accessible from a side of the cabinet on which the door is provided.

33. The refrigerator according to claim 1, and further comprising a visual indicator indicating when the cartridge is properly mounted to the mounting bracket.

34. The refrigerator according to claim 33, wherein the visual indicator also comprises an audible indicator indicating when the cartridge is properly mounted to the mounting bracket.

35. The refrigerator according to claim 33, wherein the visual indicator comprises a moveable element that operably couples to the cartridge as the cartridge is mounted to the bracket such that the moveably element moves in response to the mounting of the cartridge to the bracket.

36. The refrigerator according to claim 35, wherein the cartridge mounting bracket comprises a casing defining a hollow interior sized to receive the cartridge, with an exterior opening and an interior end aligned with the head, wherein the cartridge is removably mounted to the casing and coupled to the head by inserting the cartridge into the casing exterior opening.

37. The refrigerator according to claim 36, wherein the moveable element comprises a strike that extends into the hollow interior of the casing and the cartridge comprises a catch which catches the strike as the cartridge is inserted into the hollow interior of the casing to couple the movement of the moveable element to the cartridge.

38. The refrigerator according to claim 37, and further comprising a release for uncoupling the moveable element from the cartridge when the cartridge is properly inserted within the casing.

39. The refrigerator according to claim 38, wherein the moveable element is moveable between a normal position and a withdrawn position corresponding to the cartridge being properly inserted.

40. The refrigerator according to claim 39, wherein the release is automatically actuated upon the proper insertion of the cartridge resulting in the moveable element being automatically biased to the normal position upon the proper insertion of the cartridge.

41. A refrigerator comprising:
a water-using accessory; and
a water-treatment system fluidly coupling a water supply to the water-using accessory for supplying treated water to the water-using accessory, and comprising:
a head assembly comprising at least one valve controlling the flow of water from the water supply through the head assembly; and
an end piece of a treatment cartridge fluidly connecting the treatment cartridge to the head assembly by actuating the at least one valve, the end piece comprising:
an end piece wall;
an inlet fitting and an outlet fitting, with at least one of the inlet fitting and outlet fitting having a cam surface;
wherein said inlet fitting and said outlet fitting extend discretely from said end piece wall, and wherein at least a portion of said cam surface is vectored from a longitudinal axis of the treatment cartridge for actuating the at least one valve when the treatment cartridge is connected to the head assembly.

42. The refrigerator of claim 41, wherein at least a portion of said cam surface is vectored between about 1 degree and about 90 degrees from said longitudinal axis.

43. The refrigerator of claim 41, wherein at least a portion of said cam surface is angled between about 1 degree and about 90 degrees from said longitudinal axis.

44. The refrigerator of claim 41, wherein said cam surface comprises an essentially straight surface.

45. The refrigerator of claim 41, wherein said cam surface comprises an essentially curved surface.

46. The refrigerator of claim 41, wherein said cam surface comprises a first essentially straight surface and a second essentially straight surface, each said surface being vectored from said longitudinal axis.

47. The refrigerator of claim 46, wherein said first essentially straight surface is vectored between about 1 degree and about 45 degrees from said longitudinal axis and said second essentially straight surface is vectored between about 45 degrees and 90 degrees from said longitudinal axis.

48. The refrigerator of claim 41, wherein said cam surface comprises an essentially curved surface and an essentially straight surface, each said surface being vectored from said longitudinal axis.

49. The refrigerator of claim 48, wherein said essentially straight surface is vectored between about 5 degrees and 90 degrees from said longitudinal axis.

50. The refrigerator of claim 48, wherein at least one of said first essentially straight surface and said second essentially straight surface are angled in relation to said longitudinal axis.

51. The refrigerator of claim 48, wherein said essentially straight surface is angled in relation to said longitudinal axis.

52. The refrigerator of claim 41, wherein said cam surface is distal from a sealing surface.

53. The refrigerator of claim 41, wherein said both the inlet and outlet fittings have a cam surface, the inlet fitting has an inlet fitting longitudinal axis, and the outlet fitting has an outlet fitting longitudinal axis,.

54. The refrigerator of claim 53, the end piece further comprising a protrusion having a protrusion longitudinal axis, said protrusion extending from said end piece wall.

55. The refrigerator of claim 54, wherein said protrusion is positioned between said inlet and said outlet fittings.

56. The refrigerator of claim 55, wherein the distance from said inlet fitting longitudinal axis to said outlet fitting longitudinal axis is less than the distance from said inlet fitting longitudinal axis to said protrusion longitudinal axis, and wherein the distance from said inlet fitting to said protrusion longitudinal axis is less than the distance from said outlet fitting longitudinal axis to said protrusion longitudinal axis.

57. The refrigerator of claim 56, wherein the distance from said inlet fitting longitudinal axis to said outlet fitting longitudinal axis is about 0.8 cm, and wherein the distance from said inlet fitting to said protrusion longitudinal axis is about 1.1 cm, and wherein the distance from said outlet fitting longitudinal axis to said protrusion longitudinal axis is about 1.9 cm.

58. The refrigerator of claim 57, wherein the most distal portion of said protrusion is closer to said end piece wall than the most distal portions of said inlet and said outlet fittings.

59. The refrigerator of claim 41, wherein said cam surface is positioned on a wall extending from the base of a channel of said inlet fitting.

60. The refrigerator of claim 41, and further comprising a cartridge housing having a first end, a closed second end, and a longitudinal axis extending therebetween, wherein said end piece wall is connected to said first end of said cartridge housing.

61. The refrigerator of claim 60, wherein said cartridge housing comprises a treatment material in fluid communication with said inlet and said outlet fittings.

62. The refrigerator of claim 41, wherein the head assembly comprises an inlet receiving port and out outlet receiving port, wherein the inlet receiving port is sized to receive the inlet fitting and the outlet receiving port is sized to receive the outlet fitting to fluidly couple the head and the end piece.

63. The refrigerator of claim 62, wherein the head assembly further comprises a valve having a follower located in the inlet receiving port and the inlet fitting has an inlet fitting longitudinal axis and a cam surface, such that when the inlet fitting is received within the inlet receiving port, the cam surface contacts the follower to open the valve.

64. The refrigerator of claim 62, wherein said outlet valve is actuated by pressure.

65. The refrigerator of claim 63, wherein the head assembly further comprises a second valve having a follower located in the outlet receiving port and the outlet fitting has an outlet fitting longitudinal axis and a cam surface, such that when the outlet fitting is received within the outlet receiving port, the cam surface of the outlet fitting contacts the follower of the second valve to open the second valve.

66. The refrigerator of claim 63, wherein the head assembly further comprises a bypass valve fluidly connecting the inlet receiving port and the outlet receiving port when the end piece is not mounted to the head assembly.

67. The refrigerator of claim 66, wherein said end piece further comprises a protrusion for actuating the bypass valve, and the head assembly further comprises a bypass passageway housing which contains the bypass valve, wherein the bypass passageway housing is so arranged to receive said protrusion and the bypass valve is actuated by said protrusion.

68. The refrigerator of claim 63, wherein the head further comprises an inlet port fluidly coupling the water supply to the inlet receiving port, and an outlet port fluidly coupling the water-using accessory to the outlet receiving port, wherein the valve is located in the inlet port such that a portion of the follower extends into the inlet receiving port.

69. The refrigerator of claim 68, wherein the inlet port is oriented at an angle relative to the inlet receiving port to reduce the overall length of the head assembly.

70. The refrigerator of claim 69, wherein the angle is approximately 90 degrees.

71. A refrigerator comprising:
- a cabinet comprising at least one compartment having an open face and a door for selectively closing the open face of the compartment;
- a water-using accessory provided on the cabinet;
- a head fixed relative to the cabinet and fluidly coupling the water-using accessory to a water supply;
- a water-treatment cartridge removably coupled to the head such that when the cartridge is coupled to the head, the cartridge treats the water from the supply for use by the water-using accessory; and
- a cartridge mounting bracket defining a hollow interior sized to receive the cartridge and aligned with the head, the hollow interior opening onto the exterior of the cabinet such that the hollow interior is accessible from the exterior of the cabinet;

wherein the cartridge can be inserted into the exterior opening to effect the coupling of the cartridge to the head without opening the door.

72. The refrigerator according to claim 71, and further comprising a latch operable between a latch position, where the cartridge is held in the inserted position, and a release position, where the cartridge can be withdrawn from the cartridge mounting bracket.

73. The refrigerator according to claim 72, wherein the latch comprises a strike associated with the cartridge mounting bracket and a catch provided on the cartridge such that the strike holds the catch when the cartridge is in the inserted position to prevent the withdrawal of the cartridge.

74. The refrigerator according to claim 72, wherein the latch comprises a release operable between a locked position, where the latch is placed in the latch position, and an unlocked position, where the latch is placed in the release position.

75. The refrigerator according to claim 74, wherein the release is accessible from the exterior of the cabinet.

76. The refrigerator according to claim 71, and further comprising a grill associated with the cabinet having a pass-through opening aligned with the hollow interior of the cartridge mounting bracket to permit the insertion of the cartridge into the cartridge mounting bracket through the pass-through opening of the grill, wherein the cartridge is removably mounted to the cartridge mounting bracket and coupled to the head by inserting the cartridge through the grill into the cartridge mounting bracket exterior opening to place the cartridge into an inserted position.

77. The refrigerator according to claim 76, wherein grill is located at a lower front portion of the cabinet.

78. The refrigerator according to claim 77, and further comprising a handle mounted to the end of the cartridge to assist the user in inserting and withdrawing the cartridge from the cartridge mounting bracket.

79. The refrigerator according to claim 78, wherein the handle comprises a finger recess accessible from the exterior of the cabinet whereby the user's fingers can be inserted into the recess to aid in inserting and withdrawing the cartridge from the cartridge mounting bracket.

80. The refrigerator according to claim 78, and further comprises a removable mount for removably securing the handle to the cartridge.

81. The refrigerator according to claim 80, wherein the removable mount comprises cooperating lugs on the handle and the cartridge, and the lugs collectively forming a bayonet mount for removably securing the handle to the cartridge.

82. The refrigerator according to claim 2, wherein the head comprises an inlet port for coupling to the water supply and an outlet port coupled to the water-using accessory, and the cartridge comprises inlet and outlet fittings that couple with the inlet and outlet ports, respectively, when the cartridge is in the inserted position to establish water flow from the water supply, through the cartridge, and to the water-using accessory.

83. The refrigerator according to claim 82, wherein the head further comprises a valve for each of the inlet and outlet ports, with each valve having a follower, and each of the inlet and outlet fittings have a cam that contacts the followers to open the valves when the cartridge is in the inserted position.

84. The refrigerator according to claim 83, wherein the head further comprises inlet and outlet passageways fluidly connected to the inlet and outlet ports, with the valves being mounted in the passageways such that the followers extend into the ports.

85. The refrigerator according to claim 84, wherein the passageways are oriented at an angle relative to the ports to reduce the overall length of the head.

86. The refrigerator according to claim 85, wherein the angle is approximately 90 degrees.

87. The refrigerator according to claim 86, wherein the cartridge is elongated and defines a longitudinal axis, with the inlet and outlet fittings and the inlet and outlet ports being oriented generally parallel to the cartridge longitudinal axis.

* * * * *